United States Patent [19]

Marui et al.

[11] Patent Number: 5,314,249
[45] Date of Patent: May 24, 1994

[54] SURFACE CONDITION MEASUREMENT APPARATUS

[75] Inventors: Tomohiro Marui, Tokyo; Kazuo Arai, Chiba, both of Japan

[73] Assignee: Kawasaki Steel Corporation, Hyogo, Japan

[21] Appl. No.: 976,414

[22] Filed: Nov. 13, 1992

[30] Foreign Application Priority Data

| | | | |
|---|---|---|---|
| Nov. 19, 1991 | [JP] | Japan | 3-330092 |
| Nov. 19, 1991 | [JP] | Japan | 3-330093 |
| Dec. 10, 1991 | [JP] | Japan | 3-350095 |
| Feb. 6, 1992 | [JP] | Japan | 4-21068 |

[51] Int. Cl.$^5$ .................................. G01J 5/02
[52] U.S. Cl. ..................... 374/128; 364/577
[58] Field of Search .................. 374/6, 7, 9, 126, 127, 374/128, 129, 130, 161, 162; 364/557; 356/43–45; 250/338.1

[56] References Cited

U.S. PATENT DOCUMENTS

| | | | |
|---|---|---|---|
| 3,539,807 | 11/1970 | Bickel | 374/9 X |
| 4,417,822 | 11/1983 | Stein et al. | 374/129 |
| 4,465,382 | 8/1984 | Iuchi et al. | 374/9 |
| 4,561,786 | 12/1985 | Anderson | 374/129 |
| 4,579,461 | 4/1986 | Rudolph | 374/9 |
| 4,659,234 | 4/1987 | Brouwer et al. | 374/126 X |
| 4,880,314 | 11/1989 | Klenitz | 374/9 X |
| 4,881,823 | 11/1989 | Tanaka et al. | 374/128 X |
| 4,974,182 | 11/1990 | Tank . | |
| 5,011,295 | 4/1991 | Krishnan et al. . | |
| 5,166,080 | 11/1992 | Schietinger et al. | 374/7 X |

FOREIGN PATENT DOCUMENTS

| | | |
|---|---|---|
| 2477706 | 9/1981 | France . |
| 2160971A | 1/1986 | United Kingdom . |

OTHER PUBLICATIONS

Khan et al., "Noncontact Temperature Measurement" vol. 62, No. 2, Feb. 1, 1991, pp. 392–402.
Tanaka et al. "IEEE Instrumentation and Measurement Technology Conference 1989" Apr. 25, 1989, Application of a New Radiation Thermometry Method to Galvannealed and Cold Rolled Steels, pp. 24–28.
Hiernaut et al., "Submillisecond Six Wavelength Pyrometer, Etc.", vol. 18, Sep. 1, 1986, pp. 617–625.
Peter John Kirby, "Aluminum Temperature Measurement Using Dual Spectral Infrared Thermometry", 1992, pp. 571–574.

*Primary Examiner*—William A. Cuchlinski, Jr.
*Assistant Examiner*—G. Bradley Bennett
*Attorney, Agent, or Firm*—Oliff & Berridge

[57] ABSTRACT

Radiated light with a specified wavelength from a material is detected and a first parameter corresponding to the emissivity ratio is obtained from the plurality of detection signals. Since the emissivity takes on different values according to the condition of the surface of the material, the first parameter changes depending on the surface condition of the material. There is a correlation between a physical value indicating a condition of the material surface and the first parameter. The correlation remains equivalent even if a second parameter corresponding to the physical value is used instead of the physical value itself (for example, an optical physical value such as reflectivity and absorptivity, the thickness of a film formed on the material surface, the surface roughness, and the degree of galvannealing). As an example of the parameter corresponding to the physical value, there is the logarithmic ratio between emissivities (ln $\epsilon_a$/ln $\epsilon_b$) corresponding to the temperature in the vicinity of the surface. Therefore, a second parameter can be obtained on the basis of the correlation and a physical value can be obtained. When the emissivity or logarithmic emissivity ratio is used as the second parameter, the temperature in the vicinity of the material surface can be obtained from the second parameter and the plurality of detection signals.

15 Claims, 47 Drawing Sheets

FIG. 6
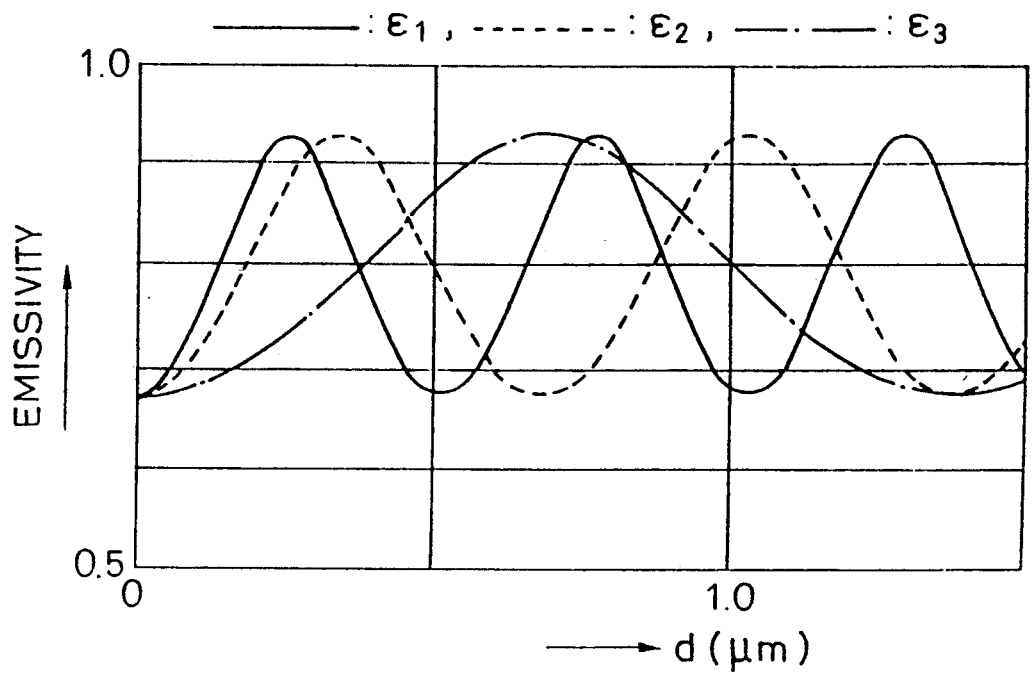
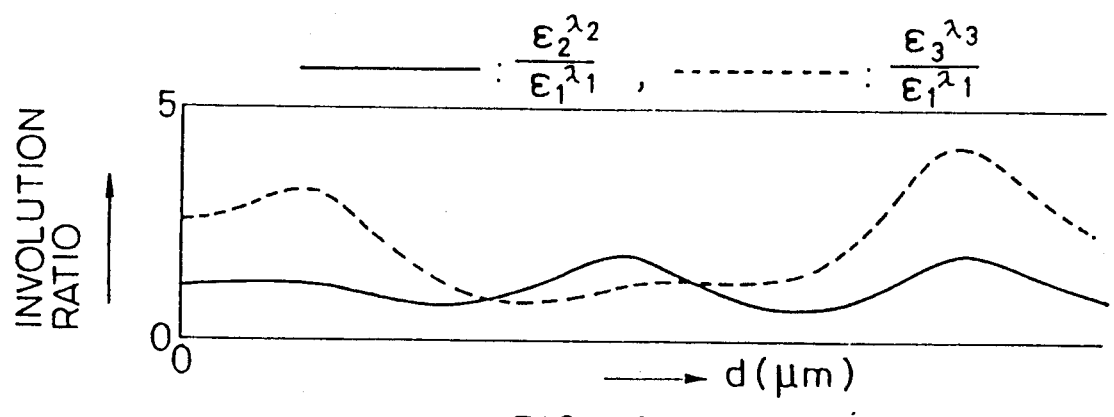
FIG. 7A
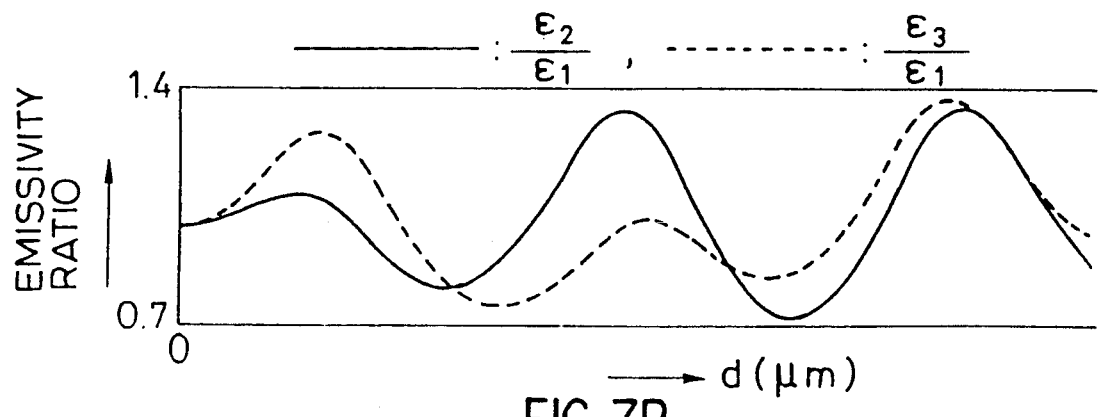
FIG. 7B

FIG. 60

|  | SELECTION SIGNAL | | |
|---|---|---|---|
|  | $\lambda_1 \lambda_{1x}$ | $\lambda_2 \lambda_{2x}$ | $\lambda_3 \lambda_{3x}$ |
| WITHIN TIMING ZONE 210 | × | △ | ◎ |
| WITHIN TIMING ZONE 220 | ◎ | × | △ |
| WITHIN TIMING ZONE 230 | ◎ | ◎ | × |

SURFACE CONDITION MEASUREMENT APPARATUS

BACKGROUND OF THE INVENTION

1. Field of the Invention

The present invention relates to a measurement technique for measuring physical values on the surface (optical physical values such as refractive index, reflectivity, and absorptivity, and values indicating surface shape such as surface roughness, surface temperature, thickness of thin film, etc.) of a material in the process of manufacture by detection of thermal radiation energy having two or more different wavelengths.

2. Prior Art

In the process of manufacturing semiconductor material, metallic material, and the like, various reactions such as oxidation, galvannealing, and vapor deposition occur on the surface of the material in process either artificially or naturally and thereby vary physical properties of the material surface greatly on account of such reactions. However, the sensing of the interior of the material is very difficult. It is not preferred from a practical point of view to attach many sensors to the material in order to obtain various data. Therefore, the surface temperature is selected as the most influential parameter from the physical, values or state values, and the surface temperature is utilized for process control as the value for predicting changing status in on-line sensing or in theoretical calculation. For example, in a process of forming oxide film on a silicon wafer, correlative data between the heat pattern of the oxidation process furnace and physical properties of oxide film are measured off-line to obtain many off-line data in advance. The furnace temperature is controlled based on such data. (Although it is desirable to execute control of the surface temperature, indirect control according to the furnace temperature is executed because of difficulty in the on-line sensing.)

For the on-line material surface temperature sensing, there are two temperature sensing techniques: contact method and non-contact method. In the contact temperature sensing method using a thermocouple, thermistor, etc., many problems occur such as: the measurable temperature range is limited, the position where temperature can be measured is limited to the point of sensing, and contamination of the material occurs (addition of impurities thereto) by the contact. Therefore, the processes to which this method is applicable are limited. In the non-contact temperature measuring method, there is "radiation thermometry". This is a practical technique in the process line of metallic materials such as iron, steel and aluminum, and there is a radiation thermometer as a product on the market.

For the process line of a metallic material as described above, there already is developed a technique to measure the surface temperature in a non-contact manner. However, for the process of manufacturing a semiconductor or a new material, such a measuring technique is still in the studying stage. Although various efforts are being made to develop surface temperature measuring techniques, there has not yet been developed any effective technique.

It is reported, for example, in Watanabe, et. al., "Measurement of Wafer Temperature within Semiconductor Heat Treatment Apparatus by Radiation Thermometer", The Transactions of the Japanese Institute of Measurement and Automatic Control Engineers, Vol. 25, No. 9, pp. 925-931 (1989), that it has at last been made possible to apply radiation thermometry to a manufacturing process, to which furnace temperature control has hitherto been applied, by using fiber optics and prisms. From the fact that studies recently made public are on such a stage, it is the present state that there has not been developed any effective technique of on-line radiation thermometry in the field of processing semiconductors.

On the other hand, there are widely used radiation thermometers with the radiation thermometry technique applied thereto for measuring the surface temperature of hot matters. There are two types of such radiation thermometers, i.e., single-color thermometers using a single wavelength for the measurement and two-color thermometers using two wavelengths. Even the two-color thermometer using two wavelengths, not to mention the single-color thermometer, produces a great measurement error when the emissivity of the object of measurement changes.

More specifically, there is no problem with the temperature measurement accuracy of the two-color thermometer when spectral emissivities for two wavelengths are virtually equal or have constant proportionality therebetween. However, the surface condition of a hot matter suddenly changes due to oxidation reaction caused thereon, and when the spectral emissivities deviate from the aforesaid relationship, the measurement accuracy decreases extremely. The error in the single-color radiation thermometer becomes much greater. Therefore, there is a demand for a temperature calculation method for the two-color thermometer responding to changes in the spectral emissivity. Studies for providing such a method are being made, and an improved two-color thermometer is being contemplated for use even where the emissivity changes.

There is a method disclosed in Japanese Patent Publication No. 3-4855 and a TRACE (Thermometry Reestablished by Automatic Compensation of Emissivity) method disclosed in Tanaka and D. P. Dewitt, "Theory of a New Radiation Thermometry Method and an Experimental Study Using Galvannealed Steel Specimens", The Transactions of the Japanese Institute of Measurement and Automatic Control Engineers, Vol. 25, No. 10, pp. 1031-1037 (October 1989). Since both of the above calculation methods are substantially the same, the former will be described below. The spectral emissivity for radiation energy (light wave) emitted from a material in process is obtained by using Wien's approximation law. When wavelengths are $\lambda_1$ and $\lambda_2$, the emissivities are given by the following expressions (1) and (2). By eliminating temperature T from these expressions, expression (3) can be obtained. (Symbols used in these expressions will be mentioned below.)

Measurement wavelength: $\lambda_i$ [$\mu$m]
Spectral emissivity for a measurement wavelength: $\epsilon_i$ [$\mu$m]
True temperature of the hot matter surface: T [K]
Brightness temperature of the hot matter surface at a wavelength $\lambda_i$: Si [K]
Planck's second radiation constant: C2 ($1.4388 \times 10^4$) [$\mu$M·K]

$$\epsilon_1 = \exp[(C2/\lambda_1)\{(1/T) - (1/S1)\}] \qquad (1)$$

$$\epsilon_2 = \exp[(C2/\lambda_2)\{(1/T) - (1/S2)\}] \qquad (2)$$

$$\epsilon_1^{\lambda_1}/\epsilon_2 = \exp[(C2\{(1/S2) - (1/S1)\}] \qquad (3)$$

The left side of the expression (3) is the ratio between "the wavelength power, or involution, of spectral emissivities", which, will hereinafter be called "emissivity involution ratio" for simplicity. The old two-color radiation thermometer measures temperature on the assumption that the ratio between spectral emissivities ($\epsilon_1/\epsilon_2$) is "1" or a constant. Because it does not respond to changes in the spectral emissivities, it produces a great measurement error. (The ratio between emissivities will hereinafter be called "emissivity ratio".)

In Japanese Patent Publication No. 3-4855, the correlative function "f" of the spectral emissivity ratio ($\epsilon_1/\epsilon_2$) to the emissivity involution ratio is decided in advance by measurement. To be concrete, if radiation thermometry and true temperature measurement are performed at the same time by using, for example, a thermocouple, the spectral emissivity is obtained. By using such data, the spectral emissivity ratio and the emissivity involution ratio can be obtained. Hence, the correlative function f can be obtained from them. Further, since the brightness temperatures S1 and S2 can be obtained as outputs of the two-wavelength detector, the value of the above emissivity involution ratio can be obtained by calculating the right side of expression (3). Accordingly, in the temperature measurement, the brightness temperatures are measured and the emissivity ratio is obtained according to the following expression (4) from the emissivity involution ratio calculated according to the above expression (3) by using the correlative function f. The temperature T is obtained by making calculations according to the following expression (5).

$$\epsilon_1/\epsilon_2 = f(\epsilon_1^{\lambda 1}/\epsilon_2^{\lambda 2}) \quad (4)$$

$$T = (\lambda_2 - \lambda_1)/\{(\lambda_1\lambda_2/c2)ln(\epsilon_1/\epsilon_2) + (\lambda_2/s1) - (\lambda_1/s2)\cdot\} \quad (5)$$

However, when the above described prior art is applied to surface temperature measurement in surface processing of silicon semiconductors, such as the formation of a surface thin film, problems arise such that the function "f" in expression (4) becomes very complicated and the calculation becomes difficult or, if it is simplified by approximation, an error is produced. In the surface process of the silicon semiconductor, the thin film of the surface changes. Therefore, when attempting to measure the surface temperature, the emissivity varies greatly because of optical interference in the thin film. This makes practical radiation thermometry difficult.

In the manufacturing process of semiconductor materials, metallic materials, and the like, although it has been desired that the surface physical properties of the materials in process are measured and on-line process control is thereby executed, such control is not practiced in reality. Further, since surface physical properties change with time and also are closely related with the temperature of the material, it becomes necessary that the surface physical properties and the surface temperature are measured at the same time on an on-line basis. However, it has hitherto been impossible to simultaneously measure the surface physical properties and the surface temperature in the same position of the material.

Further, when the measurement method by the two-color thermometer using the above expressions (1) to (5) is applied to thermometry of a hot matter whose surface condition changes with the progress of oxidation reaction or the like, temperature measurement with high accuracy can be attained provided that the measurement wavelengths used are "insensitive" to changes of the surface status. However, when the spectral emissivities of the selected wavelengths are sensitive to the change in the surface condition, a problem arises that greatly decreases the measurement accuracy.

More specifically, as a concrete example, when the spectral emissivities of selected wavelengths sensitively change responding to changes in the surface status of a hot matter, in one case, the surface oxidizes and forms a translucent (to the measurement wavelength) oxide film on the surface. In such a case, optical interference takes place in the translucent film formed on the surface and the spectral emissivity is thereby greatly reduced.

Makino et. al. gives account of such a phenomenon of a sudden change of emissivity in, for example, "Heat Transfer 1986", Vol. 2, Hemisphere (1986) pp. 577–582, on the basis of experiments and model calculations based on optical interference theories, that a drop (valley) appears in the spectral emissivity (reflectivity) spectrum at a short-wavelength zone when surface oxidation occurs and the sudden change is confirmed to be a characteristic change of the valley moving toward the longer-wavelength side as the oxidation progresses.

FIG. 65 to FIG. 69 are diagrams schematically showing an example of such a characteristic change in a spectral emissivity spectrum. Referring to the diagrams, the axis of abscissas represents the spectral wavelength $\lambda$ and the axis of ordinates represents the emissivity $\epsilon$. Further, the portion indicated by "valley" is the valley in the spectral emissivity spectrum.

FIG. 65 to FIG. 69 show changes in the spectral emissivity spectrum of the surface as an oxide film is progressively formed on a surface of a metal such as stainless steel.

FIG. 65 shows a spectrum in a low temperature state when no oxide film is formed. FIG. 66 shows a spectrum in an intermediate temperature state when an oxide film is not yet formed. FIG. 67 shows a spectrum in an intermediate temperature state when an oxide film has started to form. FIG. 68 shows a spectrum in a state of the material at the same temperature and having the oxide film developed thereon, and FIG. 69 shows a spectrum in a state of the material heated to a high temperature and having a thick oxide film formed thereon.

The occurrence of the valley is considered chiefly attributable to optical interference caused by an oxide film, and the above introduced Makino et. al. obtained spectral emissivity spectra through model calculation based on interference theories and report that results of the calculation and the experimental results concur well with each other.

Accordingly, the change in the spectral emissivity spectrum occurs because radiation energy of a spectral wavelength band on the order below the thickness of the oxide film is selectively trapped in the oxide film. More specifically, remarkable energy attenuation is produced because radiation of a uniquely selected wavelength band produces interference or multiple reflection in the oxide film and the valley moves from a short wavelength side to a long wavelength side because the uniquely selected wavelength band moves as the oxide film becomes thicker.

Since the emissivity ratios change as the spectral emissivity spectra change with the passage of time as described above, it is natural that measurement errors are produced in the old type two-color radiation thermometer. Measurement errors are equally produced even in the above described improved type two-color thermometer because of difficulty in the calculation of expressions used therein.

The calculation in the improved type two-color thermometer using nearby two wavelengths $\lambda_1$ and $\lambda_{1x}$ ($\lambda_1 < \lambda_{1x}$) requires that correlation of the two spectral emissivities $\epsilon_1$ and $\epsilon_{1x}$ is determined as a regression function in advance from experimental data on an off-line basis. Therefore, the regression procedure falls into difficulty that will be briefly described below.

Supposing that actual measured data of spectral emissivities $\epsilon_1$ and $\epsilon_{1x}$ are obtained while the movement of the valley from the short wavelength side to the long wavelength side is taking place as in the spectral emissivity spectrum described above, the correlation of the emissivity $\epsilon_1$ and the $\epsilon_{1x}$ changes as "positive correlation"→"negative correlation"→"positive correlation".

This will be understood easily if the changes in the values of the emissivities $\epsilon_1$ and $\epsilon_{1x}$ corresponding to the nearby two wavelengths $\lambda_1$ and $\lambda_{1x}$ are traced in FIG. 65 through FIG. 69. More specifically, when the low wavelength portion of the "valley" in the diagrams (the portion where the spectral gradient is negative) comes between the wavelengths $\lambda_1$ and $\lambda_{1x}$, the relative magnitude between the spectral emissivities $\epsilon_1$ and $\epsilon_{1x}$ is reversed and the positiveness and the negativeness of the correlation are reversed.

The situation will be concretely shown in FIG. 70 and FIG. 71. The correlation before passing the valley (FIG. 70) and after passing the valley (FIG. 71) is obviously completely reverse.

Tanaka et. al., "Studies on Iron Manufacture", No. 339 (1990) pg. 63–67, shows the graph $\epsilon_1$ vs. $\epsilon_2$ is not one-valued, but rather forms a loop, as schematically shown in FIG. 72. This loop is supposedly due to radiation interference occurring in the oxide film.

Thus, the occurrence of some measurement error is unavoidable even in the improved type two-color thermometer because the correlative regression graph between the emissivities $\epsilon_1$ and $\epsilon_{1x}$ cannot be simply determined.

When temperatures of stainless steel plate (SUS 304) were actually measured with the above-described improved type two-color thermometer while surface oxidation was in progress, the maximum measurement error in the domain of galvannealing temperature around 600° C. was approximately 15° C. and the standard deviation was approximately 5° C.

In the course of the development of surface oxidation or surface galvannealing and the change in surface physical properties as described above, the temperature is an influential process parameter in the steel manufacturing process control. Therefore, it is a serious problem that there is an error in the measurement value obtained by radiation thermometry and hence there are demands for a more accurate thermometer. The desired measurement accuracy is a temperature measurement error of ±5° C. (maximum error is within 5° C.).

Accordingly, there are demands for the development of a radiation thermometer having higher measurement accuracy than the above improved type two-color thermometer.

Therefore, in order to overcome the above described difficulties in the improved type two-color thermometer, it is contemplated to use three or more wavelengths for the measurement so as to form a number of combinations of two wavelengths out of them. Then, the same process as with the improved type two-color thermometer is performed for each combination of two wavelengths to measure temperature.

However, in such methods using three or more measurement wavelengths and increasing the number of combinations of two wavelengths, there still are the following problems.

To simplify the explanation, an example will be considered where the measurement wavelengths are three (i.e., $\lambda_1, \lambda_2$, and $\lambda_3$ when $\lambda_1 < \lambda_2 < \lambda_3$), and the combinations of the two wavelengths are made for convenience to be ($\lambda_2, \lambda_3$) and ($\lambda_1, \lambda_2$).

From brightness temperatures S1, S2, and S3 measured for the wavelengths $\lambda_1$, $\lambda_2$, and $\lambda_3$, two combinations (S2, S3) and (S1, S2) corresponding to the above combinations of wavelengths are made. Emissivity involution ratios and $\epsilon_3^{\lambda_3}/\epsilon_2^{\lambda_2}$ and $\epsilon_2^{\lambda_2}/\epsilon_1^{\lambda_1}$ are calculated using expressions corresponding to the above-mentioned expression (3). Correlative functions f1 and f2 corresponding to the above-mentioned expression (4) are applied to the above emissivity involution ratios to obtain emissivity ratios $\epsilon_3/\epsilon_2$ and $\epsilon_2/\epsilon_1$.

However, if it is assumed that the function f1 is given according to the graph shown in FIG. 73 because an oxide film is formed on the surface of the object of measurement, the emissivity ratio takes on two values A1 and A2 when the value of the emissivity involution ratio obtained from the expression corresponding to the expression (3) is A0. On the other hand, if it is assumed that the function f2 is given according to the graph shown in FIG. 74, three values B1, B2, and B3 are obtained as the emissivity ratios corresponding to the calculated value B0 of the emissivity involution ratio.

Therefore, when the number of measurement wavelengths is simply increased and applied to the above described improved-type two-color thermometer, an expression corresponding to the above-mentioned expression (5) must be used to calculate temperatures for the five points (i.e., the two emissivity ratios A1 and A2 and the three emissivity ratios B1 to B3). A search must be made for those temperatures agreeing with each other from the temperatures obtained from A1 and A2 and the temperatures obtained from B1 to B3, to thereby determine the agreeing temperature as the true surface temperature. Accordingly, there is a problem that the calculation process for the search is complex.

As an example of prior art radiation thermometry, there is disclosed in U.S. Pat. No. 4,417,822, a laser additionally used. The reflectivity for the laser beam from the surface of the object of measurement is used for compensating for the emissivity. This method has a disadvantage in that the apparatus becomes complex and expensive because it employs a laser. Further, it is required to obtain off-line data for the measurement of the reflectivity for the laser beam. However, the data involves intricate factors related to an optical scattering phenomenon taking place on the surface. It is therefore questionable whether the off-line data can be used in the on-line measurement. Besides, since an error is produced in the on-line measurement value of the reflectivity, the error in the temperature measurement becomes great.

In U.S. Pat. No. 4,561,786, a radiation thermometrical art is disclosed using an apparatus as shown in FIG. 75.

In this art, a radiation wave is converged by a lens 813 and separated by a rotating filter 815 to obtain two-color measurement wavelengths. Outputs for the two-color wavelengths are detected by a detector 811 and secondary calculation is performed on the outputs to obtain "ratio" and "difference" therebetween. By utilizing such calculation values, the temperature calculation is performed for practical use.

Referring to FIG. 75, reference numeral 851 denotes a division block for performing a division between outputs W1 and W2 of sample and holding circuits 845 and 847. Namely, its output constitutes the "ratio". Reference numeral 859 denotes a differential amplifier for performing a subtraction between outputs of sample and holding circuits 855 and 857. The output constitutes the "difference". Reference numerals S1 to S4 denote timing signals for synchronizing the rotational position of the rotating filter 815 with the controlling system. 817 denotes a spectroscopic filter for the first wavelength and 819 denotes a spectroscopic filter for the second wavelength 841 and 843 denote amplifiers.

For the outputs from the division block 851 and the differential amplifier 859, linearizing networks 853 and 861 and resistance values R1, R2, R3, and R4 are set up after adjusting them in accordance with each object of measurement. The calculation temperature value is displayed on a meter 875.

In this method, adjustments of the linearizers 853 and 861, and resistors R1 to R4 are determined in a trial and error manner. Accordingly, the calculation method that has come into existence as a result of trial and error is not based upon theories. In fact, there is no theoretical description given.

According to this method, it is stated that temperature measurement on aluminum with surface change progressing thereon can be made with high accuracy ($\pm 5°$ C.). However, to obtain such high accuracy, a long trial and error period is required (data for setting up are not disclosed).

Because the apparatus using the above-described method has no theoretical foundation, a long period of trial and error will be required for measuring materials other than aluminum. It therefore has no general applicability.

From the standpoint of those who control manufacturing processes, such a system is preferable when not only the surface temperature is measured but also the changes in other surface physical properties are monitored (sensed) and process control is executed through feedback control with such monitored values. Surface physical properties of materials are not only directly affected by such factors as surface roughness, surface reflectivity (emissivity), surface absorptivity, and refractive index, but also greatly affected indirectly by such physical properties within the material such as oxide film thickness, galvannealed film thickness, evaporation-deposited film thickness, electric conductivity, and boundary (inter-film) refractive index. More specifically, surface physical properties are determined by the physical properties of the substance produced after reactions have taken place in the vicinity of the surface and the physical properties related to the interface between the produced substance and the base material. It may safely be said that the surface properties cannot be assumed from the direct physical properties of the surface itself. Of course, the surface properties are greatly affected by conditions of the material in process such as surface temperature, internal temperature, and their distribution.

Thus, in accurately obtaining surface physical properties of a material in process, it is preferred that not only the surface physical properties but also changes in the physical property and changes in the state within the material are sensed. For example, in the above described oxide film forming process on a silicon wafer, control of the surface physical property is only executed indirectly by controlling the furnace temperature, while blind control (without any on-line sensor) is executed as to the actual condition of the physical property of the oxide film. Naturally, statistical process errors occur. Because of difficulty of the sensing, such "blind" control is prevalent throughout general semiconductor processes and is responsible for low yield rate of semiconductors. Such situations are present not only in the field of processing semiconductors but also in the fields of processing high tech materials such as ceramics and superconductive materials. In order to improve such "blind" control, which executes indirect control of physical properties by temperature to increase the yield rate in the process, it is desired that on-line monitoring (sensing) capable of measuring changes in surface physical property of material in process is realized.

SUMMARY OF THE INVENTION

The present invention has been made to solve the above-described problems in the prior art. A first object of the present invention is to make it possible to obtain physical values indicating surface conditions and the temperature of material by a simple method not requiring repeated calculation.

A second object of the present invention is to measure physical properties and the surface temperature of a material at the same measurement position simultaneously, to measure the surface temperature with high accuracy, as well as the physical values, even when the surface properties change and the emissivity greatly varies, and to measure only the physical values.

A third object of the present invention is to provide a practical two-color multiplex type radiation thermometer capable of measuring temperature with high accuracy even when surface conditions of an object change by oxidation and the emissivity is thereby greatly varied.

A fourth object of the present invention is to provide multi-wavelength type radiation thermometer using three or more measurement wavelengths and capable of calculating and outputting a real surface temperature of the object with ease even when surface conditions of the object for measurement change with time and the emissivity varies with the wavelength used.

In order to solve the first problem, a surface condition measurement apparatus of the present invention comprises detection means for detecting light with a specified wavelength and outputting a detection signal. The light is radiated from a material. Calculation means obtain a first parameter corresponding to an emissivity ratio from the detection signal. A second parameter corresponding to a physical value indicating a surface condition of the material is also obtained in accordance with correlation between the second parameter and the first parameter.

The detection means may be arranged to include a plurality of radiation sensors for detecting light beams having the same wavelength and forming different angles (measurement angles) between optical paths thereof and normal to the surface of the material.

The detection means may be arranged to detect light beams whose angles of polarization are different from each other and from the light radiated from the material.

The detection means may be arranged to include polarization means for extracting light beams having different angles of polarization from the light radiated from the material and a plurality of detection elements, each thereof detecting each of the light beams having different angles of polarization.

The second parameter may be the emissivity ratio or a logarithmic emissivity ratio. The calculation means may further be arranged to obtain the temperature in the vicinity of the surface of the material from the second parameter and the detection signal.

The second parameter may be the film thickness of an oxide film formed on the surface of the material.

The detection means may be arranged to detect the light beam radiated from the material and a light beam having a specified angle of polarization from the light beam radiated from the material.

In the surface condition measurement apparatus of the present invention, a light wave with a specified wavelength $\lambda$ radiated from a material is detected by a detection means and output therefrom as a detection signal. A first parameter is obtained from the detection signal by the detection means such as the emissivity ratio, the detection wavelength power of emissivity ratio ($\lambda$ power of $\epsilon_a/\epsilon_b$), the difference between inverse numbers of detected signal values for two detection wavelengths. The first parameter corresponds to the emissivity ratio ($\epsilon_a/\epsilon_b$, where $\epsilon_a$ and $\epsilon_b$ represent emissivities for the light waves with the wavelength $\lambda$ and different angles of polarization or different angles of measurement). Since the emissivity takes on different values according to the condition of the surface of the material, the first parameter changes depending on the surface condition of the material. There is a correlation between a physical value indicating a condition of the material surface and the first parameter. This correlation remains equivalent even if a second parameter corresponding to the physical value is used instead of the physical value itself (for example, an optical physical value such as reflectivity, absorptivity, the thickness of a film formed on the material surface, the surface roughness, and the degree of galvannealing). As an example of the parameter corresponding to the physical value, there is a logarithmic emissivity ratio ($\ln\epsilon_a/\ln\epsilon_b$) corresponding to the temperature in the vicinity of the surface. In the calculation means, a second parameter is obtained on the basis of the correlation to obtain a physical value. When the emissivity or the logarithmic emissivity ratio is used as the second parameter, the temperature in the vicinity of the material surface can be easily obtained from the second parameter and the detection signal.

According to the surface condition measurement apparatus described above, by obtaining the second parameter utilizing the correlation between the second parameter corresponding to a physical value indicative of a material surface condition and the first parameter, it is possible to obtain the physical value corresponding to the second parameter and hence the physical value indicative of the material surface condition or temperature through a simple method without repeated calculation.

In the present invention, the above-mentioned second problem has been solved by having a surface condition measurement apparatus comprising one or more two-color thermometers having an arbitrary position on the surface of a material in process as a field of vision common to all. The apparatus also comprises involution ratio calculation means for calculating an emissivity involution ratio $\epsilon_1^{\lambda 1}/\epsilon_2^{\lambda 2}$ from brightness temperatures S1 and S2 for two wavelengths $\lambda_1$ and $\lambda_2$ obtained from the two-color thermometer on-line according to the following expression $$\epsilon_1^{\lambda 1}/\epsilon_2^{\lambda 2} = \exp[C2\{(1/S2)-(1/S1)\}]$$

where C2 is Planck's second constant.

The apparatus further comprises first emissivity ratio calculation means for converting the emissivity involution ratio $\epsilon_1^{\lambda 1}/\epsilon_2^{\lambda 2}$ to a first spectral emissivity ratio $\epsilon_1/\epsilon_2$ in accordance with the following correlation function f measured and stored in advance $$\epsilon_1/\epsilon_2 = f(\epsilon_1^{\lambda 1}/\epsilon_2^{\lambda 2}).$$

A second emissivity ratio calculation means separately calculates spectral emissivities $\epsilon_1^*$ and $\epsilon_2^*$ for the two wavelengths $\lambda_1$ and $\lambda_2$ using theoretical or experimental expressions, which have one or more physical values greatly affecting the variation in the emissivity as variables. The second emissivity ratio calculation means also calculates a second spectral emissivity ratio $\epsilon_1^*/\epsilon_2^*$. The apparatus still further comprises search calculation means for giving an initial value to the physical value and making search calculation for the physical value bringing a second spectral emissivity ratio $\epsilon_1^*/\epsilon_2^*$ calculated with the use of the physical value substantially into agreement with the first spectral emissivity ratio $\epsilon_1/\epsilon_2$. The apparatus still yet further comprises temperature calculation means for making two-color temperature calculation using the first spectral emissivity ratio $\epsilon_1/\epsilon_2$ or the second spectral emissivity ratio $\epsilon_1^*/\epsilon_2^*\epsilon$ which has gone through the search calculation.

In the present invention, the above-mentioned second problem has been solved further by having a surface condition measurement apparatus comprising one or more two color thermometers having an arbitrary position on the surface of a material in process as a field of vision common to all, first involution ratio calculation means for calculating a first emissivity involution ratio $\epsilon_1^{\lambda 1}/\epsilon_2^{\lambda 2}$ from brightness temperatures S1 and S2 for two wavelengths $\lambda_1$ and $\lambda_2$ obtained from the two-color thermometer on-line in accordance with the following expression $$\epsilon_1^{\lambda 1}/\epsilon_2^{\lambda 2} = \exp[C2\{(1/S2)-(1/S1)\}]$$

where C2 is Planck's second constant.

The apparatus further comprises second involution ratio calculation means for separately calculating spectral emissivities $\epsilon_1^*$ and $\epsilon_2^*$ for the two wavelengths $\lambda_1$ and $\lambda_2$ using theoretical or experimental expressions, which have one or more physical values greatly affecting the emissivity variations as variables. The second involution ratio calculation means further calculates a second emissivity involution ratio $\epsilon_1^{*\lambda 1}/\epsilon_2^{*\lambda 2}$, from the results of the calculation. Search calculation means give an initial value to the physical value and make search calculation for the physical value bringing a second emissivity involution ratio $\epsilon_1^{*\lambda1}/\epsilon_2^{*\lambda2}$ substantially into agreement with the first emissivity involution ratio $\epsilon_1^{\lambda1}/\epsilon_2^{\lambda2}$.

The apparatus can have two or more two-color thermometers and thermometer selection means for selecting one or more two-color thermometers from the three according to a time variation of the emissivity ratio or emissivity involution ratio in each two-color thermometer.

Further, while at least one of the physical values is the oxide film thickness d, the theoretical expressions can be as follows:

$$\epsilon\ i = 1 - \{\rho_a + \rho_b + 2(\rho_a\rho_b \cos \gamma\ i)^{0.5}\} \div \{1 + \rho_a\rho_b + 2(\rho_a\rho_b \cos \gamma\ i)^{0.5}\}$$

$$\gamma\ i = (2\pi/\lambda\ i)2\text{nd}\cdot\cos\theta$$

where $\rho_a$ is the reflectivity at the boundary between the oxide film and the air;

$\rho_b$ is the reflectivity at the boundary between the oxide film and the unoxidized portion;

$\theta$ is the angle of refraction at the boundary between the oxide film and the unoxide portion; and n is the refractive index of the oxide film.

In the present invention, an emissivity involution ratio $\epsilon_1^{\lambda1}/\epsilon_2^{\lambda2}$ is obtained from brightness temperatures S1 and S2 obtained by the two-color thermometer. A first spectral emissivity $\epsilon_1/\epsilon_2$ is obtained from the involution ratio. A second spectral emissivity ratio $\epsilon_1^*/\epsilon_2^*$ is obtained from a physical value. Search calculations are made to search for the physical value which brings the second spectral emissivity ratio substantially into agreement with the first spectral emissivity ratio. Therefore, it is possible to obtain the physical value of a material in process under the measurement, and further, by substituting the first emissivity ratio or the finalized second spectral emissivity ratio into the two-color temperature calculation expressions corresponding to the expression (5), it is possible to also calculate the surface temperature. Therefore, it is possible to measure both the surface temperature and the physical value of the material in process at the same time. In such cases, by increasing the number of the two-color thermometers, measurement of physical values of a corresponding number can be measured.

Further, in the present invention, since it is arranged such that a second emissivity involution ratio $\epsilon_1^{*\lambda1}/\epsilon_2^{*\lambda2}$ is obtained from a physical value and search calculation is made to search for the physical value bringing the second emissivity involution ratio substantially into agreement with the first emissivity involution ratio obtained from the brightness temperatures S1 and S2. Therefore, it is possible to measure the physical value of a material in process and also to measure the surface temperature of the material.

Further, in the present invention, a time variation of the spectral emissivity ratio or the emissivity involution ratio is monitored and the temperature calculation is made employing the emissivity ratio obtained using the measurement band not exhibiting a variation of emissivity according to the monitored time variation. Therefore, it is possible to measure the temperature with high accuracy.

In the present invention, the third problem has been solved by having a two-color multiplex type radiation thermometer comprising spectroscopic means, photoelectric conversion means, involution ratio calculation means, emissivity ratio calculation means, temperature means and wavelength zone selection means. The spectroscopic means disperse light into two different wavelengths $\lambda_1$ and $\lambda_2$ for each of a plurality of different wavelength zones. The photoelectric conversion means measure brightness temperatures S1 and S2 for the two wavelengths $\lambda_1$ and $\lambda_2$ for each of the wavelength zones. The involution ratio calculation means calculate the emissivity involution ratio $\epsilon_1^{\lambda1}/\epsilon_2^{\lambda2}$ from the brightness temperatures S1 and S2 measured on-line for the two wavelengths for each of the wavelength zones according to the following expression $$\epsilon_1^{\lambda1}/\epsilon_2^{\lambda2} = \exp[C2\{(1/S2)-(1/S1)\}]$$

where C2 is Planck's second constant.

The emissivity ratio calculation means convert the emissivity involution ratio $\epsilon_1^{\lambda1}/\epsilon_2^{\lambda2}$ to a spectral emissivity ratio $\epsilon_1/\epsilon_2$ using the following correlation function f measured and stored in advance $$\epsilon_1/\epsilon_2 = f(\epsilon_1^{\lambda1}/\epsilon_2^{\lambda2}).$$

The temperature calculation means makes two-color temperature calculations using the spectral emissivity ratio $\epsilon_1/\epsilon_2$ and calculates the measurement temperature. Finally, the wavelength zone selection means monitors a time variation of the emissivity involution ratio or the spectral emissivity ratio for each of the wavelength zones and selects a particular wavelength zone according to the time variation, wherein the measurement temperature calculated for the selected particular wavelength zone is output.

Further in the above apparatus, the wavelength zone selection means compares time variation rates of the emissivity involution ratios or the spectral emissivity ratios and selects the wavelength zone for which the time variation rate is a minimum value.

Further in the above apparatus, the wavelength zone selection means compares absolute values of the emissivity involution ratios or the spectral emissivity ratios and selects the wavelength zone having the smallest absolute value.

Still further in the above apparatus, when three or more wavelength zones are used, the wavelength zone selection means selects the wavelength zone which is the second wavelength or beyond in the direction to the lower wavelength, or in the direction to the higher wavelength, from the wavelength zone for which the time variation of the emissivity involution ratio or the spectral emissivity ratio takes on a maximum value.

First, the principle of the present invention will be described. In the following explanation, spectral two wavelengths are denoted by $\lambda_i$ and $\lambda_{ix}$ ($\lambda_i < \lambda_{ix}$), brightness temperatures at the wavelengths are denoted by $S_i$ and $S_{ix}$, and corresponding emissivities are denoted by $\epsilon_i$ and $\epsilon_{1x}$ (i = 1, 2, ...). Character i indicates different wavelength zones.

In the improved type two-color thermometer described above, emissivity involution ratios are obtained from brightness temperatures S1 and S2 according to the above expression (3). The emissivity involution ratios are treated by the function of the above expression (4), wherein correlation between the emissivity involution ratios and the two spectral emissivities $\epsilon_1$ and $\epsilon_{1x}$ are set as a regression function on the basis of experimental data. An emissivity ratio $\epsilon_1/\epsilon_{1x}$ is obtained as a value of the function and the emissivity ratio is substituted into the above two-color temperature calculation expression (5) to calculate the temperature T.

However, when the surface oxide film has reached a critical thickness, the emissivity ratio varies greatly due to the interference of radiated waves. When such a variation occurs, the regression function f becomes, for example, a two value function that thereby causes problems in the calculation.

The present inventors have made it possible to measure temperature with high accuracy even when the variation of the emissivity ratio occurs, by estimating the time zone when such a variation in the emissivity ratio occurs on the basis of experiments and theories so that temperature calculation results in such a time zone are excluded from the results and temperature measurement results obtained in other time zones are used for compensating for the excluded time zone.

FIG. 1 gives diagrams schematically showing variations in spectral emissivities based on the above experiments and theories.

FIG. 1(A) shows time variations of spectral emissivities $\epsilon_1$ and $\epsilon_{1x}$. FIG. 1(B) shows time variations of the emissivity ratio $\epsilon_1/\epsilon_{1x}$. FIG. 1(C) shows time variations of spectral emissivities $\epsilon_2$ and $\epsilon_{2x}$. FIG. 1(D) shows time variations of emissivity ratio $\epsilon_2/\epsilon_{2x}$.

In the above, the spectral wavelengths are such that $\lambda_1 < \lambda_{1x} < \lambda_2 < \lambda_{2x}$, and $\lambda_1$, $\lambda_{1x}$, $\lambda_2$ and $\lambda_{2x}$ are nearby wavelengths. The two sets of nearby wavelengths form the respective measurement bands (wavelength zones).

In concrete terms, when Si and Ge are selected for the radiation photoelectric elements, it can be set such that $\lambda_1 = 1.00$ μm, $\lambda_{1x} = 1.05$ μm, $\lambda_2 = 1.60$ μm, and $\lambda_{2x} = 1.65$ μm, or so.

The spectral emissivities $\epsilon_1$ and $\epsilon_{1x}$ are for the nearby wavelengths $\lambda_1$ and $\lambda_{1x}$. Hence, they exhibit virtually the same time variation. However, when there occurs a microscopic change of physical property such as surface oxidation, the emissivities are sensitively varied by the microscopic change.

FIG. 1(A) is a diagram showing an example when surface oxidation is in progress. The effect of the interference of radiation waves due to the oxide film is appearing earlier and disappearing earlier for the smaller wavelength $\lambda_1$. Accordingly, $\epsilon_1$ and $\epsilon_{1x}$ depict variation graphs slightly shifted in the direction of the time axis as shown in the diagram. Hence, there is produced a timing at which $\epsilon_1/\epsilon_{1x}$ as indicated by A and A' in the diagram. Therefore, the time variation of the emissivity ratio $\epsilon_1/\epsilon_{1x}$ becomes as shown in FIG. 1(B).

The emissivity ratio takes on a value of 1 at the timing of A and A'. Since the emissivities greatly vary before and after that timing, the emissivity ratio also varies greatly.

For the two wavelengths $\lambda_2$ and $\lambda_{2x}$ forming a separate measurement band from the measurement band formed of $\lambda_1$ and $\lambda_{1x}$, similar variations somewhat delayed from those in FIG. 1(A) and FIG. 1(B) are observed as shown in FIG. 1(C) and FIG. 1(D).

The interval between the timing at which the sudden changes in the emissivity in FIG. 1(A) and FIG. 1(B) occur and the timing at which the sudden changes in the emissivity in FIG. 1(C) and FIG. 1(D) occur is dependent on the interval between the timing at which 1.00 μm of the oxide film is formed and the timing at which the oxide film develops to a thickness of approximately 1.60 μm. While such a time interval depends on the rate of oxidization reaction, the time interval on the order of several seconds when a stainless steel plate is oxidized in the air.

In the improved type two-color thermometer of the prior art, there has been a problem that the measurement error becomes great when the temperature calculation is made using the emissivity ratio $\epsilon_1/\epsilon_{1x}$ or $\epsilon_2/\epsilon_{2x}$ in the timing zone Z1 or the timing zone Z2 and when the emissivity ratio becomes greater than 1 or in the timing zone Z10 or the timing zone Z20, before or after that timing zone, when the emissivity ratio greatly varies as shown in FIG. 1(B) and FIG. 1(D).

In the present invention, $\epsilon_2/\epsilon_{2x}$, which is not exhibiting a variation, is used in the timing zone Z1 or the timing zone Z10. $\epsilon_1/\epsilon_{1x}$, which has already exhibited a variation and is now stabilized is used in the timing zone Z2 or the timing zone Z20, as the emissivity ratio for temperature calculation.

Expressions corresponding to the above expressions (3) to (5) used for temperature calculation using the above measurement bands are as follows:

$$\epsilon_1^{\lambda 1}/\epsilon_{1x}^{\lambda 1x} = \exp[C2\{(1/S1x)-(1/S1)\}] \quad (3\text{-}1)$$

$$\epsilon_2^{\lambda 2}/\epsilon_{2x}^{\lambda 2x} = \exp[C2\{(1/S2x)-(1/S2)\}] \quad (3\text{-}2)$$

$$T = (\lambda_{1x}-\lambda_1)/\{(\lambda_1\lambda_{1x}/C2)\ln(\epsilon_1/\epsilon_{1x})+(\lambda_{1x}/S1)-(\lambda_1/S1x)\} \quad (5\text{-}1)$$

$$T = (\lambda_{2x}-\lambda_2)/\{(\lambda_2\lambda_{2x}/C2)\ln(\epsilon_2/\epsilon_{2x})+(\lambda_{2x}/S1)-(\lambda_2/S2x)\} \quad (5\text{-}2)$$

$$\epsilon_1/\epsilon_{1x} = f1(\epsilon_1^{\lambda 1}/\epsilon_{1x}^{\lambda 1x}) \quad (4\text{-}1)$$

$$\epsilon_2/\epsilon_{2x} = f2(\epsilon_2^{\lambda 2}/\epsilon_{2x}^{\lambda 2x}) \quad (4\text{-}2)$$

In the present invention, as described in detail above, it is possible to apply a two-color radiation thermometry method using a measurement band formed of two wavelengths to a plurality of wavelength zones. Therefore, even when the valley in the spectrum of spectral emissivity moves from the short wavelength side to the long wavelength side because of growth of an oxide film, for example, on the surface of a steel plate with the passage of time, as shown in FIG. 65 to FIG. 69, it is possible to select the measurement band on the wavelength zone where such a valley does not exist.

Thus, since temperature measurement with a two-color thermometer can be achieved using a measurement band, in which no emissivity variation is produced, highly accurate temperature measurement becomes possible even when the surface state of the object of measurement changes with the passage of time when an oxide film is formed on the surface and its thickness increases with time.

In the present invention, the fourth problem has been solved by having a multi-wavelength type radiation thermometer comprising spectroscopic means, photoelectric conversion means, involution ratio calculation means, and reference means, judging means, conversion means, and temperature calculation means. The spectroscopic means disperse light into three or more different wavelengths $\lambda_1$ to $\lambda_n$. The photoelectric conversion means measure brightness temperatures S1 to Sn at the respective wavelengths $\lambda_1$ to $\lambda_n$. Involution ratio calculation means calculate the emissivity involution ratio $\epsilon_i^{\lambda i}/\epsilon_j^{\lambda j}$ from the brightness temperatures S1 to Sn obtained on-line for each combination of two different wavelengths according to the following expression $$\epsilon_i^{\lambda j}/\epsilon_j^{\lambda j} = \exp[C2\{(1/Sj) - (1/Si)\}]$$

where i and j are positive integers not exceeding n, i not equal to j; and

C2 is Planck's second constant.

Reference means store an (n−1)-dimensional involution ratio regression function F expressing mutual relationships of emissivity involution ratios $\epsilon_i^{\lambda i}/\epsilon_j^{\lambda j}$, an (n−1)-dimensional emissivity ratio regression function G expressing mutual relationships of emissivity ratio $\epsilon_i/\epsilon_j$, and a mapping H for converting the involution ratio regression function F to the emissivity ratio regression function G, which are made in advance on the basis of off-line measurement data or theories. Judgment means using the brightness temperatures S1 to Sn obtained on-line determine a point on the emissivity involution ratio regression function F corresponding to (n−1)-dimensional coordinates formed of (n−1) emissivity involution ratios calculated from the above expression. Conversion means apply the mapping H to the determined point on the involution ratio regression function F to convert the point to a point on the emissivity ratio regression function G and calculate (n−1) emissivity ratios $\epsilon_i/\epsilon_j$ from the converted point. Temperature calculation means calculate a measurement temperature by making temperature calculation using part or all of the calculated emissivity ratios.

Further in the above apparatus, a time variation of the emissivity involution ratio or the emissivity ratio is monitored and an emissivity involution ratio or an emissivity ratio exhibiting a great variation is excluded from the temperature calculation.

Still further in the above apparatus, a time variation of the absolute value of the emissivity involution ratio or the emissivity ratio is monitored and an emissivity involution ratio or an emissivity ratio exhibiting a great variation is excluded from the temperature calculation.

First, the basic principle of the present invention will be described.

FIG. 2 is a diagram in which the correlation between the thickness d of an oxide film formed on a silicon wafer and the emissivity $\epsilon_i$ for a measurement wavelength $\lambda_i$ is obtained from the following expressions (6) and (7) (where i is an integer). The expressions (6) and (7) are stated, for example, in Watanabe et. al. The Transactions of the Japanese Institute of Measurement and Automatic Control Engineers, Vol. 25, No. 9, pp. 925–931 (1989), to be in good agreement with a thin oxide film formed on a silicon surface.

$$\epsilon i = 1 - \{\rho_a + \rho_b + 2(\rho_a\rho_b \cos \gamma\ i)^{0.5}\} \div \{1 + \rho_a\rho_b + 2(\rho_a\rho_b \cos \gamma\ i)^{0.5}\} \tag{6}$$

$$\gamma\ i = (2\pi/\lambda\ i) 2nd \cdot \cos \theta \tag{7}$$

where $\rho_a$ is the reflectivity at the boundary between the oxide film and the air (=0.034);

$\rho_b$ is the reflectivity at the boundary between the oxide film and unoxidized portion (=0.186);

$\theta$ is the angle formed between the measurement apparatus and a normal to the measurement surface (=0); and n is the refractive index of the oxide film (=1.45).

FIG. 2 shows a graph of three emissivities $\epsilon_1$, $\epsilon_2$, and $\epsilon_3$ corresponding to the wavelengths $\lambda_1$, $\lambda_2$, and $\lambda_3$ that are used to calculate them. The emissivity $\epsilon_1$ is shown by a solid line, $\epsilon_2$ is shown by a broken line, and $\epsilon_3$ is shown by a chain line. The wavelengths used are $\lambda_1 = 1.0$ μm, $\lambda_2 = 2.0$ μm, and $\lambda_3 = 4.0$ μm, which have integral ratios therebetween.

Now, using the relationship between the oxide film thickness d and the emissivities $\epsilon_1$ to $\epsilon_3$ for each wavelength, the emissivity involution ratios $\epsilon_2^{\lambda 2}/\epsilon_1^{\lambda 1}$ and $\epsilon_3^{\lambda 3}/\epsilon_1^{\lambda 1}$ for two combinations of two wavelengths and the emissivity ratios $\epsilon_2/\epsilon_1$ and $\epsilon_3/\epsilon_1$ are obtained. If the obtained ratios are expressed in graphs with respect to the film thickness d, we can obtain FIG. 3. In FIG. 3, the relationships for the combination of the wavelengths $\lambda_1$ and $\lambda_2$ are drawn in solid lines and those for the combination of wavelengths $\lambda_1$ and $\lambda_3$ are drawn in broken lines.

If the correlation between the emissivity involution ratios themselves and the correlation between the emissivity ratios themselves in FIG. 3 are expressed in two-dimensional coordinate planes, we obtain FIG. 4 and FIG. 5, respectively.

When the function expressed in the graph of FIG. 4 is denoted by F and the function expressed in the graph of FIG. 5 is denoted by G, the function F and the function G have a one-to-one correspondence. By previously preparing a mapping H for converting the function F to the function G, application of the mapping H to a particular point on the function F makes it easy to calculate the corresponding point on the function G.

Therefore, by having the functions F and G and the mapping H prepared in advance, if particular values of two emissivity involution ratios, obtained by substituting brightness temperatures S1, S2, and S3 obtained as actual measurement values into the expressions corresponding to the expression (3), are obtained as a point P (X, Y) having the particular values as coordinates on the function F. Then, a point Q(x, y) on the function G of FIG. 4 is obtained by applying the mapping H to the point P as a particular point corresponding to the point P.

Thus, it becomes possible to obtain two emissivity ratios $\epsilon_2/\epsilon_1$ and $\epsilon_3/\epsilon_1$ from the value of the coordinates (x, y) of the point Q. Then it becomes possible to obtain two temperatures T1 and T2 on the same measurement point by using particular values of two emissivity ratios according to the expressions corresponding to the expression (5).

Since two sets of temperature information are obtained by one time of measurement, highly accurate measurement of the surface temperature can be achieved by determining, for example, the average value of the two temperatures T1 and T2 to be the true temperature T.

When the measurement wavelengths are simply increased in number, the correlation between the emissivity involution ratio and the emissivity ratio becomes complex and there appears a number of emissivity ratios corresponding to one emissivity involution ratio as shown in FIG. 72 and FIG. 73. Therefore, it has been necessary to search for the true temperature. According to the present invention, however, the corresponding emissivity ratio can be obtained for sure only by application of the mapping, without making complicated search calculation. Therefore, the true temperature can be obtained easily and quickly.

In addition, since the volume of the obtainable information becomes larger than that obtained in the prior art improved type two-color thermometer as described above, the surface temperature can be measured with greater accuracy.

Although the principle of the present invention has been described above on the basis of an ideal case where the correlation between the emissivity $\epsilon$ and the film thickness d is obtained from the expressions (6) and (7), the present invention is not limited to such based on theories or quasi-theories. When theoretical treatment is not applicable, the function F expressing the correlation between emissivity involution ratios, the function G expressing the correlation between emissivity ratios, and the mapping H for converting the function F to the function G are predetermined off-line, for example, through experiments in a regressive manner for each of objects of measurement (silicon wafer, aluminum, stainless steel plate, etc.).

Now, an example of the methods to determine the functions F and G as regression functions will be described using, for convenience, FIG. 4 and FIG. 5, respectively.

Brightness temperatures S1, S2, and S3 for the three wavelengths $\lambda_1$, $\lambda_2$, and $\lambda_3$ are actually measured on a number of objects of measurement (samples) with different oxide film thicknesses d. Using the actually measured brightness temperatures S1, S2, and S3, emissivity involution ratios are obtained on the basis of actual measurement for each sample according to the expressions corresponding to the expression (3). These ratios are plotted on an X-Y coordinate plane with $\epsilon_2^{\lambda_2}/\epsilon_1^{\lambda_1}$ taken as the X-axis and $\epsilon_3^{\lambda_3}/\epsilon_1^{\lambda_1}$ taken as the Y-axis.

When the emissivity involution ratios actually measured on numbers of samples are obtained as black dots shown in FIG. 4, the regression function F is obtained as average values of such black dots.

Although it is not shown, emissivity ratios corresponding to the above two emissivity involution ratios are obtained by actual measurement off-line in advance, the values are plotted on an x-y coordinate plane with $\epsilon_2/\epsilon_1$ taken as the x-axis and with $\epsilon_3/\epsilon_1$ taken as the y-axis, and the regression function G corresponding to the above regression function F is obtained equally as average values of the plots as shown in FIG. 5. Further, the mapping H is prepared for converting the regression function F to the regression function G. Thus, these functions and mapping are predetermined.

When the regression function F is obtained as shown in FIG. 4, the value of the emissivity involution ratio actually obtained at the time of actual temperature measurement is in general slightly deviated from the regression function F. Therefore, when the emissivity involution ratio according to the actual measurement is obtained as a point P', a point P on the function F in the shortest distance from the point P' is determined to be the value of the function in the temperature calculation.

Therefore, when the values of the emissivity involution ratios according to the actual measurement are obtained as the point P'(X',Y'), the point P(X, Y) on the regression function F is determined to be that expressing true emissivity involution ratios. By applying the mapping H to the point P, the point Q(x, y) on the regression function G of emissivity ratios can be obtained. The emissivity ratio $\epsilon_2/\epsilon_1$ corresponding to the coordinate x of the point Q and the emissivity ratio $\epsilon_3/\epsilon_1$ corresponding to the coordinate y can be easily obtained. Then, by substituting the two emissivity ratios to the expressions corresponding to the expression (5), two surface temperatures T1 and T2 can be obtained.

When two surface temperatures T1 and T2 are obtained, the average value can be determined to be the true temperature T as described above. Otherwise, arranging such that time variations of the two emissivity involution ratios or emissivity ratios are monitored, the temperature obtained from the emissivity involution ratio or emissivity ratio which is not affected by an unexpected change of radiation characteristic may be taken as the true temperature T.

Description has been given above as to an ideal case where the emissivity ratio can be obtained from the expressions (6) and (7) and, in addition, the three wavelengths used for measurement have integral ratio therebetween. When the measurement wavelengths have integral ratio therebetween, there exist simple periodicity among the three emissivities as shown in FIG. 2. Hence, simple periodicity also appears in the emissivity involution ratios and the emissivity ratios as shown in FIG. 3. Therefore, an advantage can be obtained in that the handling becomes simpler.

However, it is not necessary that the wavelengths used for measurement have an integral ratio therebetween. For example, when $\lambda_1=1.5$ $\mu$m, $\lambda_2=2.0$ $\mu$m, and $\lambda_3=4.0$ $\mu$m, no simple periodicity is observed among the three emissivities as shown in FIG. 6 (which corresponds to FIG. 2). Hence, no periodicity is observed in the emissivity involution ratios and the emissivity ratios as shown in FIG. 7 (which corresponds to FIG. 3). Even in the case where no integral ratio exists among the measurement wavelengths as described above, by tracing the correlation curves of the two emissivity involution ratios and the two emissivity ratios and having the results stored in a computer, the present invention can be applied to such a case.

Although description has been made above to the case where the measurement wavelengths are three different wavelengths and both the emissivity involution ratios and the emissivity ratios can be expressed in two-dimensional coordinate planes, the invention is also applicable even if it is modified such that four or more wavelengths are used and the emissivity involution ratios and the emissivity ratios are expressed in coordinate space of three or more dimensions. Calculation processing for such multiwavelength arrangement can be easily achieved by the computer.

BRIEF DESCRIPTION OF THE DRAWINGS

The preferred embodiments will be described with reference to the drawings, wherein like elements have been denoted throughout the figures with like reference numerals, and wherein:

FIG. 6 is a diagram showing other correlations between thickness of a film and emissivities;

FIGS. 7A and 7B are diagrams showing correlations of oxide film thickness with emissivity involution ratios and emissivity ratios obtained from the above correlations;

FIG. 60 is a table showing output timing of select signals from a wavelength zone selection block;

DESCRIPTION OF THE PREFERRED EMBODIMENTS

Preferred embodiments of the present invention will be described below with reference to the accompanying drawings. As to like or corresponding elements to those in the above-described prior art, the description will be simplified or omitted.

Figure 1A:
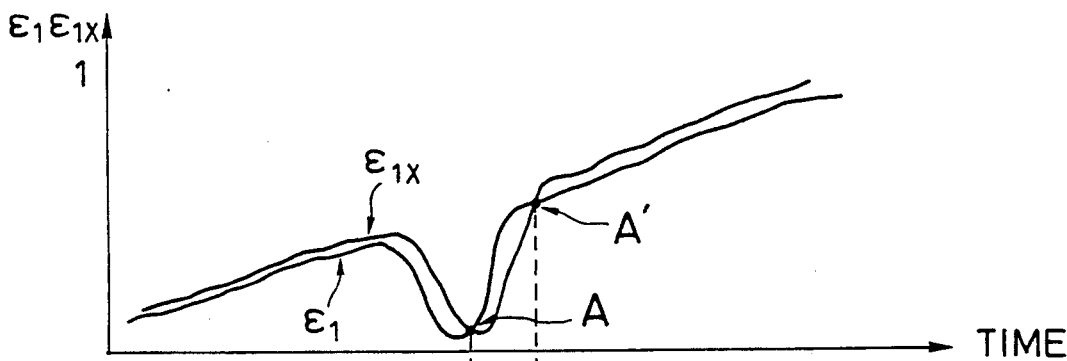
FIGS. 1A to 1D are time charts showing time variations of emissivities and emissivity ratios for describing the principle of the present invention.
Figure 1B:
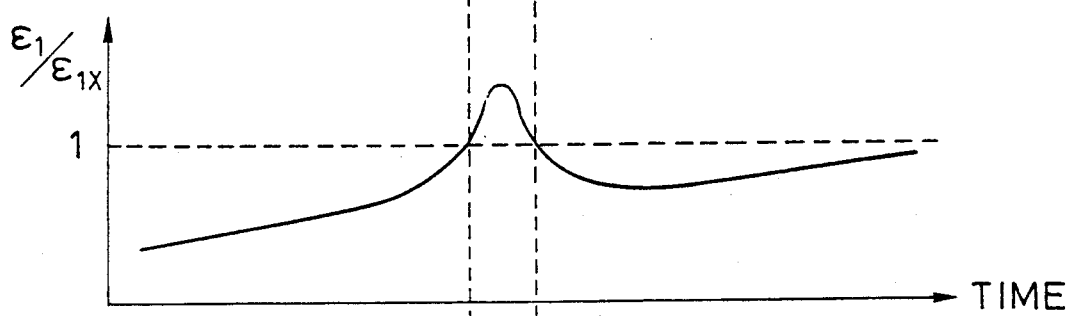
Figure 1C:
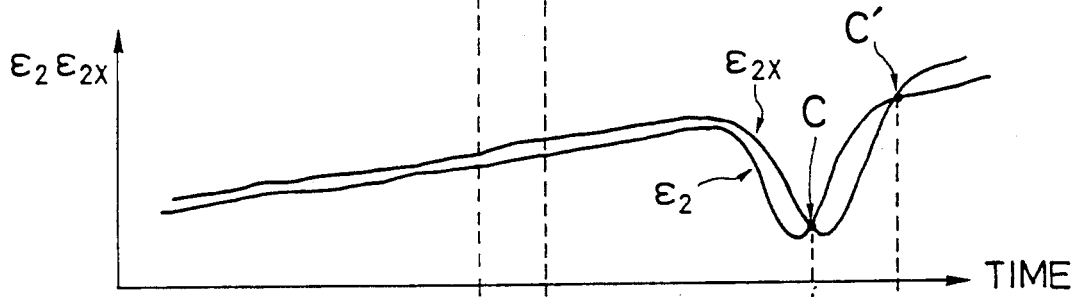
Figure 1D:
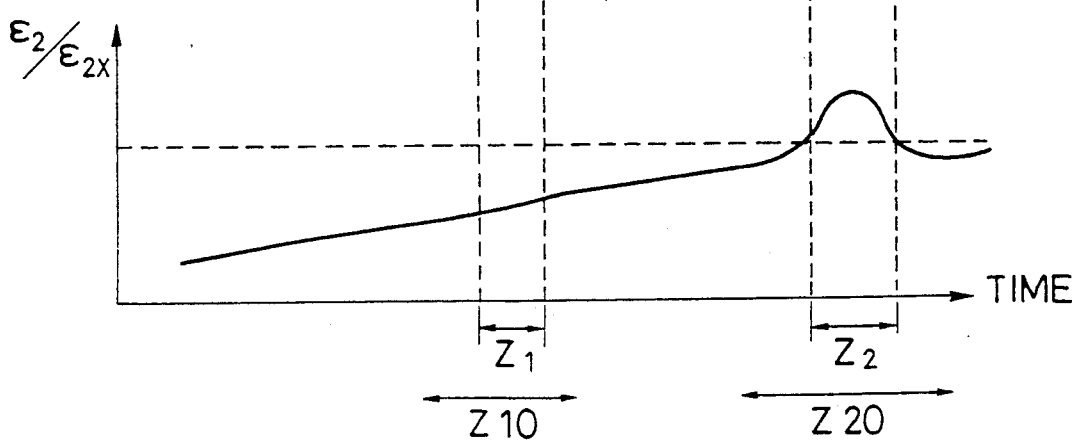
Figure 2:
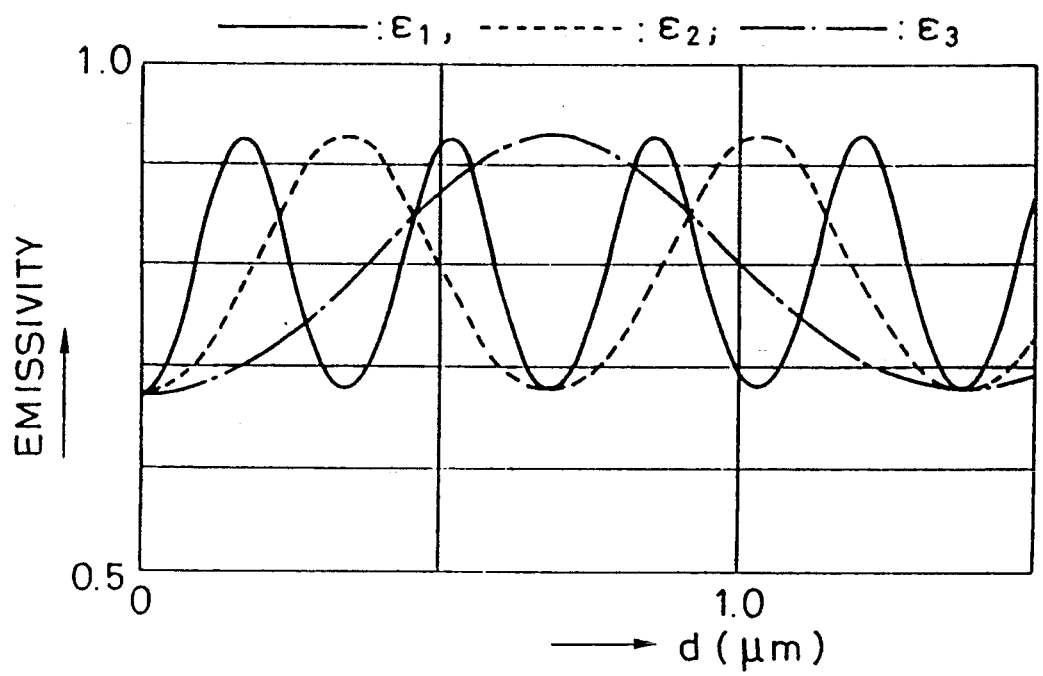
FIG. 2 is a diagram showing correlations between thickness of an oxide film and emissivities.
Figure 3A:
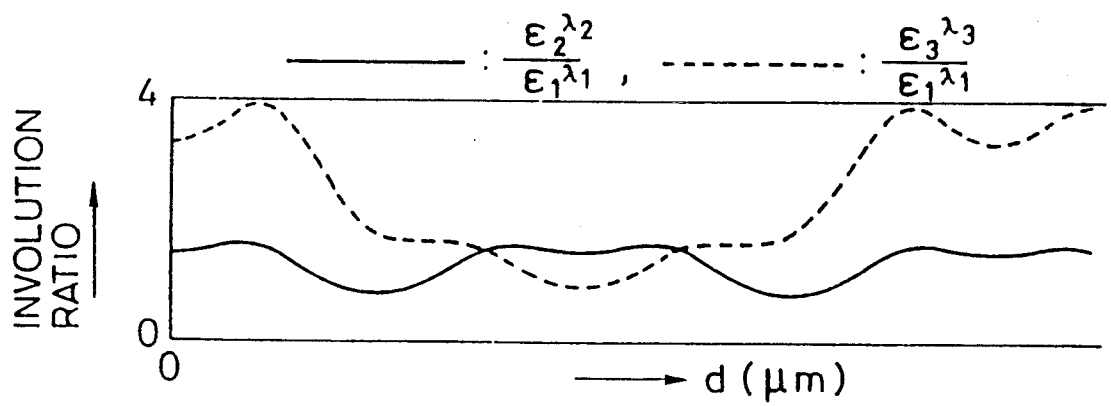
FIGS. 3A and 3B are diagrams showing correlations of oxide film thickness with emissivity involution ratios and emissivity ratios.
Figure 3B:
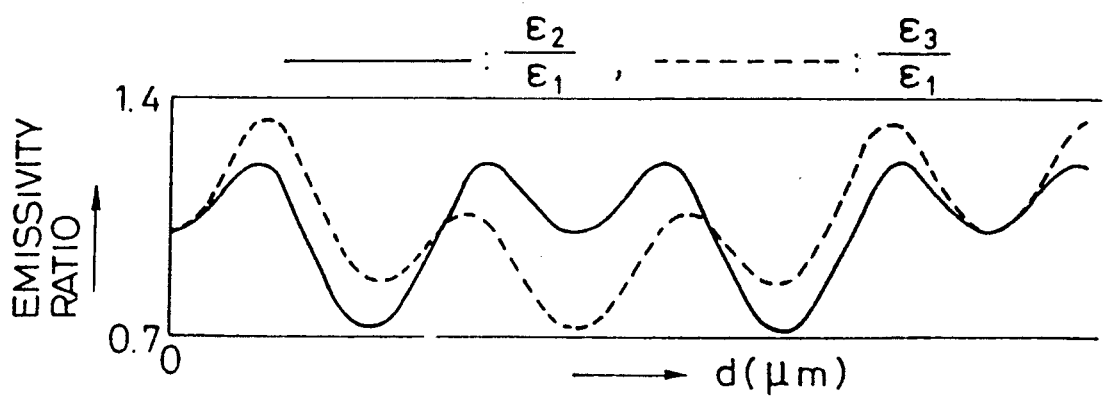
Figure 4:
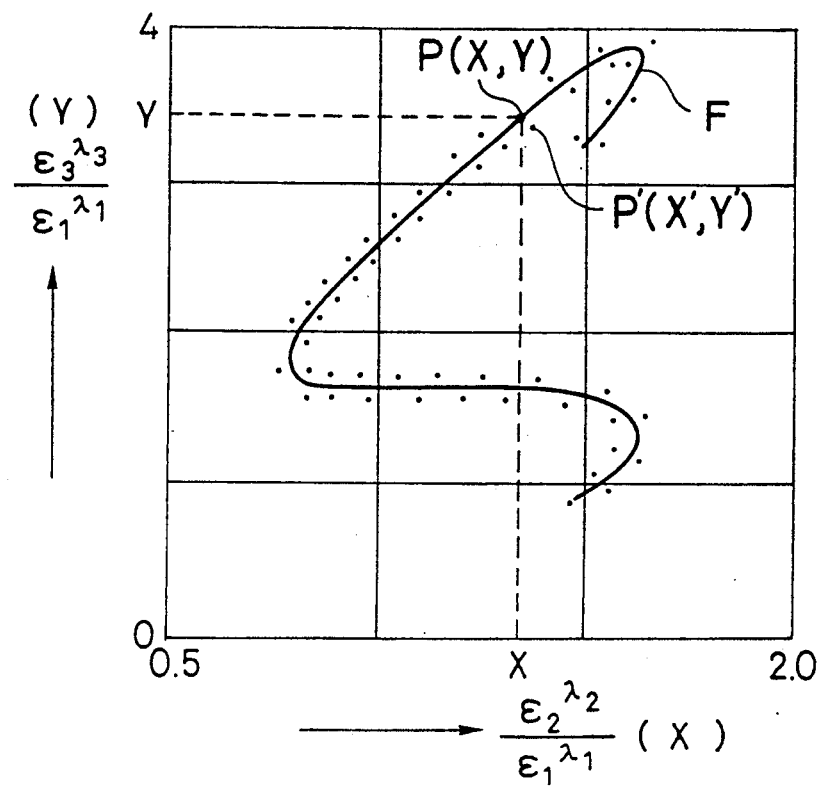
FIG. 4 is a diagram showing a correlation between two emissivity involution ratios obtained when three different wavelengths are used.
Figure 5:
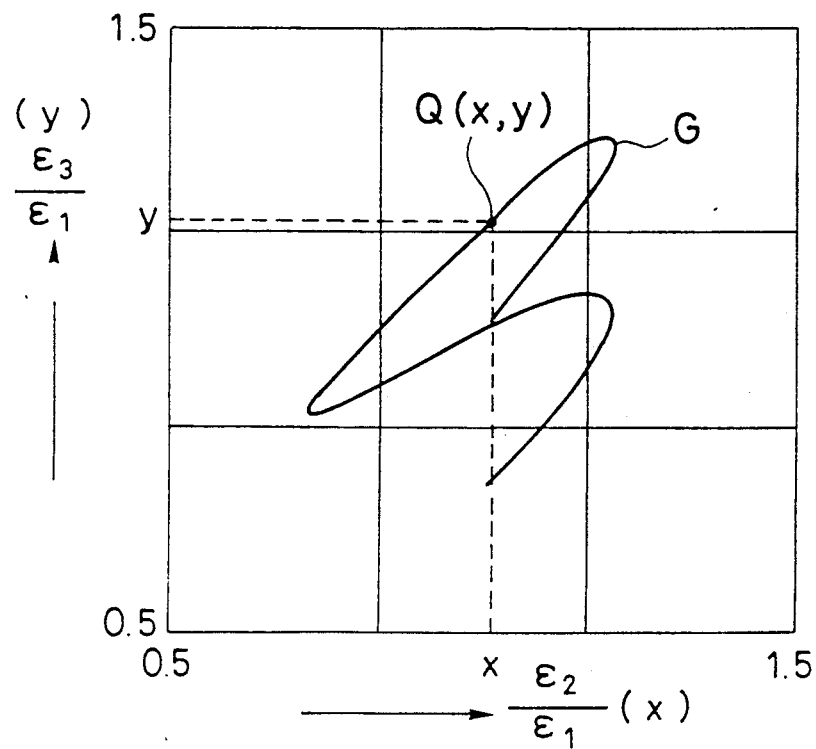
FIG. 5 is a diagram showing a correlation between two emissivity ratios obtained from the above correlation between two emissivity involution ratios.
Figure 8:
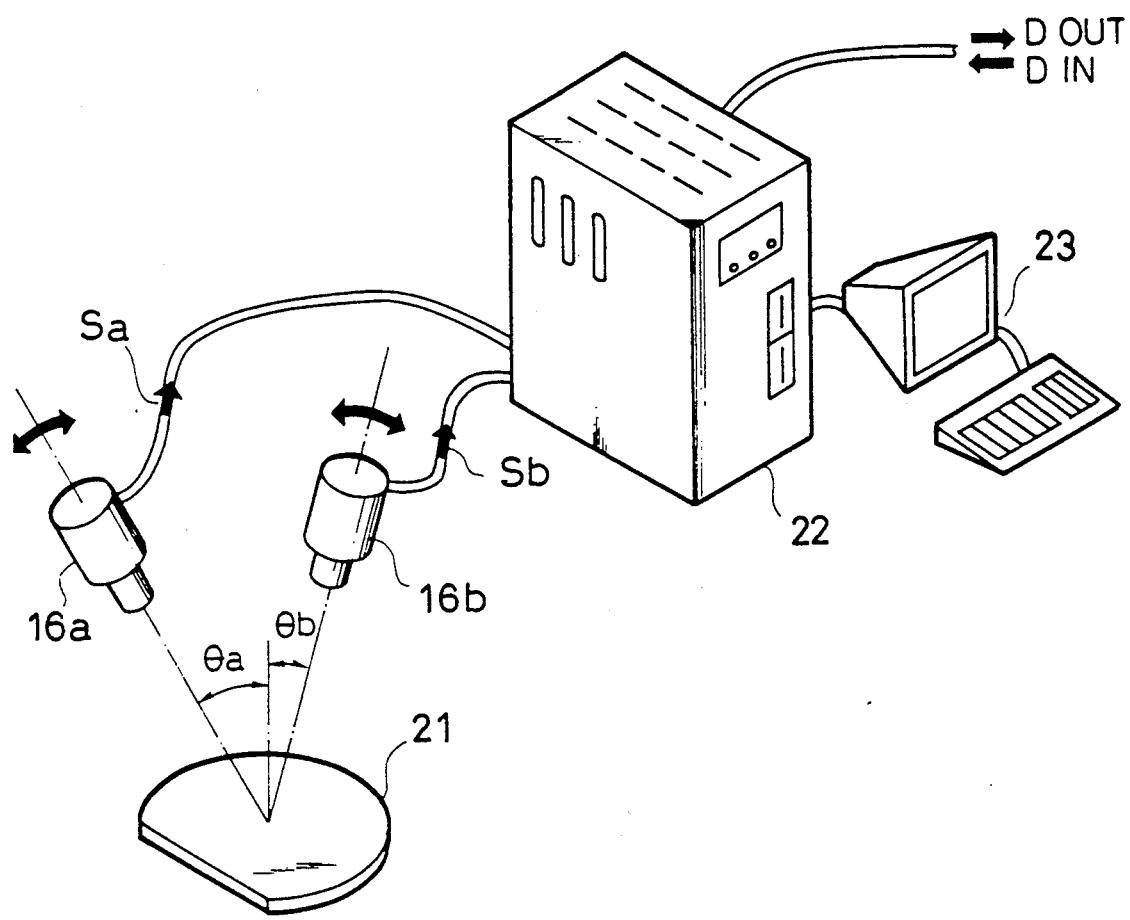
FIG. 8 is an arrangement drawing of a first embodiment of the present invention.

FIG. 8 shows a material surface condition measurement apparatus as a first embodiment of the present invention. This apparatus has radiation sensors 16a and 16b having the same measurement wavelength $\lambda$. Measurement angles $\theta_a$ and $\theta_b$ (angles formed between optical paths of detecting light of the radiation sensors 16a and 16b and normal to the material surface) of the radiation sensors 16a and 16b are adaptively changeable according to the differing materials in process (objects of measurement) 21 or differing processes.

Each part of this apparatus will first be described below.

Figure 9:
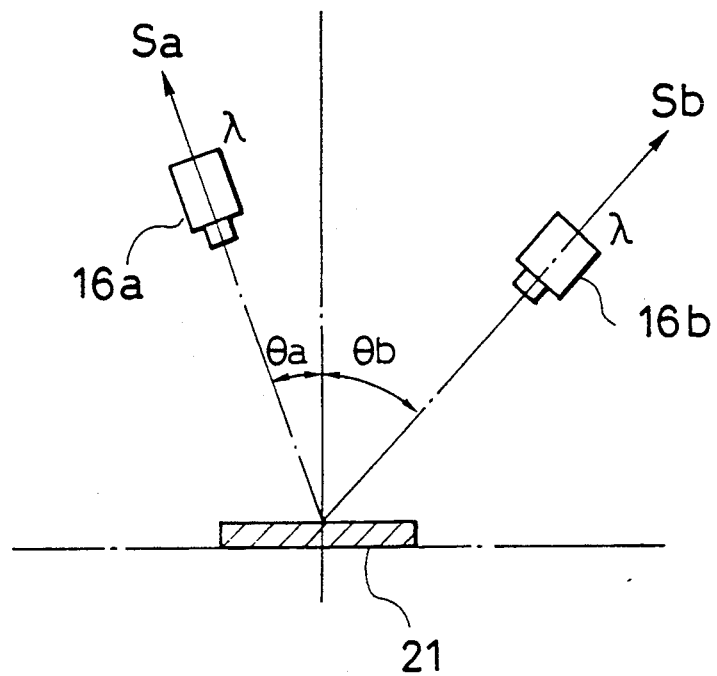
FIG. 9 is an arrangement drawing showing a radiation sensor in the first embodiment.

The radiation sensors 16a and 16b are disposed in such relative positions to the material in process 21 as to have different measurement angles $\theta_a$ and $\theta_b$ as shown in FIG. 9. The radiation sensors detect radiation energy of the radiation at the wavelength $\lambda$ from the material in process 21 and output brightness temperatures at the wavelength $\lambda$ as detection signals Sa and Sb. The radiation sensors use Si (detection wavelength $\lambda_1 = 1$ μm), Ge (detection wavelength $\lambda_2 = 1.6$ μm), PbS (detection wavelength $\lambda_3 = 2$ μm), PbSe (detection wavelength $\lambda_4 = 4$ μm), and the like as detection elements.

Figure 10:
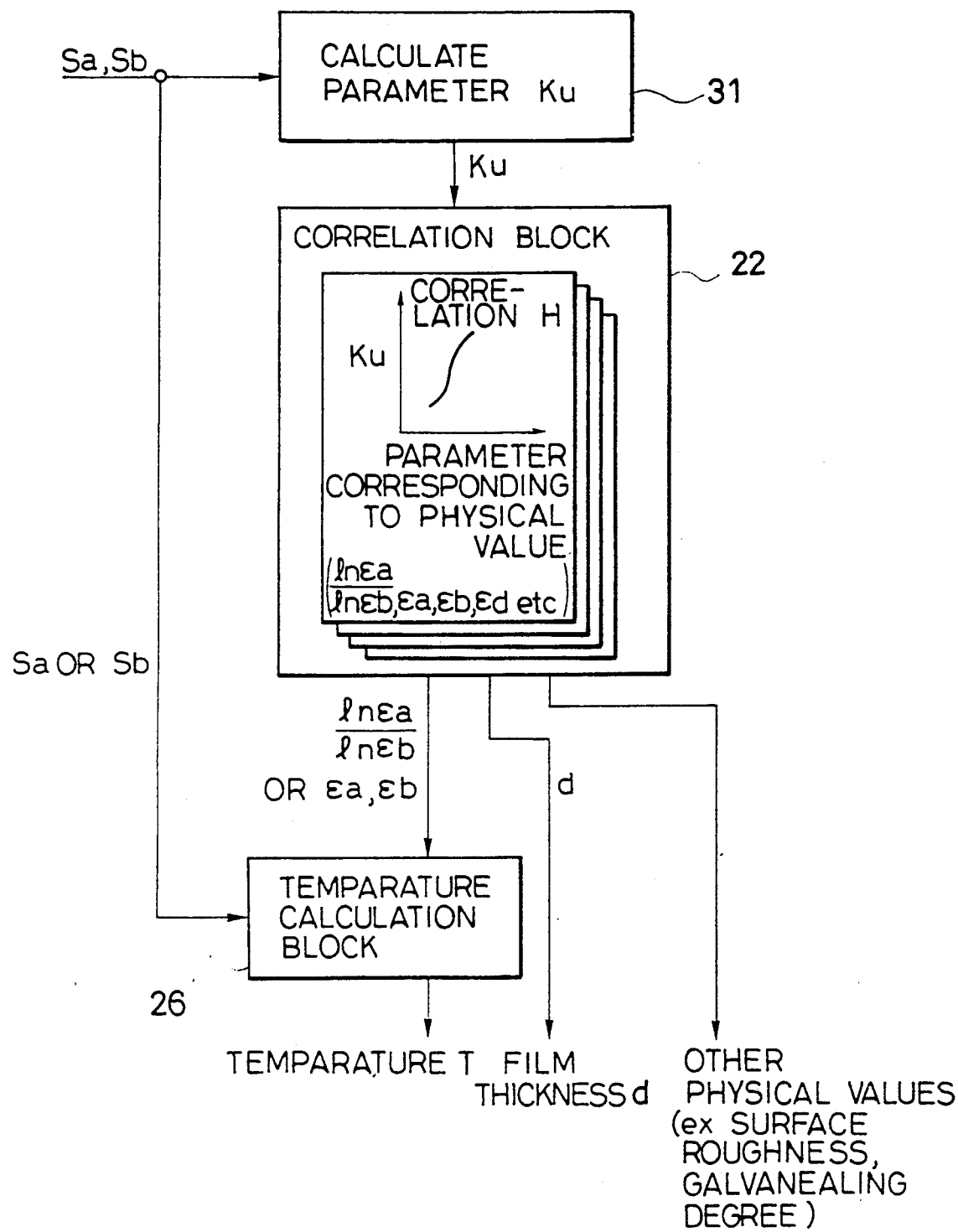
FIG. 10 is a block diagram of a control unit in the first embodiment.

A control unit 22 calculates the surface physical values or the temperature in the vicinity of the surface of the material in process 21 from the brightness temperatures Sa and Sb and exchanges data $D_{in}$ and $D_{out}$ including the measurement results with outside circuits. The control unit 22 has a parameter calculation block 31, a correlation block 22, and a temperature calculation block 26 as shown in FIG. 10.

The parameter calculation block 31 calculates the wavelength power of the emissivity ratio from the brightness temperatures Sa and Sb (the $\lambda$ power of $\epsilon_a/\epsilon_b$, where $\epsilon_a$ and $\epsilon_b$ represent emissivities at the measurement angles $\theta_a$ and $\theta_b$). Here, the wavelength power of the emissivity ratio is used as a parameter Ku, which is obtained by expression (8).

$$Ku = \exp[C_2\{(1/Sa) - (1/Sb)\}] \tag{8}$$

The correlation block 22 provides the correlation H between the parameter Ku and the surface physical values of the material in process and obtains, from the parameter Ku, amounts related to surface conditions of the material in process 21, (i.e., optical physical values, such as reflectivity and absorptivity, film thickness, surface roughness, degree of progress of galvannealing, etc.) on the material surface or parameters relating to the above enumerated values. The correlation H is given by conversion tables or numerical calculation according to experimental values or theoretical calculation.

Figure 11:
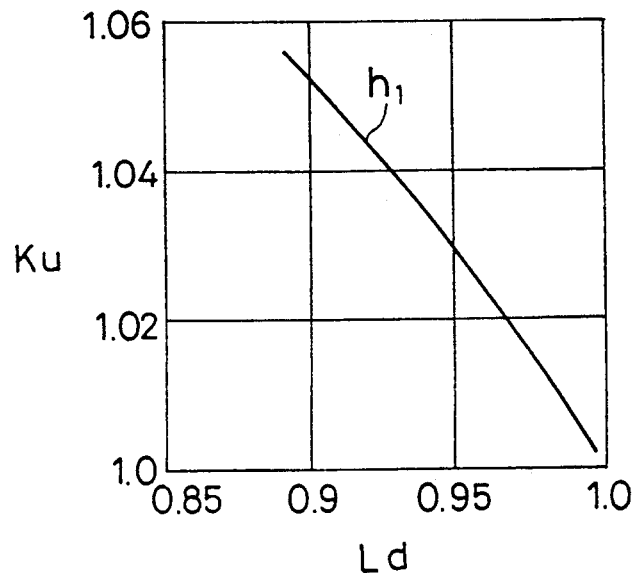
FIG. 11 is a graph showing a correlation $h_1$ when the material is silicon.
Figure 12:
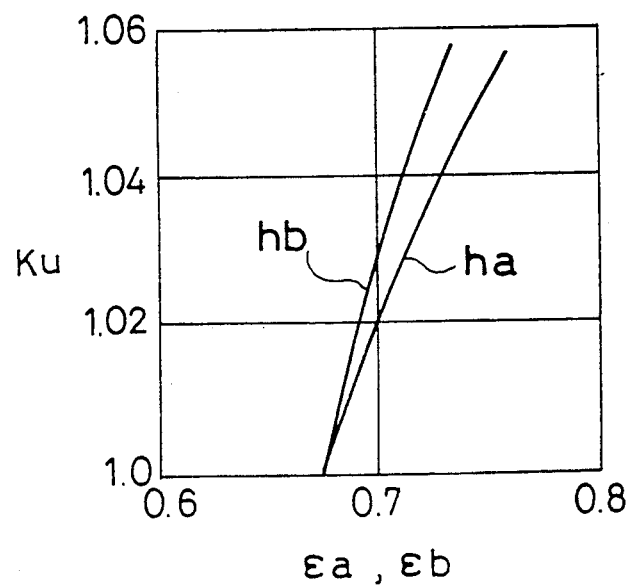
FIG. 12 is a graph showing correlations $h_a$ and $h_b$ when the material is silicon.
Figure 13:
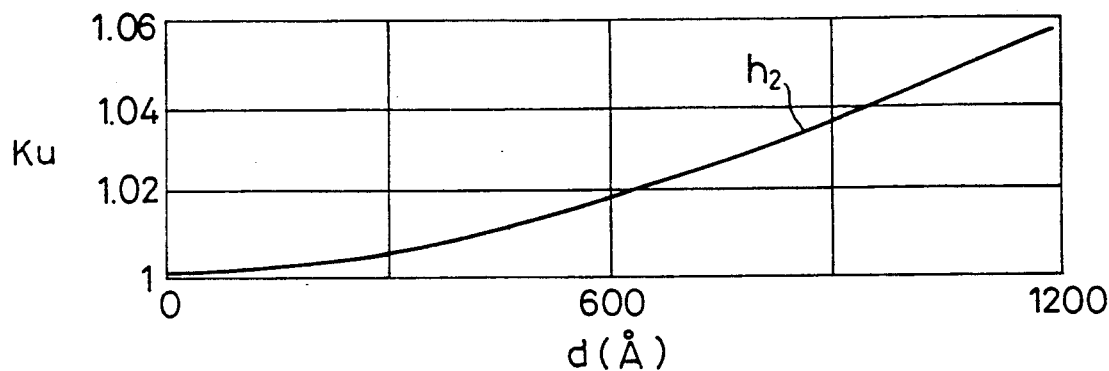
FIG. 13 is a graph showing a correlation $h_2$ when the material is silicon.

Examples given by theoretical calculation will be shown. FIG. 11 shows correlation $h_1$ between the parameter Ku and the logarithmic emissivity ratio ($\ln\epsilon_a/\ln\epsilon_b$) Ld, FIG. 12 shows correlations $h_a$ and $h_b$ between the parameter Ku and the emissivities $\epsilon_a$ and $\epsilon_b$. FIG. 13 shows correlation $h_2$ between the parameter Ku and the oxide film thickness d. These data are for when silicon is used as the material to be processed 21: the measurement wavelength $\lambda$ is set to 1.6 μm, and the measurement angles $\theta_a$ and $\theta_b$ are set to 0 degrees and 45 degrees, respectively.

For reference, variations of the emissivities $\epsilon_a$ and $\epsilon_b$ (FIG. 14) and a variation of the logarithmic emissivity ratio Ld (FIG. 15) are shown with respect to the oxide film thickness d.

Figure 16:
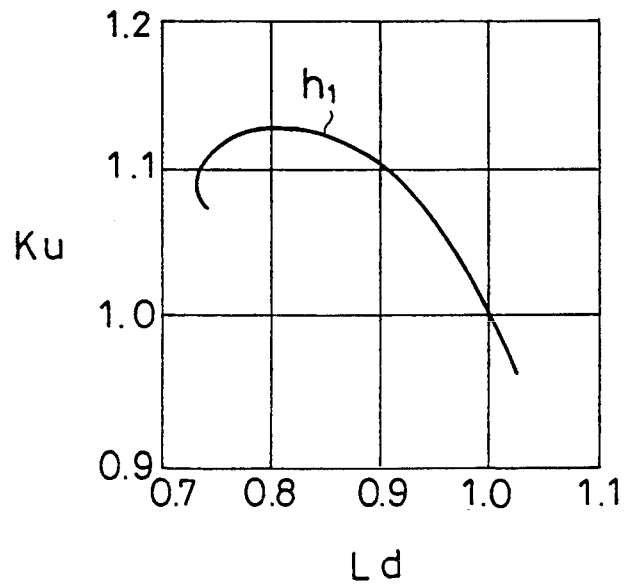
FIG. 16 is a graph showing a correlation $h_1$ when the material is iron.
Figure 17:
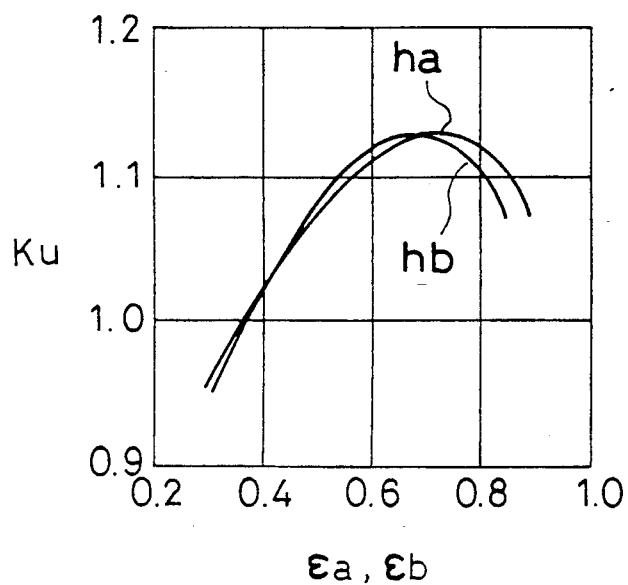
FIG. 17 is a graph showing correlations $h_a$ and $h_b$ when the material is iron.
Figure 18:
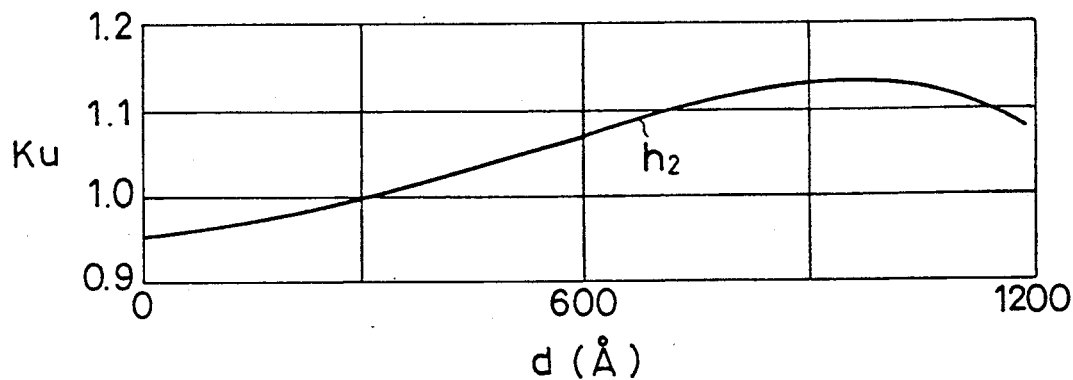
FIG. 18 is a graph showing a correlation $h_2$ when the material is iron.

FIGS. 16, 17 and 18 are illustrative of when iron is used as the material to be processed 21 (with other conditions kept the same as before). The correlation $h_1$ between the parameter Ku and the logarithmic emissivity ratio Ld is shown in FIG. 16. The correlations $h_a$ and $h_b$ between the parameter Ku and the emissivities $\epsilon_a$ and $\epsilon_b$ is shown in FIG. 17, and the correlation $h_2$ between the parameter Ku and the oxide film thickness d is shown in FIG. 18.

Figure 19:
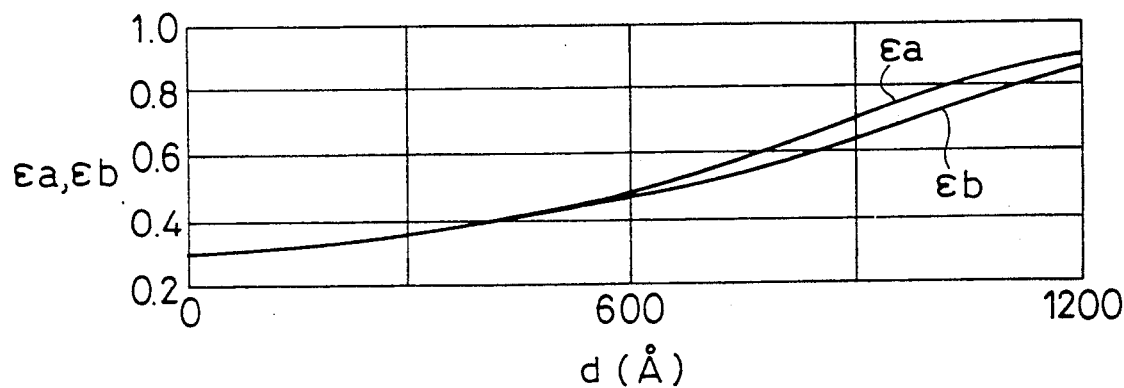
FIG. 19 is a graph showing variations of emissivities $\epsilon_a$ and $\epsilon_b$ when the material is iron.
Figure 20:
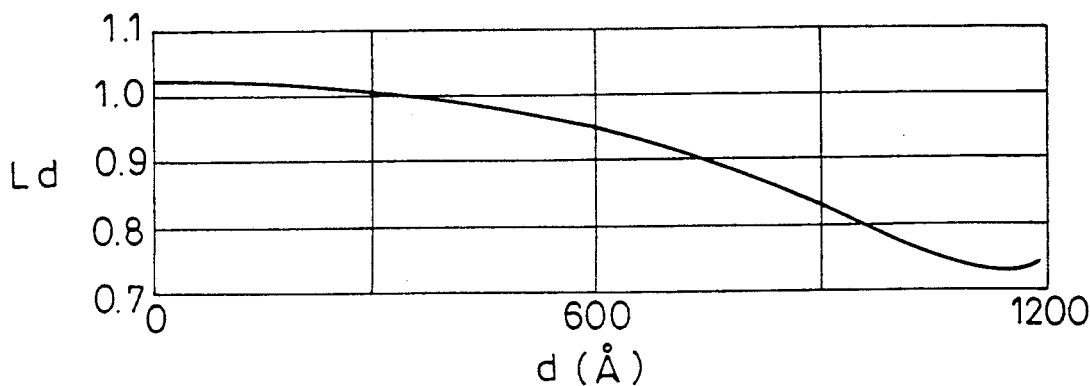
FIG. 20 is a graph showing a variation of logarithmic emissivity ratio Ld when the material is iron.

Variations of the emissivities $\epsilon_a$ and $\epsilon_b$ and a variation of the logarithmic emissivity ratio Ld with respect to the oxide film thickness d are shown in FIGS. 19 and 20.

The temperature calculation block 26 obtains the temperature T in the vicinity of the surface of the material in process 21 from the detection wavelength $\lambda$ and the brightness temperature Sa (or the brightness temperature Sb) using the emissivity $\epsilon_a$ or $\epsilon_b$, or the logarithmic emissivity ratio Ld. The temperature T, when the emissivity $\epsilon_a$ or $\epsilon_b$ is used, is obtained by calculation of expression (9a) or expression (9b). The temperature T, when the logarithmic emissivity ratio Ld is used, is obtained by calculation of expression (10).

$$T = \{Sa^{-1} + (\lambda/C_2)l\,n\epsilon\,a\}^{-1} \tag{9a}$$

$$T = \{Sb^{-1} + (\lambda/C_2)l\,n\epsilon\,b\}^{-1} \tag{9b}$$

$$T = (1 - Ld)/\{(1/Sa) - Ld\cdot(1/Sb)\} \tag{10}$$

The operation of the apparatus according to the first embodiment will be described below.

As described above, the spectroscopic emissivity $\epsilon$ of the material in process 21 is dependent on surface conditions. For example, when an oxide film is formed on the surface, it is known that light beams from the material in process 21 interfere with each other on account of reflection between the object of measurement and the oxide film, reflection between the oxide film and the air, etc. The spectroscopic emissivity $\epsilon$ also varies according to reflectivities of such matters, oxide film thickness d, complex index of refraction of the oxide film, wavelength, angle of emission of the light (i.e., measurement angle), angle of polarization, etc. This causes the errors produced in single-color and two-color radiation thermometers as described above. The emissivity involution ratio also varies. The spectroscopic emissivity $\epsilon$ can be expressed as a function of wavelength $\lambda$ and measurement angle or polarization angle $\theta$ as shown by the following expression (11).

$$\epsilon = \epsilon [\lambda, \theta] \tag{11}$$

Figure 14:
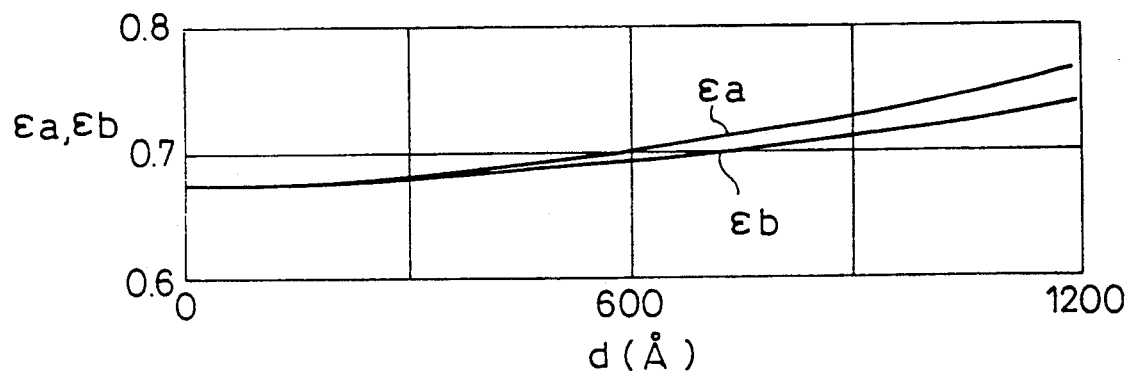
FIG. 14 is a graph showing variations of emissivities $\epsilon_a$ and $\epsilon_b$ when the material is silicon.
Figure 15:
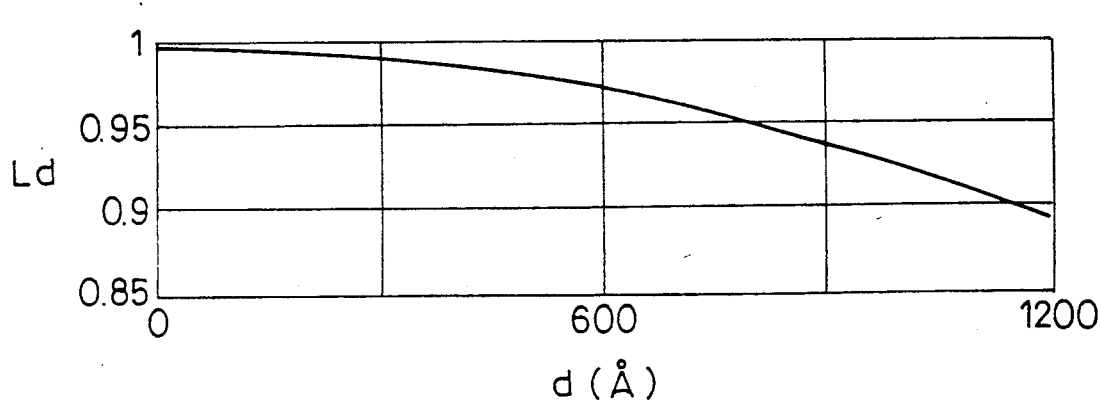
FIG. 15 is a graph showing a variation of logarithmic emissivity ratio Ld when the material is silicon.

When the material in process 21 is silicon and the measurement wavelength $\lambda$ is 1.6 μm, variations of the emissivities $\epsilon_a$ and $\epsilon_b$ detected by the radiation sensors 16a and 16b become as shown in FIG. 14, for example. The brightness temperatures Sa and Sb from the radiation sensors 16a and 16b are output to the control unit 22 and the parameter Ku is calculated from the brightness temperatures Sa and Sb by the parameter calculation block 31. The parameter Ku represents the wavelength power of the emissivity ratio. By substituting the detection wavelength $\lambda$ into the above described expressions (1) and (2), expressions (12a) and (12b) are obtained. By eliminating the temperature T from these, expression (13) is obtained. If "$\epsilon_a = \epsilon_b$", the value of the expression (13) becomes "1". However, since the measurement angles $\theta_a$ and $\theta_b$ are 0 degrees and 45 degrees, respectively, the measurement angles are different and the emissivities $\epsilon_a$ and $\epsilon_b$ are different values. Therefore, the parameter Ku does not become "1", but varies with the change in the surface conditions of the material in process 21.

$$\epsilon_a = \exp\{(C_2/\lambda)\{(1/T)-(1/Sa)\}\} \tag{12a}$$

$$\epsilon_b = \exp\{(C_2/\lambda)\{(1/T)-(1/Sb)\}\} \tag{12b}$$

$$(\epsilon_b/\epsilon_a)^\lambda = \exp[C_2\{(1/Sa)-(1/Sb)\}](=Ku) \tag{13}$$

In the correlation block 22, surface physical values are obtained from the parameter Ku, i.e., the oxide film thickness d is obtained using the correlation $h_2$ (FIG. 13). Additionally, the logarithmic emissivity ratio Ld is obtained using the correlation $h_1$ (FIG. 11), and the emissivities $\epsilon_a$ and $\epsilon_b$ are obtained using the correlations $h_a$ and $h_b$ (FIG. 12). Other surface physical values can be obtained using the correlation H for the physical value.

In the temperature calculation block 26, the temperature T is obtained through calculation of the expression (9a), (9b), the expression (10) made using the emissivity $\epsilon_a$ or $\epsilon_b$, or the logarithmic emissivity ratio Ld obtained in the correlation block 22. These expressions are obtained by transforming expressions (12a) and (12b).

When iron is used as the material to be processed 21, FIGS. 16 to 18 are used as the correlation $h_1$, correlations $h_a$ and $h_b$, and correlation $h_2$. By having the same operations as when silicon is used, except that variations of the emissivities $\epsilon_a$, $\epsilon_b$ and the variations of the logarithmic emissivity ratio Ld are different as shown in FIG. 19 and FIG. 20, the temperature T in the vicinity of the material in process 21, the oxide film thickness d, and other physical values can be obtained.

In the present embodiment, as described above, physical values or parameters corresponding to physical values (such as the logarithmic ratio Ld) can be obtained using the correlation between the parameter Ku and the material surface physical values without making repeated calculations. Hence, high speed processing can be achieved because operations are performed fast and measurements can be finished in a short time.

Since the radiation sensors 16a and 16b have the same measurement wavelength $\lambda$, the temperature measurement range becomes wider. For example, a single-wavelength thermometer with a silicon detection element can measure the temperature up to 600° C. A single-wavelength thermometer with a germanium detection element can measure the temperature up to 400° C. However, a two-wavelength type thermometer using the above two detection elements can only measure the temperature up to 400° C. When a two-color thermometer has the same measurement wavelength $\lambda$, its temperature measurement range is not lowered by the use of the element with a lower temperature measurement range.

Figure 21:
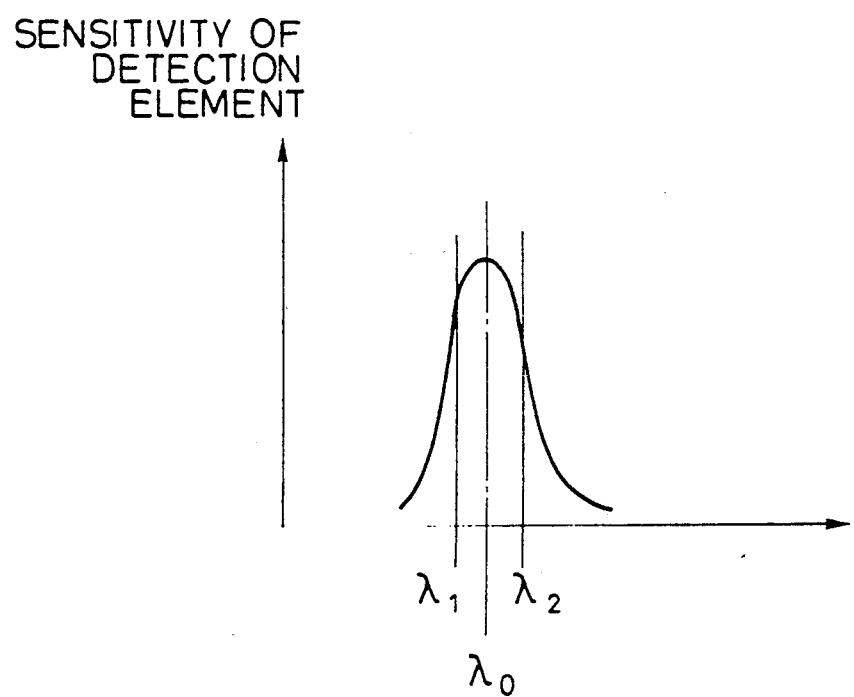
FIG. 21 is a characteristic curve of spectral sensitivity of a detection element.

A nearby two-wavelength type thermometer uses similar detection elements and makes detection using two wavelengths in the vicinity of the center wavelength of the detection elements (refer to FIG. 21). One, for example, uses a germanium detection element and has detection wavelengths of 1.55 μm and 1.65 μm. With such a thermometer, none of the problems described above occur because this type of thermometer uses equal detection elements. However, its sensitivity is lowered and its accuracy is decreased. The sensitivity of a single-wavelength type thermometer is obtained by partially differentiating the expression for obtaining the temperature (expression (14)). The sensitivity of a two wavelength type thermometer can be obtained in similar manner but it is approximately given by expression (15).

$$n = C_2/(\lambda T) \quad (n \text{ is a sensitivity}) \tag{14}$$

$$n_{12} = |n_1 - n_2| \tag{15}$$

Although a decrease in sensitivity is common in two-wavelength type thermometers, there is no sensitivity decrease in the present embodiment because it makes measurements with equal wavelengths $\lambda$.

Now, a second embodiment of the present invention will be described.

Figure 22:
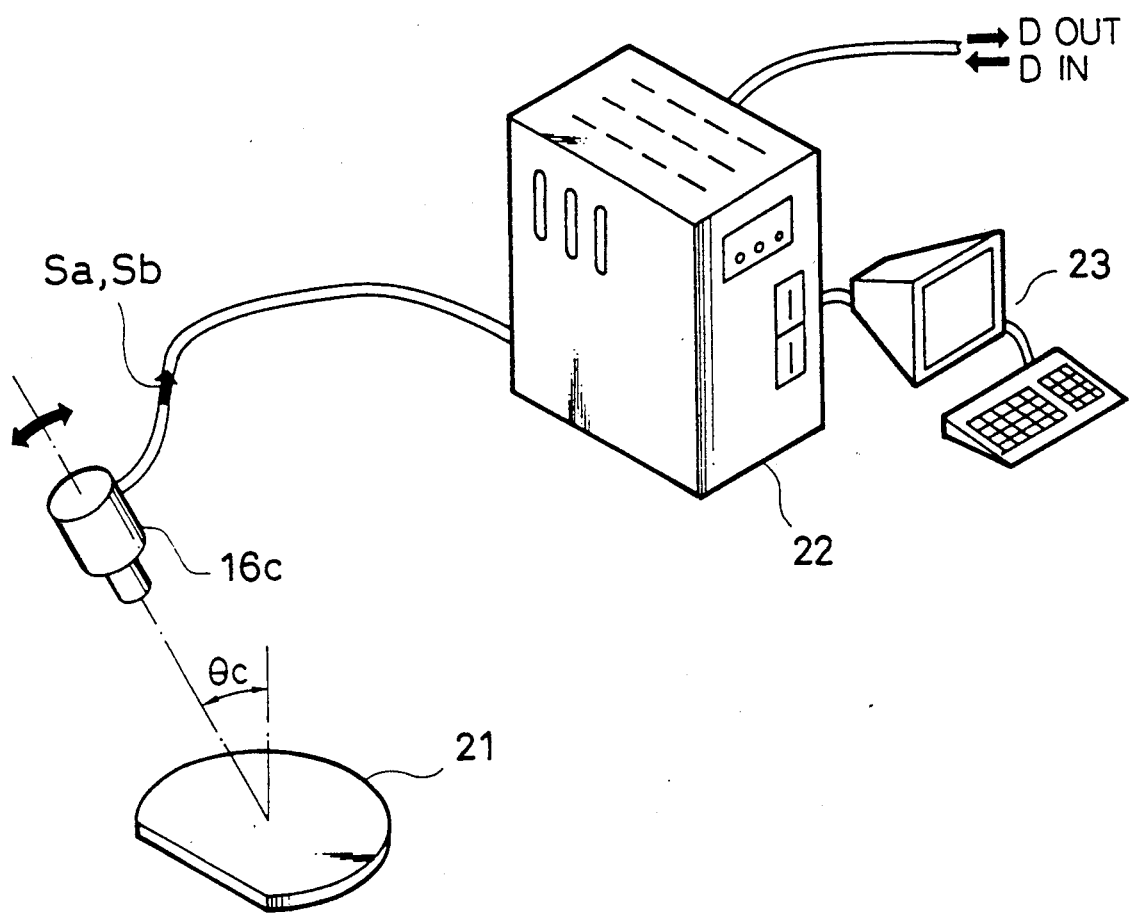
FIG. 22 is an arrangement drawing of a second embodiment of the present invention.

The second embodiment has been made in view of the fact that the spectroscopic emissivity $\epsilon$ changes with angles of polarization. This embodiment has been arranged to measure surface conditions by detecting light beams having different polarization angles instead of different measurement angles as in the previous embodiment. Its overall arrangement is shown in FIG. 22.

Figure 23:
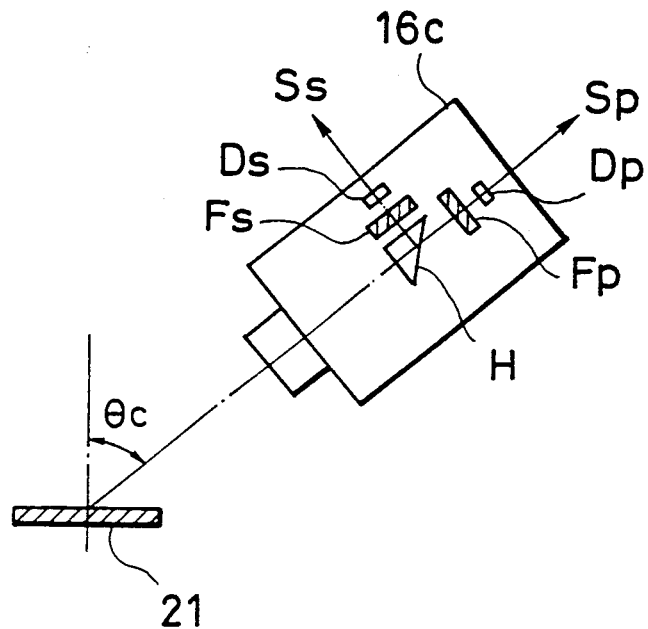
FIG. 23 is an arrangement drawing showing a radiation sensor in the second embodiment.

The radiation sensor 16c of this apparatus is positioned such that its measurement angle $\theta_c$ is 45 degrees. It detects light beams with a wavelength $\lambda$ (1.6 μm) and different polarization angles (P polarization beam and S polarization beam). The radiation sensor 16c outputs them as detection signals Ss and Sp. FIG. 23 shows its detailed structure. In this radiation sensor 16c, the light from the material in process 21 is split by a half mirror (beam splitter) H. One of the split light beams passes through an S polarizing filter Fs and is detected by a detection element Ds. It is then output therefrom as the detection signal Ss. The other one of the split light beams passes through a P polarizing filter Fp, is detected by a detection element Dp and is output as a detection signal Sp.

Figure 24:
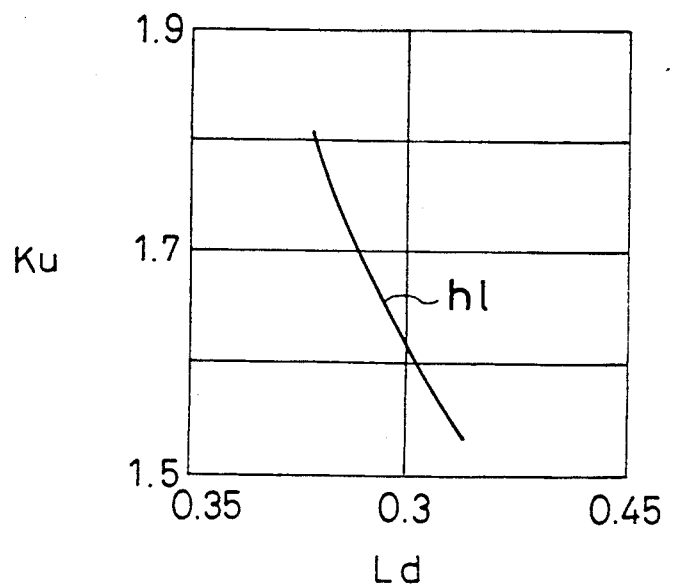
FIG. 24 is a graph showing a correlation $h_1$ when the material is silicon.
Figure 25:
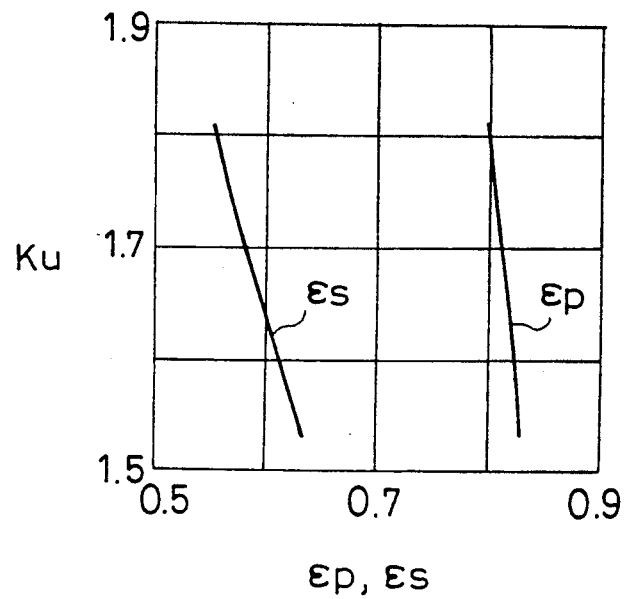
FIG. 25 is a graph showing correlations $h_a$ and $h_b$ when the material is silicon.
Figure 26:
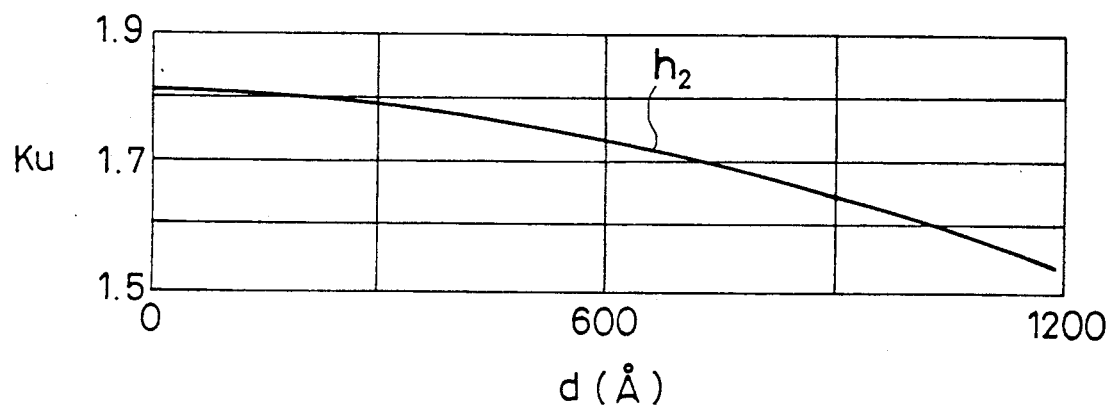
FIG. 26 is a graph showing a correlation $h_2$ when the material is silicon.
Figure 27:
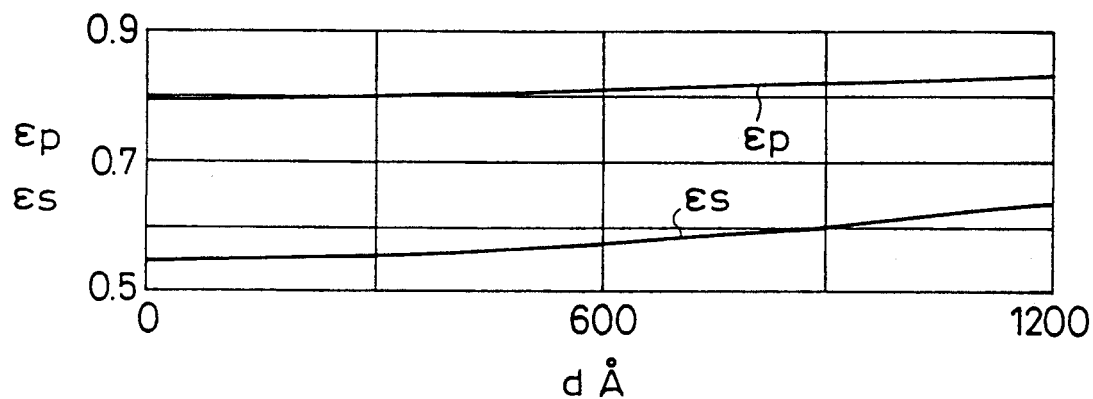
FIG. 27 is a graph showing variations of emissivities $\epsilon_a$ and $\epsilon_b$ when the material is silicon.
Figure 28:
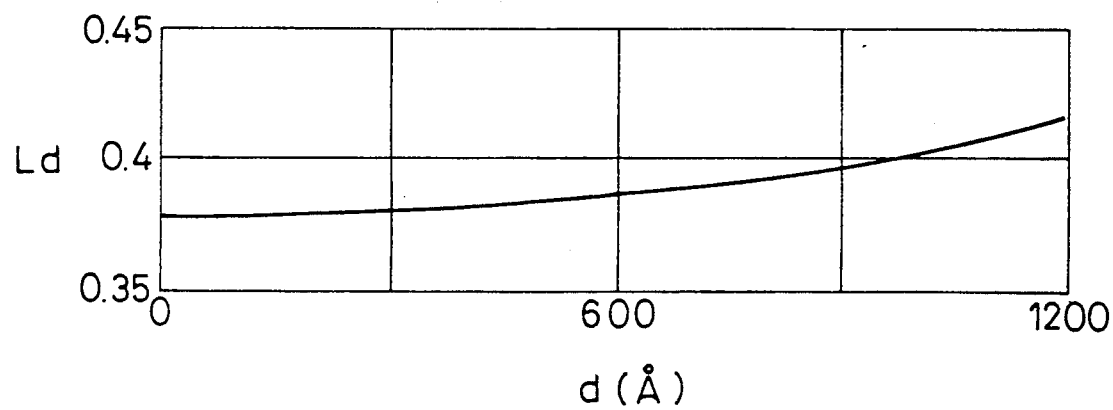
FIG. 28 is a graph showing a variation of logarithmic emissivity ratio Ld when material is silicon.
Figure 29:
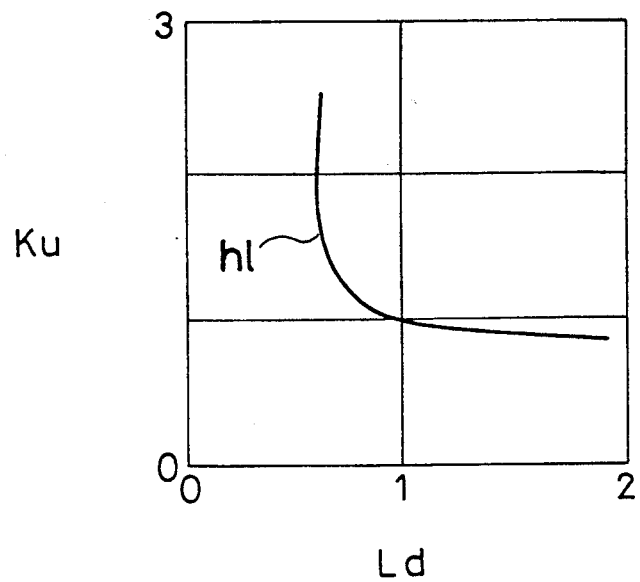
FIG. 29 is a graph showing a correlation $h_1$ when the material is iron.
Figure 30:
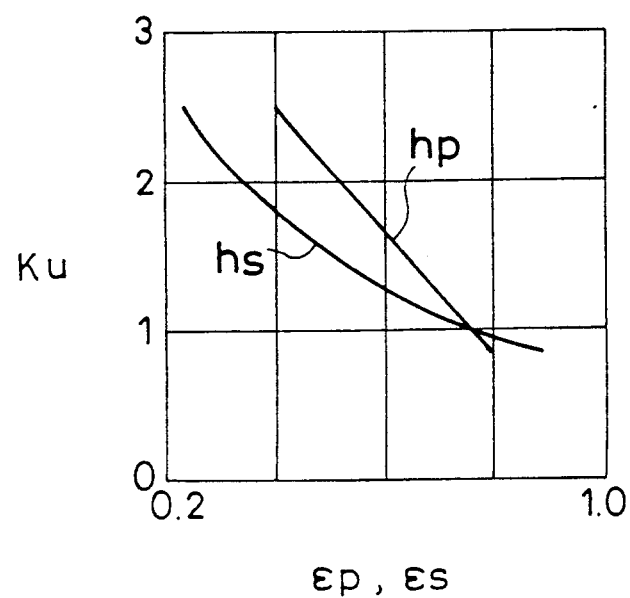
FIG. 30 is a graph showing a correlations $h_a$ and $h_b$ when the material is iron.
Figure 31:
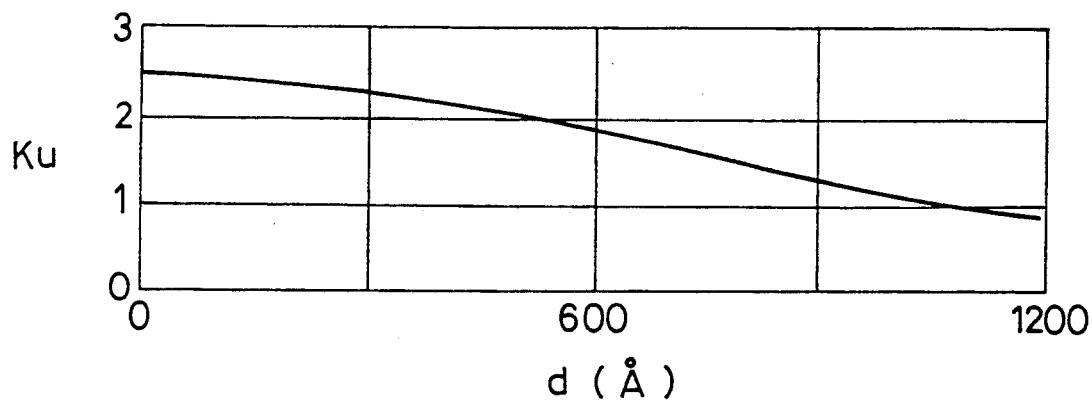
FIG. 31 is a graph showing a correlation $h_2$ when the material is iron.
Figure 32:
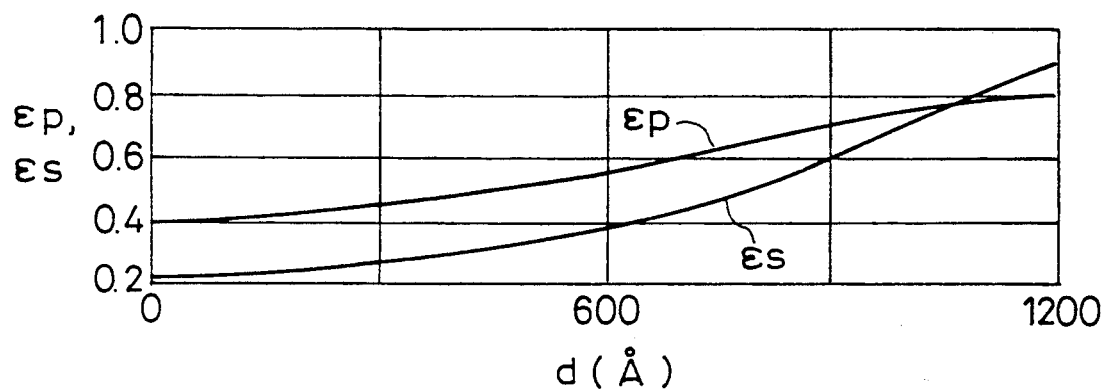
FIG. 32 is a graph showing variations of emissivities $\epsilon_a$ and $\epsilon_b$ when the material is iron.
Figure 33:
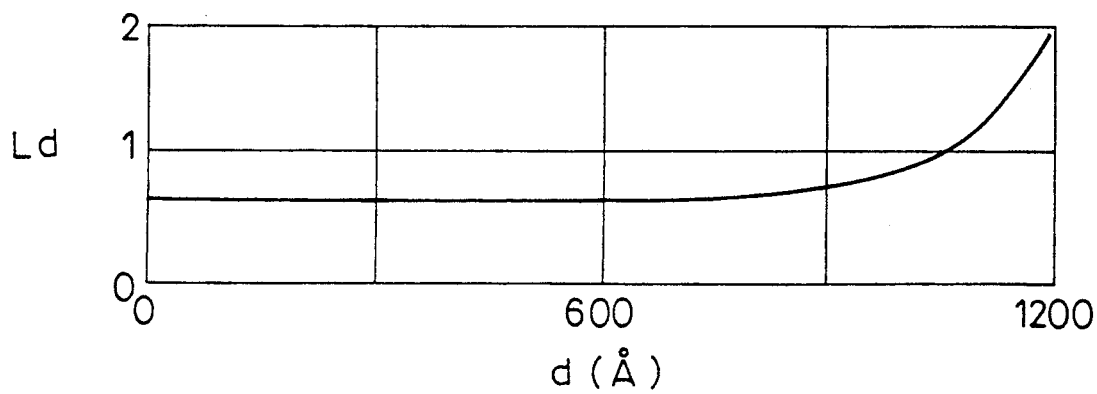
FIG. 33 is a graph showing a variation of logarithmic emissivity ratio Ld when the material is iron.
Figure 34:
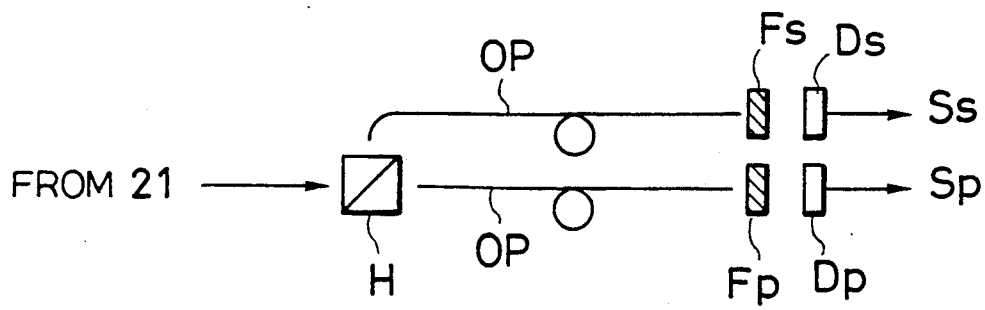
FIG. 34 is an arrangement drawing of a modified example of a radiation sensor.
Figure 35:
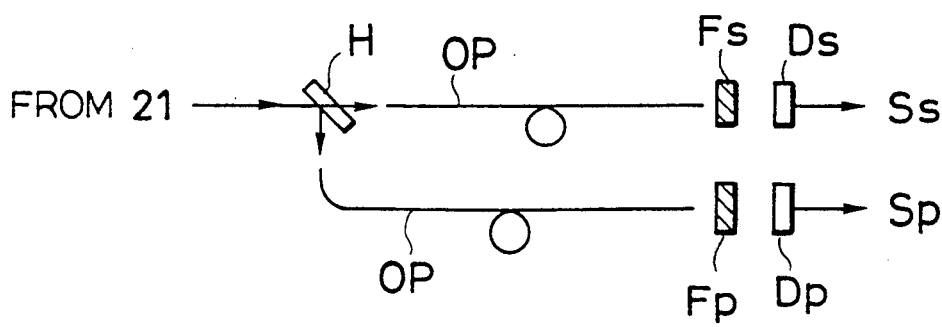
FIG. 35 is an arrangement drawing of a modified example of a radiation sensor.
Figure 36:
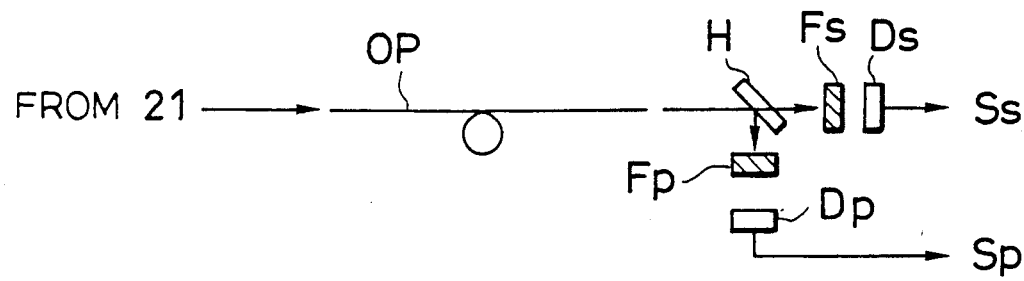
FIG. 36 is an arrangement drawing of a modified example of a radiation sensor.
Figure 37:
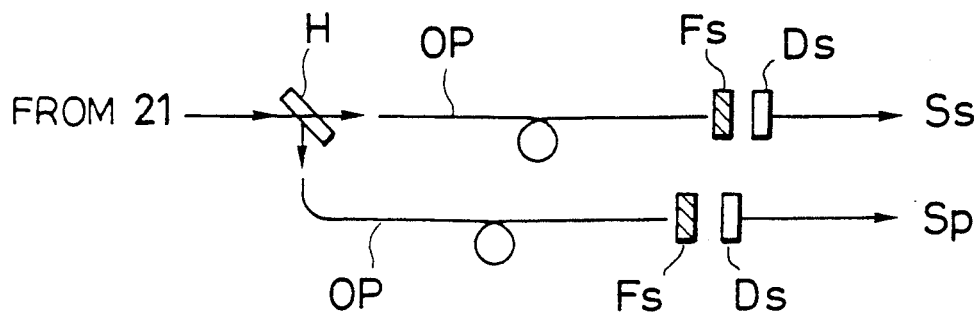
FIG. 37 is an arrangement drawing of a modified example of a radiation sensor.

The control unit 22 used in this embodiment is the same as that used in the above-described embodiment (FIG. 10), but it is different in that it uses the detection signals Ss and Sp instead of the brightness temperatures Sa and Sb. Hence, Ss and Sp, instead of Sa and Sb, are used in the expressions used in the elements within the control unit 22. Further, when the material to be processed 21 is silicon, the correlation block 22 obtains the logarithmic emissivity ratio Ld, emissivities $\epsilon_s$ and $\epsilon_p$, and oxide film thickness d by using the correlation $h_1$, correlations $h_s$ and $h_p$, and correlation $h_2$ shown in FIG. 24 to FIG. 26 instead of the correlation $h_1$, correlations $h_a$ and $h_b$, and correlation $h_2$ used in the previous embodiment. Correlations with other surface physical values are changed according to different values the parameter Ku. FIG. 27 and FIG. 28 show variations of the emissivities $\epsilon_s$ and $\epsilon_p$ and a variation of the logarithmic emissivity ratio Ld with respect to the oxide film thickness d. When the material to be processed 21 is iron (with other conditions the same), the logarithmic emissivity ratio Ld, emissivities $\epsilon_s$ and $\epsilon_p$, and oxide film thickness d are obtained using the correlation $h_1$, correlations $h_s$ and $h_p$, and correlation $h_2$ shown in FIG. 29 to FIG. 31. Correlations with other surface values are similarly changed. FIG. 32 and FIG. 33 show variations of the emissivities $\epsilon_s$ and $\epsilon_p$ and a variation of the logarithmic emissivity ratio Ld with respect to the oxide film thickness d.

In the present apparatus, the temperature T in the vicinity of the surface of the material in process 21, the oxide film thickness d, and other surface physical values are obtained using the previous embodiment, only differing in that a different value of parameter Ku is used. The advantages obtained from the present apparatus are also the same as obtained in the previous embodiment.

The present invention is not limited to the above-described embodiment but various modifications are possible.

For example, although the radiation sensor 16c is arranged as shown in FIG. 23 in the second embodiment, optical fibers OP may be used as shown in FIG. 34 to FIG. 37. Similarly to FIG. 23, in these diagrams, H denotes a beam splitter (half mirror), Ds and Dp denote detection elements for two polarization angles, and Fs and Fp denote polarizing filters. The polarization filters Fs and Fp can be eliminated if a polarization plane maintaining filter is used in the optical fiber OP. In such a case, it is possible to change the measurement angle by arranging one portion of the radiation sensor 16c to be fixed in place and another portion to be movable.

Figure 38:
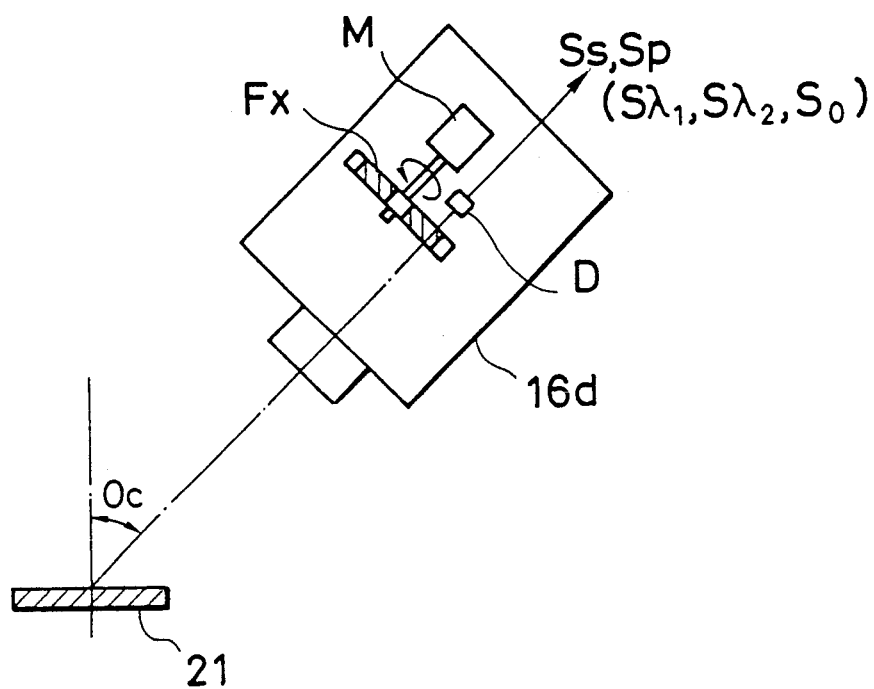
FIG. 38 is an arrangement drawing of a modified example of a radiation sensor.
Figure 39:
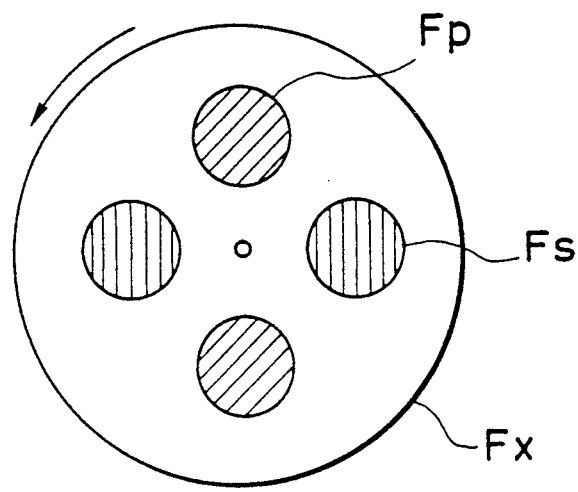
FIG. 39 is an arrangement drawing of a filter module of the radiation sensor of FIG. 38.

Further, by arranging the polarizing filters Fs and Fp to be switchable as shown in FIG. 38, the two detection elements can be reduced to one detection element D. The filter module Fx is provided with S polarization filters Fs and P polarization filters Fp as shown in FIG. 39. The polarization filters Fs and Fp are switched when the module Fx is rotated by a motor M. At this time, the detection signal Ss and Sp are alternately output and the parameter Ku is obtained from these signals.

Figure 40:
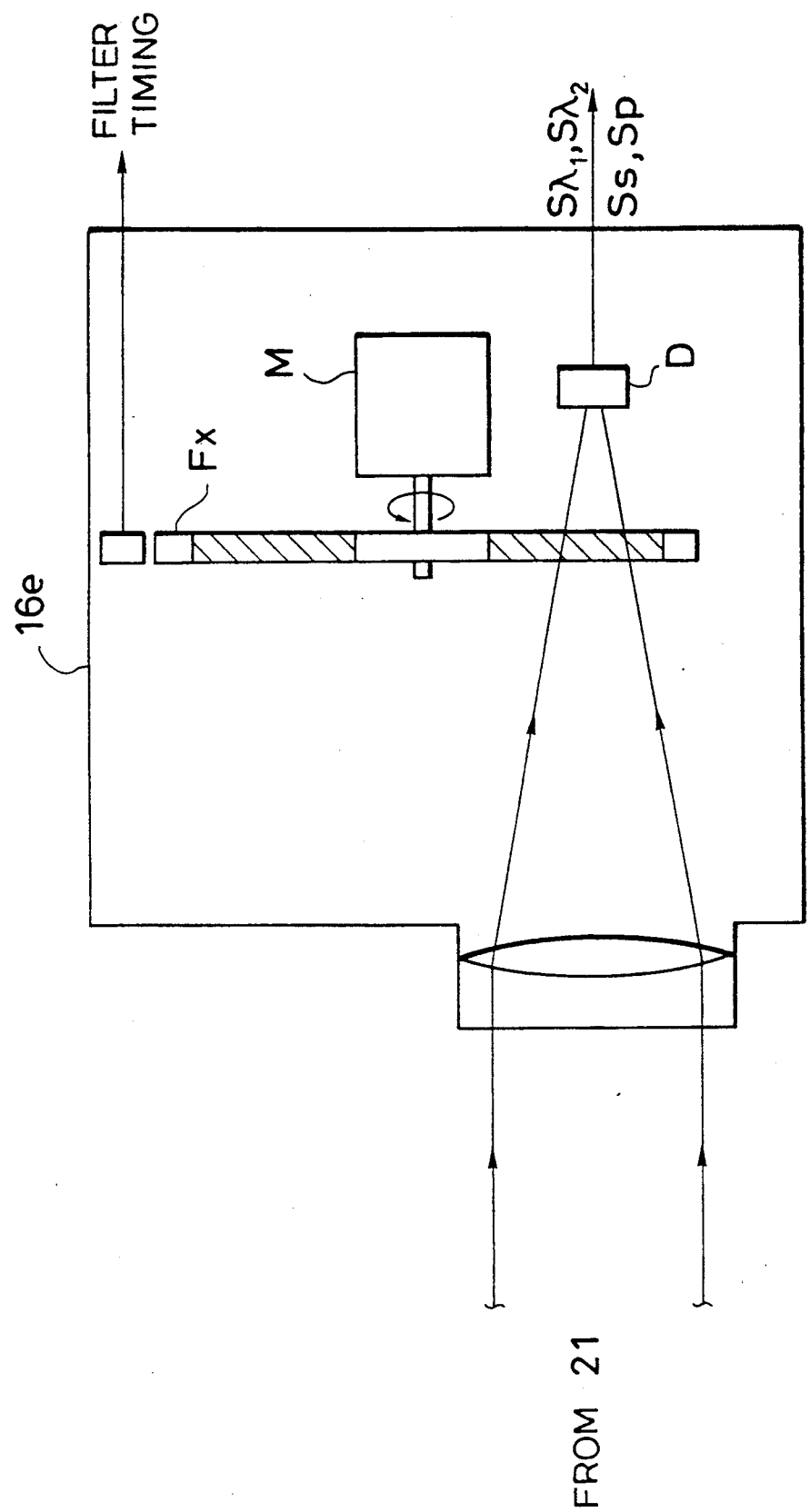
FIG. 40 is an arrangement drawing of a modified example of a radiation sensor.

It is also possible to combine a brightness signal So not dependent on a polarization angle and a polarization brightness signal (Ss or Sp). In this case, referring to FIG. 40, the sensor can be realized by keeping one or more of the four filters Fs and Fp as they are and arranging others to be mere holes. Since the brightness signal So includes a light wave with a polarization angle other than that of the polarization brightness signal, the same performance can be obtained as that from the above-described embodiment.

Figure 41:
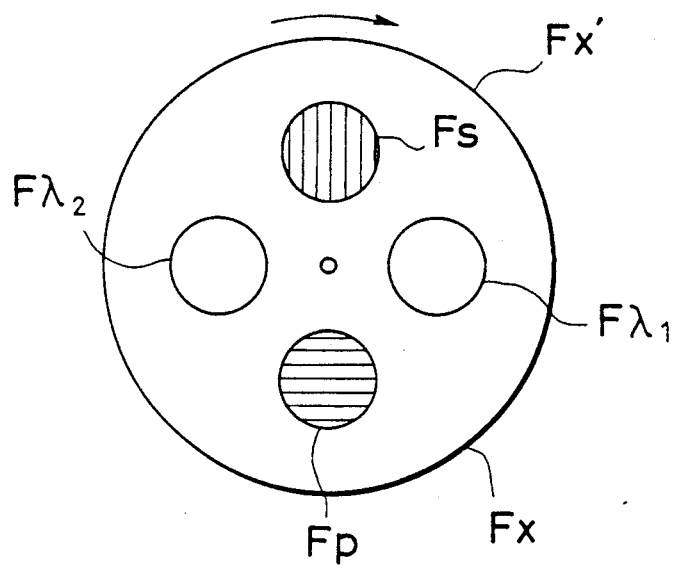
FIG. 41 is an arrangement drawing of a filter module of a modified example.

Further, as shown in FIG. 41, the filter module Fx can be additionally provided with spectroscopic filters $F\lambda_1$ and $F\lambda_2$ so that signals with different wavelengths $S\lambda_1$ and $S\lambda_2$ are obtained. Thus, the apparatus has a hybrid configuration with a two-wavelength type thermometer. Since, in general, a detection element has a spectroscopic sensitivity as shown in FIG. 21, two-wavelength signals $S\lambda_1$, $S\lambda_2$ and polarized light signals Ss, Sp are obtained by the spectroscopic filters $F\lambda_1$, $F\lambda_2$.

Although the wavelength power of the emissivity ratio has so far been used as the parameter Ku, the same performance can be obtained if another arithmetically equivalent parameter is used. Some examples are shown in Table 1 (B and C in the table) by transforming both sides of expression (8) (A in the table). For example, the difference between inverse numbers of the brightness signals shown in C of the table, "1/Sa − 1/Sb", can be used.

TABLE 1

|   | Left side | Right Side |
|---|---|---|
| A | $(\epsilon_b/\epsilon_a)^\lambda$ | $\exp\{C_2(1/Sa - 1/Sb)\}$ |
| B | $\ln(\epsilon_b/\epsilon_a)^\lambda$ | $C_2(1/Sa - 1/Sb)$ |
| C | $(1/C_2)\ln(\epsilon_b/\epsilon_a)^\lambda$ | $1/Sa - 1/Sb$ |

Figure 42:
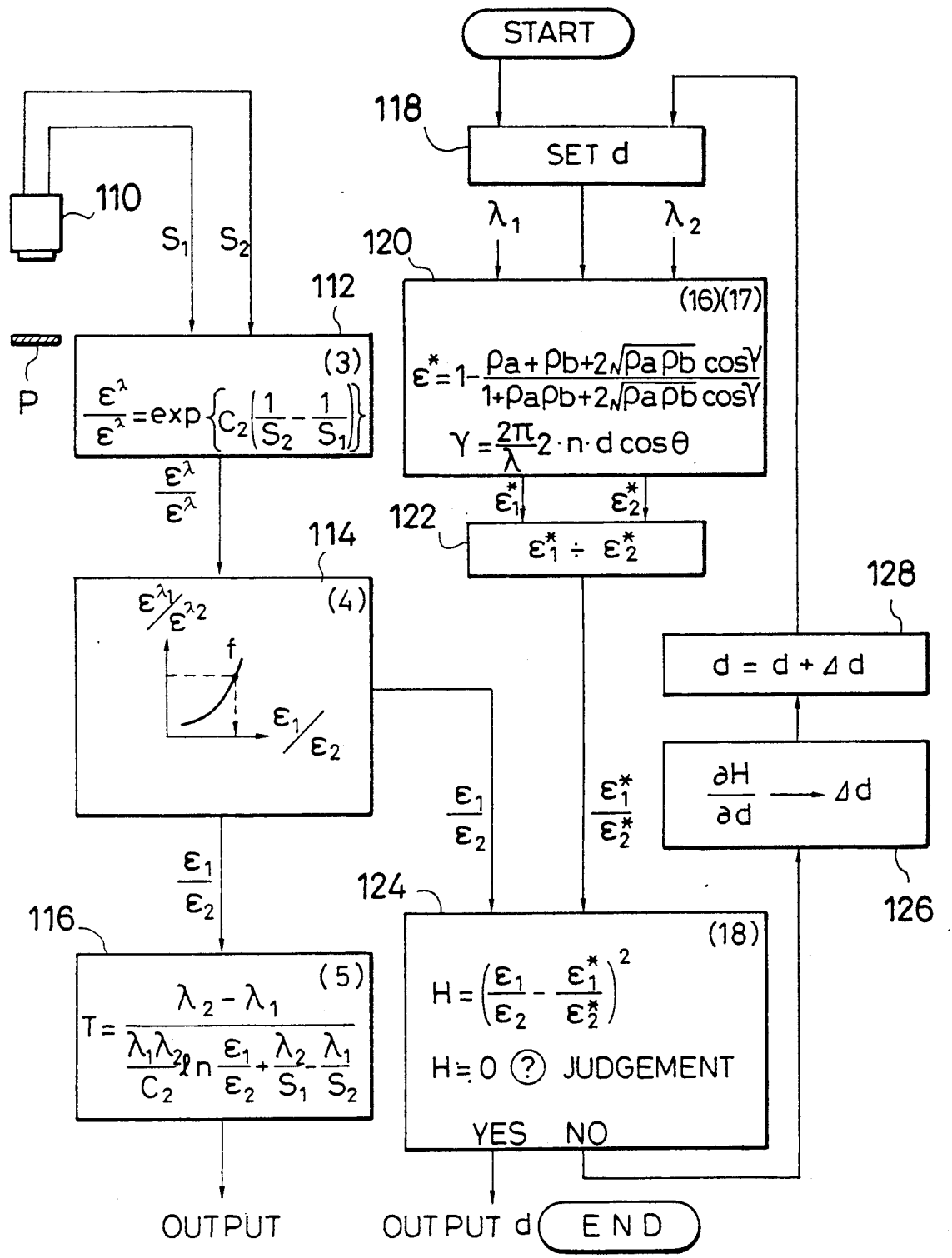
FIG. 42 is a block diagram schematically showing a third embodiment according to the present invention.

FIG. 42 is a block diagram schematically showing a third embodiment according to the present invention.

The measurement apparatus of the present embodiment is capable of measuring both the surface temperature T and the thickness d of the oxide film formed on the surface of a material in process virtually at the same time. The apparatus is provided with a two-color thermometer and measures the thickness d of the oxide film as a physical value.

The above-mentioned measurement apparatus includes a two-color thermometer 110 for measuring the surface temperature of the material in process P, an emissivity involution ratio calculation block 112 using brightness temperatures S1 and S2 input from the two-color thermometer 110 for calculating the emissivity involution ratio $\epsilon_1^{\lambda_1}/\epsilon_2^{\lambda_2}$ according to the above expression (3), a first emissivity ratio calculation block 114 using the above involution ratio input from the calculation block 112 for calculating a first emissivity ratio $\epsilon_1/\epsilon_2$ according to the above expression (4), and a temperature calculation block 116 using the first emissivity ratio $\epsilon_1/\epsilon_2$ from the calculation block 114 for calculating the surface temperature T according to the above expression (5).

Furthermore, the above-mentioned measurement apparatus has an assumption block 118 that assumes an arbitrary value as the oxide film thickness d for setting it up, an emissivity calculation block 120 receiving the assumption value of the film thickness d from the assumption block 118 and two measurement wavelengths $\lambda_1$ and $\lambda_2$ of the two-color thermometer for calculating emissivities $\epsilon_1^*$ and $\epsilon_2^*$, and a division block 122 using the emissivities from the calculation block 120 for calculating a second emissivity ratio $\epsilon_1^*/\epsilon_2^*$.

The emissivity calculation block 120 is adapted to calculate the two emissivities using the following expressions (16) and (17)

$$\epsilon\, i = 1 - \{\rho_a + \rho_b + 2(\rho_a \rho_b \cos\gamma\, i)^{0.5}\} \div \{1 + \rho_a \rho_b + 2(\rho_a \rho_b \cos\gamma\, i)^{0.5}\} \quad (16)$$

$$\gamma\, i = (2\pi/\lambda\, i) 2 nd \cdot \cos\theta \quad (17)$$

(i = 1,2)
where $\rho_a$ represents the reflectivity at the boundary between the oxide film and the air;

$\rho_b$ represents the reflectivity at the boundary between the oxide film and the unoxidized portion;

$\theta$ represents the angle of refraction at the boundary between the oxide film and the unoxide portion;

n represents the refractive index of the oxide film; and d represents the thickness of the oxide film.

The measurement apparatus further has a judgment block 124 receiving the first emissivity ratio $\epsilon_1/\epsilon_2$ and a second emissivity ratio $\epsilon_1{}^*/\epsilon_2{}^*$ from the first emissivity ratio calculation block 114 and the division block 122, respectively, and for deciding whether or not the current value of the film thickness d should be output. The judgment block 124 exercises the following expression of evaluation function (18) in accordance with the method of least squares $$H = \{(\epsilon_1/\epsilon_2) - (\epsilon_1{}^*/\epsilon_2{}^*)\}^2. \quad (18)$$

More specifically, the judgment block 124, when H is virtually 0, outputs the film thickness d currently used for calculating the second emissivity ratio $\epsilon_1{}^*/\epsilon_2{}^*$ as the film thickness d of the material in process P. When H is not 0, the judgment block 124 has a correction value $\Delta d$ calculated in a correction value calculation block 126, correction (d + $\Delta d$) made in a correction block 128, and the thickness d after the correction input to the assumption block 118 so that the thickness d going through the correction is set up therein.

In the present embodiment, when radiation energy from the material in process P is measured by the two-color thermometer 110, the current brightness temperatures S1 and S2 are input to the involution ratio calculation block 112. The involution ratio calculation block performs calculation of the expression (3). The result of the calculation is input to the first emissivity ratio calculation block 114 where calculations using expression (4) are performed. The result of this calculation is input to the temperature calculation block 116 where calculations using the expression (5) are performed, and thereupon, the surface temperature T of the material in process P measured by the two-color thermometer 110 is output.

Meanwhile, in the film thickness measurement and calculation part on the right-hand side of the diagram, first an arbitrary value d is set up as an assumption value (initial value), and the value d together with the wavelengths $\lambda^1$ and $\lambda_2$ are accepted by the emissivity calculation block 120. Emissivity calculation block 12 performs calculation of the expressions (16) and (17). The results are input to the division block 122 wherein a division is performed, and therefrom the second emissivity ratio $\epsilon_1{}^*/\epsilon_2{}^*$ is output to the judgment block 124.

The judgment block 124 receiving the second emissivity ratio, together with the first emissivity ratio from the first emissivity ratio calculation block 114, substitutes these values into the expression (18) to exercise its judgment.

When the result of the judgment is NO, the correction value $\Delta d$ is calculated in the correction value calculation block 126. The correction for the film thickness d using the correction value $\Delta d$ is performed in the correction block 128, and the film thickness d going through the correction is set up in the assumption block 118.

Calculation is repeatedly performed following the above procedures and search calculation until the value H becomes virtually 0 in the judgment block 124. When the value H has become virtually 0, the film thickness d used in the last calculation is output.

According to the present embodiment, the surface temperature T of the material in process P and the oxide film thickness d formed on the surface of the material in process can be measured virtually at the same time.

Figure 43:
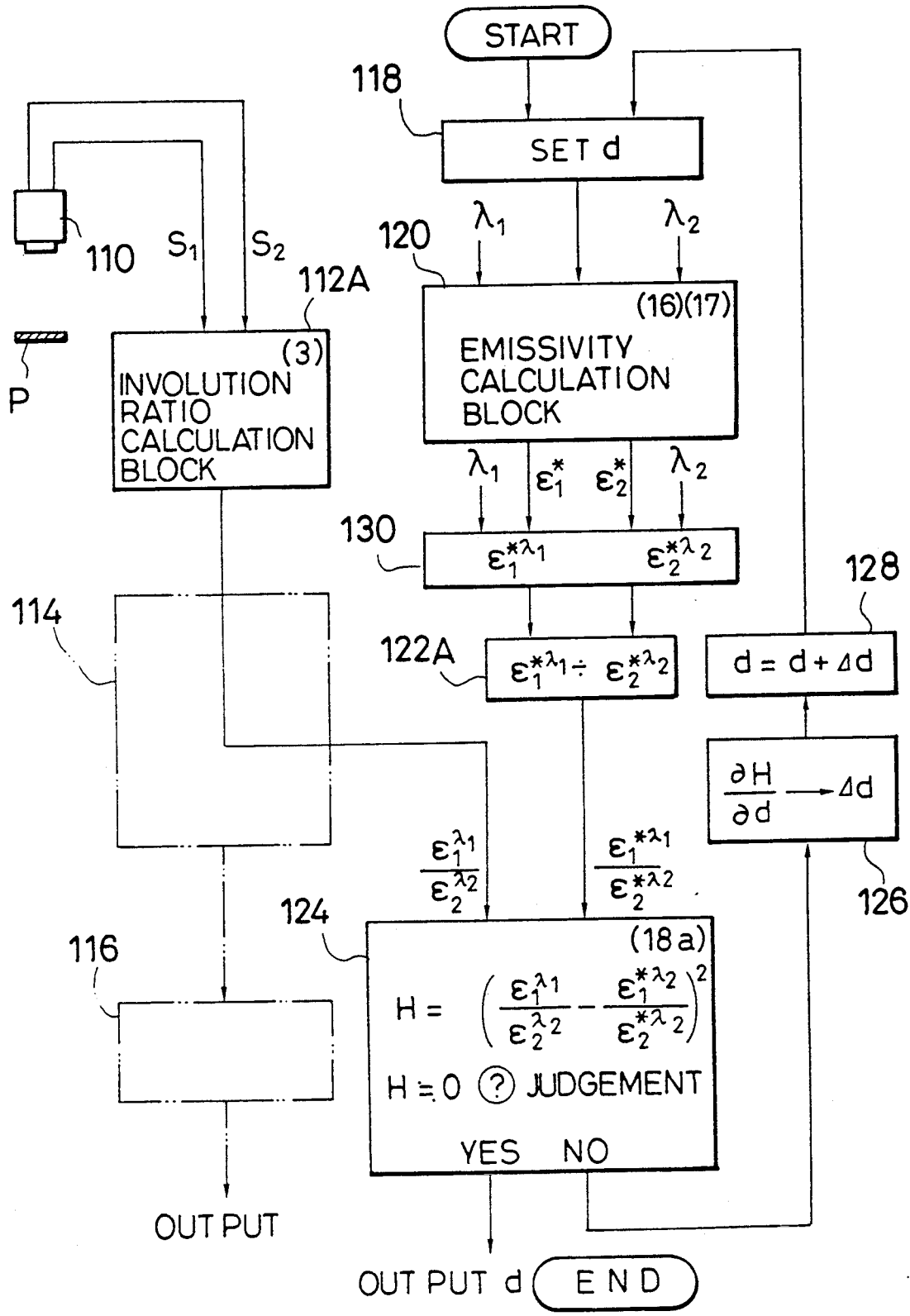
FIG. 43 is a block diagram schematically showing a fourth embodiment according to the present invention.

FIG. 43 is a block diagram showing a measurement apparatus of a fourth embodiment according to the present invention.

The measuring apparatus of the present embodiment has a first involution ratio calculation block 112A (which is identical to the involution ratio calculation block 112 in FIG. 42). The first involution ratio calculation block 112A receives brightness temperatures S1 and S2 for calculating a first emissivity involution ratio $\epsilon_1{}^{\lambda_1}/\epsilon_2{}^{\lambda_2}$. Further, the apparatus has an emissivity involution term calculation block 130 using emissivities $\epsilon_1{}^*$ and $\epsilon_2{}^*$ input from an emissivity calculation block 120 and corresponding two wavelengths $\lambda_1$ and $\lambda_2$ for calculating two emissivity involution terms and a division block 122A using the emissivity involution terms calculated by the calculation block 130 for calculating a second emissivity $\epsilon_1{}^{*\lambda_1}/\epsilon_2{}^{*\lambda_2}$. The first involution ratio and the second involution ratio are input to a judgment block 124. A judgment according to an expression for judgment (18a) is exercised in the judgment block 124. Otherwise, the fourth embodiment is substantially the same as the third embodiment.

$$H = \{(\epsilon_1{}^{\lambda_1}/\epsilon_2{}^{\lambda_2}) - (\epsilon_1{}^{*\lambda_1}/\epsilon_2{}^{*\lambda_2})\}^2 \quad (18a)$$

In the present embodiment, the first emissivity ratio calculation block 114 and the temperature calculation block 116 need not necessarily be provided.

According to the present embodiment, since the film thickness d is judged according to the first and second emissivity involution ratios and the value judged as the right film thickness is output, the surface temperature T of the material in process P and the oxide film thickness d can be measured substantially simultaneously as with the third embodiment. Further, it is also possible to arrange such that only the oxide film thickness d is measured without providing the first emissivity ratio calculation block 114 and the temperature calculation block 116.

Figure 44:
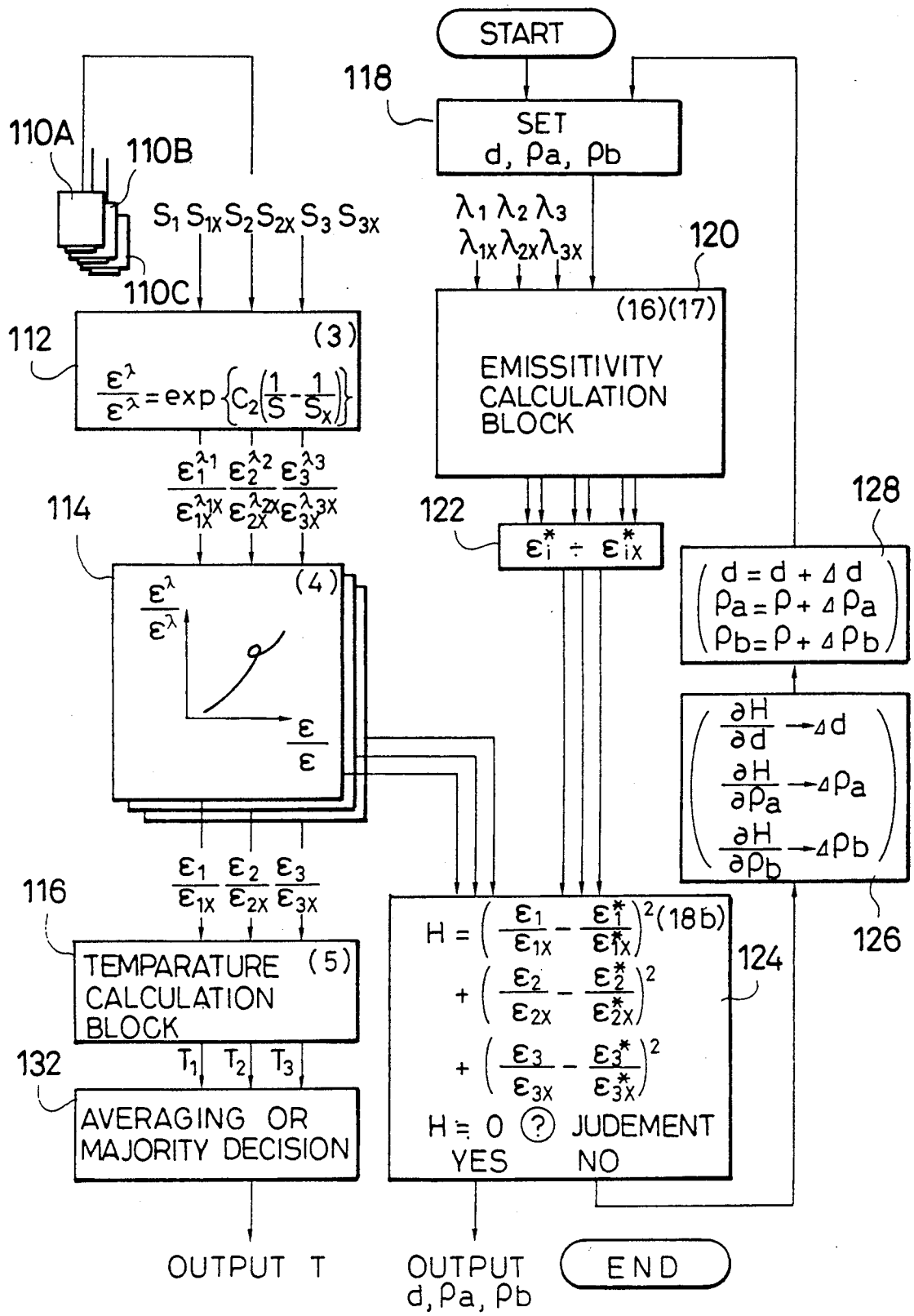
FIG. 44 is a block diagram schematically showing a fifth embodiment according to the present invention.

FIG. 44 is a block diagram schematically showing a measurement apparatus of a fifth embodiment according to the present invention. The present embodiment is provided with three two-color thermometers 110A, 110B, and 110C and formed into a multi-wavelength type. Its basic function is substantially the same as the third embodiment except that it has three two-color thermometers. The points different from those in the third embodiment will be described below.

The two-color thermometers 110A, 110B, and 110C are arranged to use different measurement bands (i.e., nearby two wavelengths $\lambda_1$, $\lambda_{1x}$, $\lambda_2$, $\lambda_{2x}$, $\lambda_3$ and $\lambda_{3x}$) and measure corresponding brightness temperatures S1, S1x, S2, S2x, S3 and S3x.

The involution ratio calculation block 112 uses the above expression (3) for the above three sets of nearby two wavelengths to calculate emissivity involution ratios $\epsilon_1^{\lambda 1}/\epsilon_{1x}^{\lambda 1x}$, $\epsilon_2^{\lambda 2}/\epsilon_{2x}^{\lambda 2x}$, and $\epsilon_3^{\lambda 3}/\epsilon_{3x}^{\lambda 3x}$, respectively. The first emissivity ratio calculation blocks 114 are arranged to calculate emissivity ratios $\epsilon_1/\epsilon_{1x}$, $\epsilon_2/\epsilon_{2x}$, and $\epsilon_3/\epsilon_{3x}$ from the above three involution ratios. Accordingly, each calculation block 114 has the function f given in the above expression (4) for each measurement band.

The temperature calculation blocks 116 calculates surface temperatures T1, T2, and T3 measured by the two-color thermometers 110A, 110B, and 110C from the three emissivity ratios calculated by the calculation blocks 114, respectively These surface temperatures T1-T3 are output to a thermometer selector block 132 and, therein, either the average value of the three surface temperatures is obtained or one of the temperatures closest to each other is selected by a majority decision and the thus obtained temperature is output as the surface temperature T of the material in process P.

In the assumption block 118, assumption values (initial values) of the oxide film thickness d and the reflectivities $\rho_a$ and $\rho_b$ are established. These three assumption values and the above three nearby wavelengths $\lambda_i$ and $\lambda_{ix}$ (i=1,2,3) are input to the emissivity calculation block 120, wherein emissivities $\epsilon_i^*$ and $\epsilon_{ix}^*$ are calculated according to the above expressions (16) and (17). Then, in the division block 122, the emissivity ratios $\epsilon_i/\epsilon_{ix}^*$ are calculated from the three sets of emissivities. Further, these three emissivity ratios are input to the judgment block 124 and a judgment according to the following expression for judgment (18b) is exercised in the judgment block 124.

$$H = \{(\epsilon_1/\epsilon_{1x}) - (\epsilon_1^*/\epsilon_{1x}^*)\}^2 + \qquad (18b)$$
$$\{(\epsilon_2/\epsilon_{2x}) - (\epsilon_2^*/\epsilon_{2x}^*)\}^2 +$$
$$\{(\epsilon_3/\epsilon_{3x}) - (\epsilon_3^*/\epsilon_{3x}^*)\}^2$$

In the correction value calculation block 126, Jacobian approximate values are obtained from variations of H obtained by minutely changing the values of d, $\rho_a$, and $\rho_b$. In the correction block 128, d, $\rho_a$, and $\rho_b$ are corrected according to correction value calculating expressions of nonlinear functions by a method of minimum squares, such as the known Newton method and Marquardt method, and these corrected values are established in the assumption block 118.

According to the present embodiment, three physical values can be measured, i.e., the oxide film thickness d, reflectivities $\rho_a$ and $\rho_b$, and the surface temperature T of the material in process P.

Figure 45:
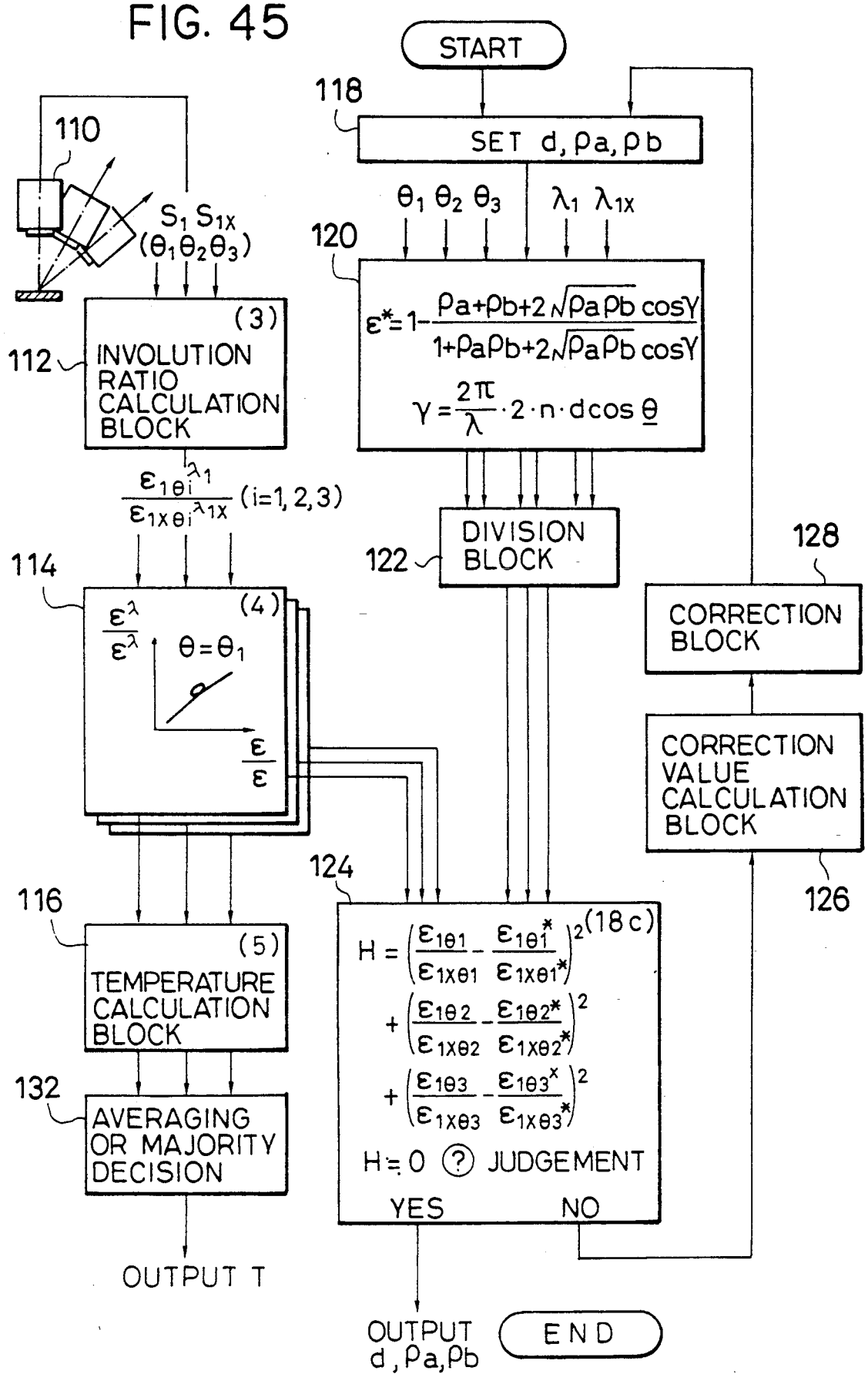
FIG. 45 is a block diagram schematically showing a sixth embodiment according to the present invention.

FIG. 45 is a block diagram schematically showing the measurement apparatus of a sixth embodiment according to the present invention.

The measurement apparatus of the present embodiment is arranged such that the two-color thermometers 110 are positioned at angles of inclination of $\theta_1$, $\theta_2$ and $\theta_3$ normal to the material in process P.

Since this apparatus has substantially the same structure as the third embodiment, the different points of the apparatus will chiefly be described below.

The emissivity involution ratio calculation block 112 receives brightness signals S1 and S1x together with signals representative of the angles $\theta_i$ (i=1,2,3) and calculates emissivity involution ratios $\epsilon_{1\theta i}^{\lambda 1}/\epsilon_{1x\theta i}^{\lambda 1x}$.

The first emissivity ratio calculation blocks 114 calculate three emissivity ratios $\epsilon_{1\theta i}/\epsilon_{1x\theta i}$ from the emissivity involution ratios. These three emissivity ratios are input to the judgment block 124 and also to the temperature calculation block 116. Each calculation block 114 has the function f for each angle of inclination.

The temperature calculation block 116 performs temperature calculation for each angle of inclination and the thermometer selector block 132 outputs either the average value of the temperatures obtained for the three angles of inclination or one of the temperatures closest to each other selected by a majority decision as the surface temperature of the material in process P.

In the assumption block 118, the same as in the fifth embodiment, assumption values of the oxide film thickness d and the reflectivities $\rho_a$ and $\rho_b$ are established. In the emissivity calculation block 120, emissivities $\epsilon_{1\theta i}^*$ and $\epsilon_{1x\theta i}^*$ are calculated using these assumption values, two nearby wavelengths $\lambda_1$ and $\lambda_{1x}$, and the angles of inclination $\theta_i$ according to the above expressions (16) and (17). In the division block 122, the emissivity ratios $\epsilon_{1\theta i}^*/\epsilon_{1x\theta i}^*$ are calculated from the above emissivities. The division block 122 outputs these emissivity ratios for each angle of inclination to the judgment block 124.

In the judgment block 124, a judgment is exercised according to the following expression (18c) and, when H becomes virtually equal to 0, the oxide film thickness d and the reflectivities $\rho a$ and $\rho b$ are output. When H is not equal to 0, the correction values $\Delta d$, $\Delta \rho a$, and $\Delta \rho b$ are calculated in the correction value calculation block 126 and the established values in the correction block 128 are corrected the same as in the fifth embodiment.

$$H = \{(\epsilon_{1\theta 1}/\epsilon_{1x\theta 1}) - (\epsilon_{1\theta 1}^*/\epsilon_{1x\theta 1}^*)\}^2 + \qquad (18c)$$
$$\{(\epsilon_{1\theta 2}/\epsilon_{1x\theta 2}) - (\epsilon_{1\theta 2}^*/\epsilon_{1x\theta 2}^*)\}^2 +$$
$$\{(\epsilon_{1\theta 3}/\epsilon_{1x\theta 3}) - (\epsilon_{1\theta 3}^*/\epsilon_{1x\theta 3}^*)\}^2$$

According to the present embodiment, with the use of two-color thermometers 110 of the same type, the surface temperature T, oxide film thickness d, and reflectivities $\rho_a$ and $\rho_b$ of the material in process P can be measured at the same type as with the fifth embodiment.

Figure 46:
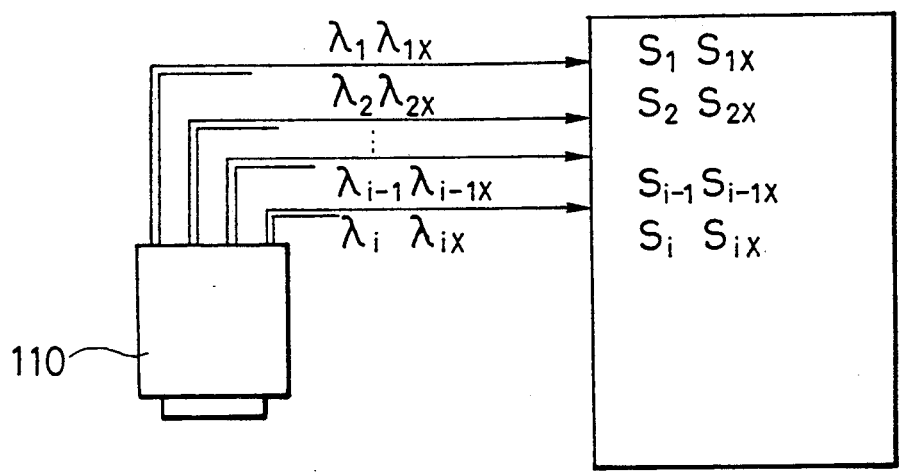
FIG. 46 is a block diagram showing an example of a two color thermometer modified to a multi-wavelength type.
Figure 46:
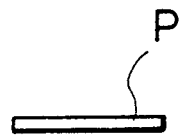

The present invention can be modified to a multi-wavelength type, as shown in FIG. 46, by arranging the two-color thermometer 110 to perform measurement with four or more measurement bands $\lambda_i$ and $\lambda_{ix}$ (i representing integers 1 to 4 or above).

Figure 47:
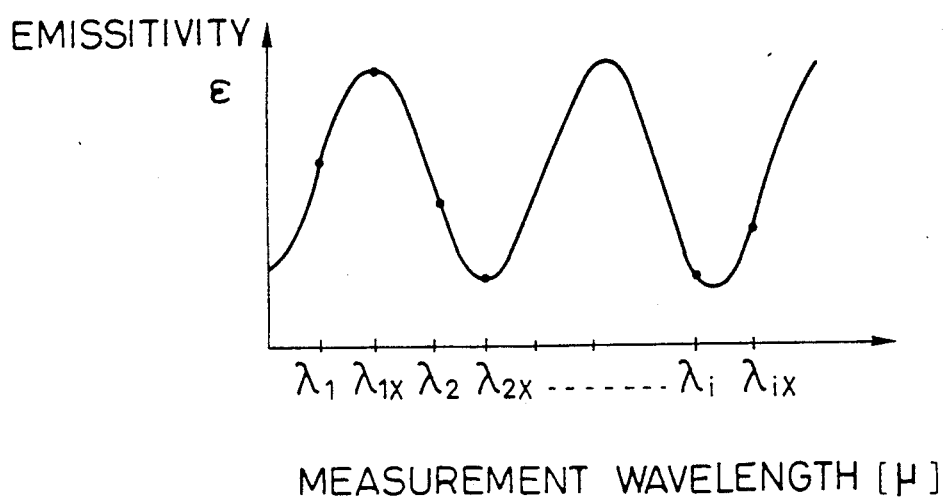
FIG. 47 is a diagram showing relationship between wavelength and spectral emissivity in a two-color thermometer modified to a multi-wavelength type.

In such a multi-wavelength arrangement, two wavelengths of each band can be selected as shown in the diagram of FIG. 47. Through such a multi-wavelength arrangement, a still larger number of physical values can be measured at the same time.

Figure 48:
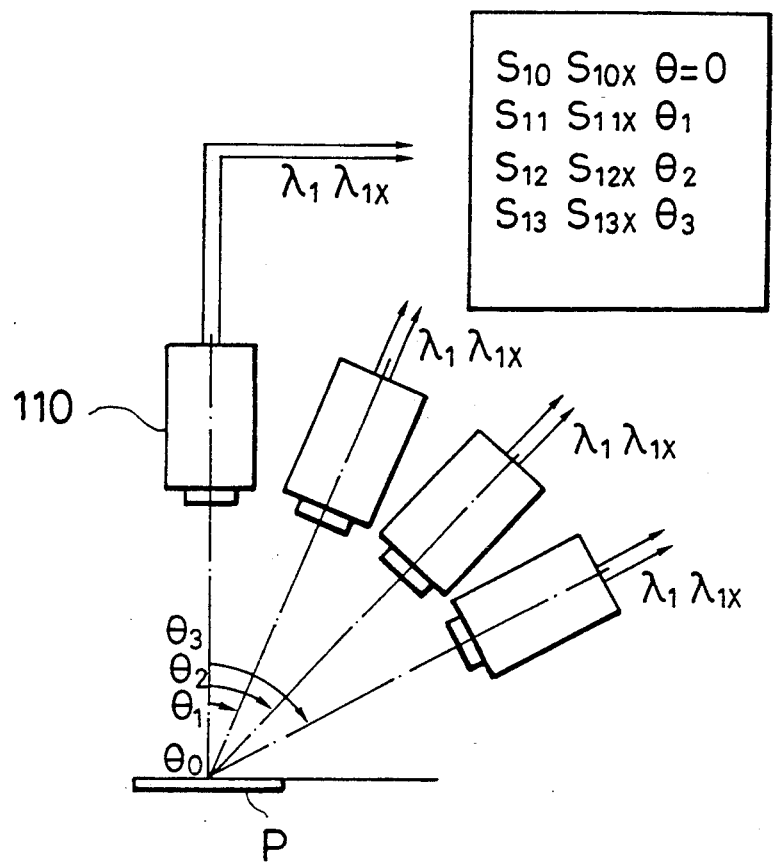
FIG. 48 is a diagram showing arrangement of a two-color thermometer modified to a multi-angle type.

FIG. 48 shows an arrangement of the two-color thermometers 110 when the two-color thermometers 110 is modified to have a multi-angle configuration.

Figure 49:
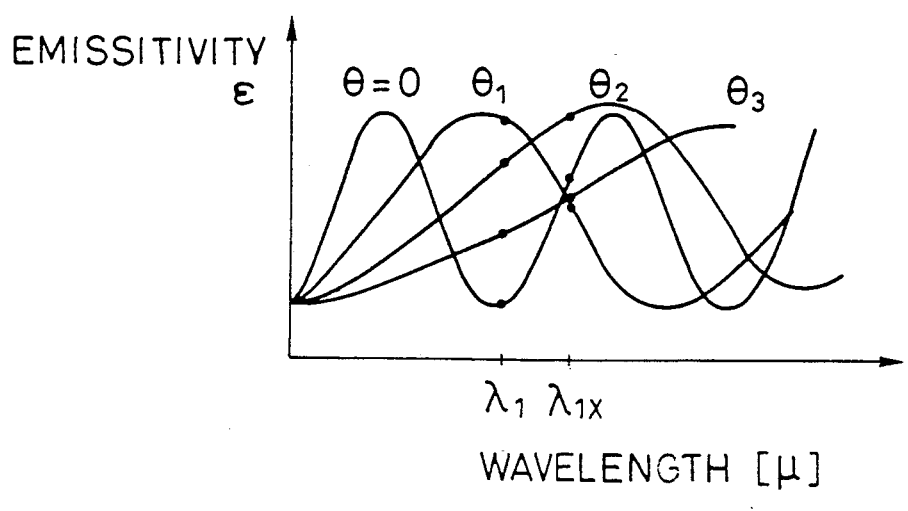
FIG. 49 is a diagram showing relationships between two measurement wavelengths and angles of inclination in a two color thermometer modified to a multi-angle type.

FIG. 49 is a diagram showing the relationships between the two measurement wavelengths $\lambda_1$ and $\lambda_{1x}$ and the angles of inclination in the multi-angle arrangement as shown in FIG. 48.

When two or more two-color thermometers are used, it can be arranged in the thermometer selector block 132 shown in the above embodiment such that one two-color thermometer or two-color thermometers or more can be selected according to the time variation of the spectral emissivity ratio or the emissivity involution ratio for each two-color thermometer. A method of such selection will be described below in detail as to the case, for convenience, where the thermometers have two, first and second, measurement bands.

When the emissivity involution ratios $\epsilon_1^{\lambda 1}/\epsilon_{1x}^{\lambda 1x}$ and $\epsilon_2^{\lambda 2}/\epsilon_{2x}^{\lambda 2x}$ are input to a wavelength zone selection block 132, a specific wavelength zone (i.e., measurement band) is selected according to the time variation of the emissivity involution ratio so that the temperature T calculated for the measurement band producing a smaller time variation of emissivity involution ratio is output.

The wavelength zone selection block 132 can be of the arrangement as shown in the below described FIG. 50A or FIG. 50B. In the present embodiment, both or either of these arrangements may be used.

Figure 50A:
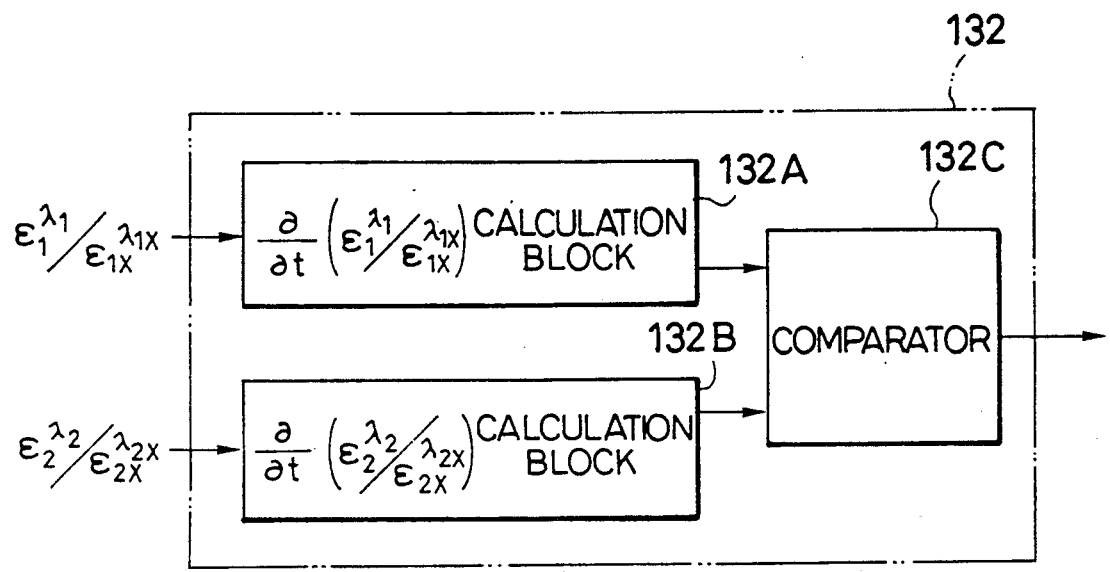
FIG. 50A and FIG. 50B are block diagrams showing arrangements of wavelength zone selection blocks.

The wavelength zone selection block 132 shown in FIG. 50A is for outputting a selection signal according to time variations of the emissivity involution ratios and it is formed of a calculation block 132A for differentiating $\epsilon_1^{\lambda 1}/\epsilon_{1x}^{\lambda 1x}$, a calculation block 132B for differentiating $\epsilon_2^{\lambda 2}/\epsilon_{2x}^{\lambda 2x}$, and a comparator 132C for comparing the results of calculation in the blocks 132A and 132B and outputting a signal for selecting the measurement band giving the smaller variation rate.

Figure 50B:
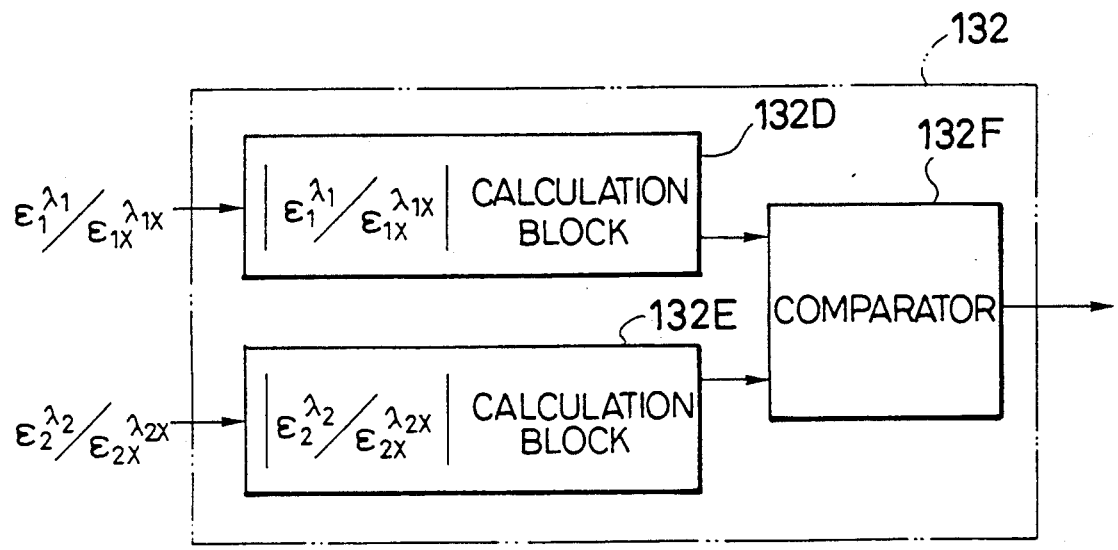

The wavelength zone selection block 132 shown in FIG. 50B is formed of a calculation block 132D for calculating the absolute value of $\epsilon_1^{\lambda 1}/\epsilon_{1x}^{\lambda 1x}$, a calculation block 132E for calculating the absolute value of $\epsilon_2^{\lambda 2}/\epsilon_{2x}^{\lambda 2x}$, and a comparator 132F for comparing the results of the calculation in the blocks 132D and 132E and outputting a signal for selecting the measurement band giving the smaller one of the calculation results.

The function of the wavelength zone selection block 132 will be described below with reference to FIG. 1.

The valley as the portion where the emissivity is lowered due to interference of radiation waves is produced in the order of $\epsilon_1 \rightarrow \epsilon_{1x} \rightarrow \epsilon_2 \rightarrow \epsilon_{2x}$ in accordance with the relative magnitude of the wavelengths. The lowering of the emissivity cannot be found by prior art two-color thermometers.

As inferred from FIG. 1, the timing zone at which the spectral emissivity suddenly changes with the formation of an oxide film is detectable with sufficient certainty by observing time variations of the two emissivity ratios. To be concrete, it is detectable from time differential of the emissivity ratio as shown in FIG. 50A or the magnitude of the absolute value of the emissivity ratio as shown in FIG. 50B.

Therefore, it can be arranged such that, when the surface condition of the object of measurement corresponds to the timing zone Z1 or Z10 in FIG. 1, the result of the temperature calculation calculated by using the emissivities $\epsilon_2$ and $\epsilon_{2x}$ obtained for the second measurement band is selectively output. When conversely it corresponds to the timing zone Z2 or Z20, such that the result of temperature calculation calculated by using the emissivities $\epsilon_1$ and $\epsilon_{1x}$ obtained for the first measurement band is selectively output.

As described above in detail, temperature calculation can be performed independently for the nearby two wavelengths $\lambda_1$ and $\lambda_{1x}$ of the first measurement band and for the nearby two wavelengths $\lambda_2$ and $\lambda_{2x}$ of the second measurement band and, in addition, the temperature calculated for the measurement band producing a smaller time variation in the emissivity involution ratio for the respective two wavelengths can be selectively output. Therefore, a suitable measurement band can be selected for temperature calculation and the temperature can be output even when an oxide film is formed on the surface and it is growing with time to increase the film thickness. Thus, temperature measurement with high accuracy can be achieved at all times.

Theoretical or experimental expressions expressing the relationship between surface physical values and the emissivity $\epsilon_i$ are not limited to the above expressions (16) and (17) as any other relational expressions can naturally be used.

For example, when the surface roughness is represented by R and arbitrary other physical values are represented by X1, the function in the following expression can be used.

$$\epsilon_i = f(R, Xi) \tag{19}$$

As a particular example to which the above expression (19) is applicable, the galvannealing degree in the process of alloy galvanized steel plate can be mentioned.

In the alloy galvanizing process of the alloy galvanized steel plate, the surface roughness R changes and the emissivity also changes with the progress of the galvannealing. Hence, when the galvannealing degree is represented by X1, the following expression (19a) holds.

$$\epsilon_i = f(R, X1) \tag{19a}$$

Accordingly, it also becomes possible to measure the surface temperature T and two physical values (the surface roughness R and the galvannealing degree X1) at the same time by using two or more two-color thermometers, or using two-color thermometers arranged at two or more angles of inclination, and applying the data to the above expression (19a).

According to the present embodiment described above, the physical value and the surface temperature of a material in process can be measured at the same time. Further, even when the surface physical properties change, the surface conditions of the material in process change, and the emissivity greatly changes. The surface temperature can be measured with high accuracy and physical values of the material in process can be measured. Only the physical values can also be measured.

Figure 51:
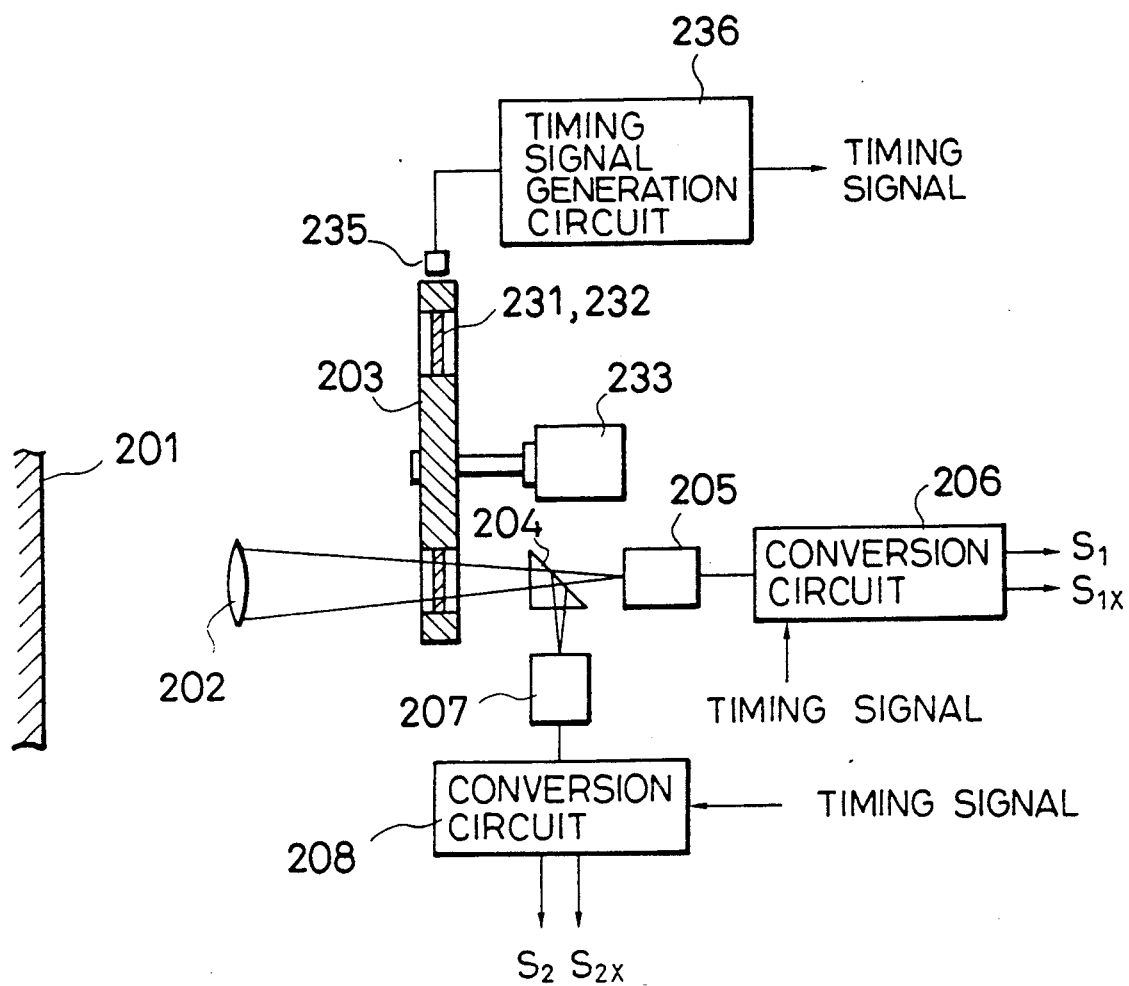
FIG. 51 is a block diagram showing a photoelectric conversion part of a two-color multiplex type radiation thermometer of a seventh embodiment according to the present invention.
Figure 52:
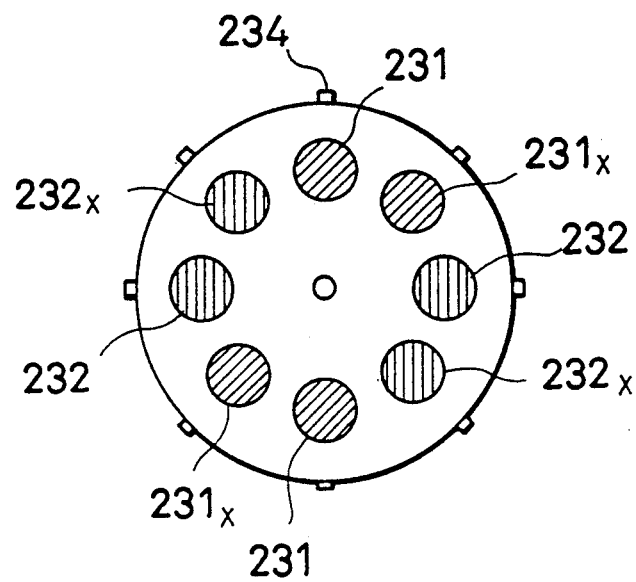
FIG. 52 is an enlarged plan view showing a filter disk in the seventh embodiment.
Figure 53:
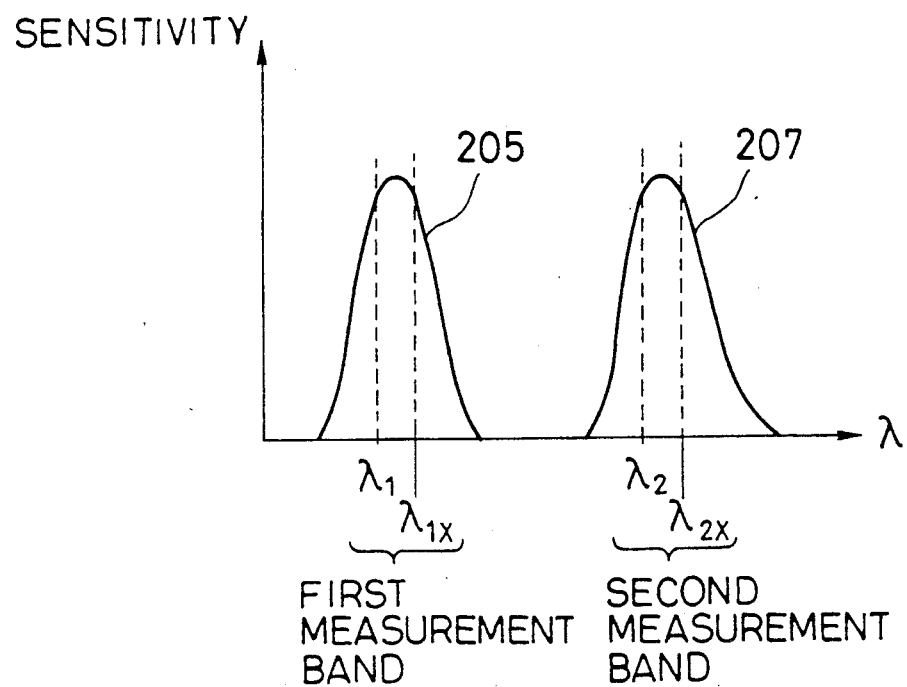
FIG. 53 is a diagram showing photodetecting sensitivity of a photoelectric element.

FIG. 51 is a block diagram partly in section showing the main portion, a photoelectric conversion part, of the two-color multiplex type radiation thermometer of a seventh embodiment according to the present invention. FIG. 52 is an enlarged plan view showing an infrared transmitting filter disk. FIG. 53 is a diagram showing sensitivity of a photoelectric element, and FIG. 54 is a block diagram schematically showing a signal processing part.

Figure 54:
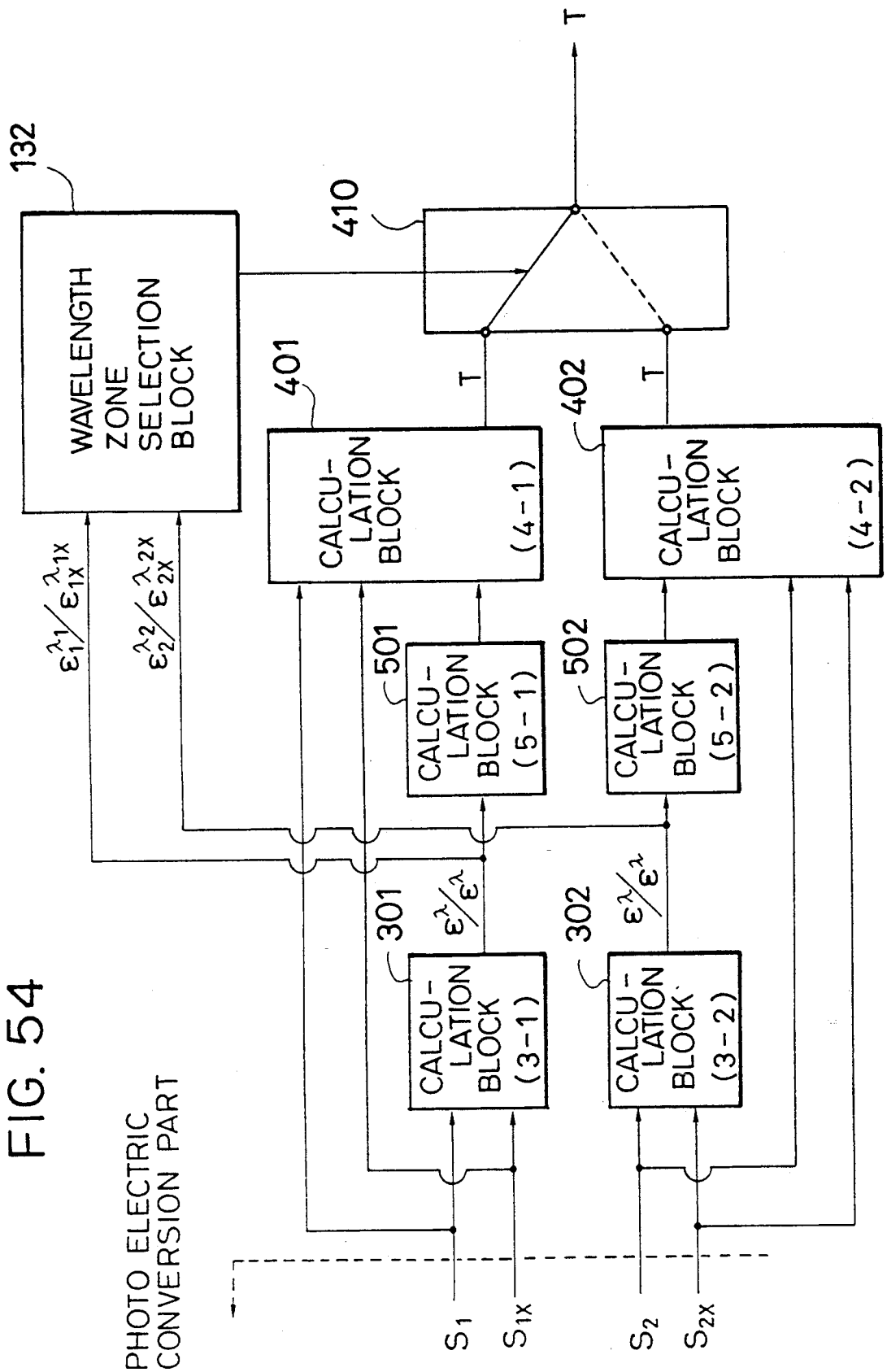
FIG. 54 is a block diagram showing a signal processing part of a two-color multiplex type radiation thermometer of the seventh embodiment.

The two-color multiplex type radiation thermometer of the present embodiment is of a two-color duplex type having the photoelectric conversion part shown in FIG. 51 and the signal processing part shown in FIG. 54.

The photoelectric conversion part includes a lens 202 for converging radiation waves from the object of measurement (thermal radiation emitting matter) 201, and an infrared transmitting filter disk 203 for splitting the radiation waves converged by the lens 202 into a first measurement band formed of wavelengths $\lambda_1$ and $\lambda_{1x}$ and a second measurement band formed of wavelengths $\lambda_2$ and $\lambda_{2x}$. The photoelectric conversion part also includes a photoelectric element 205 for photoelectric conversion of the radiation waves of the first measurement band split by the filter disk 203, a conversion circuit 206 for converting the signals from the photoelectric element 205 into brightness temperature signals S1 and S1x, a photoelectric element 207 for photoelectric conversion of the radiation waves of the second measurement band, and a conversion circuit 208 for converting the signals from the photoelectric element 207 into brightness temperature signals S2 and S2x.

As shown in FIG. 52, in the filter disk 203, there are provided two sequences of a $\lambda_1$ transmitting filter 231, a $\lambda_{1x}$ transmitting filter 231x, a $\lambda_2$ transmitting filter 232, and a $\lambda_{2x}$ transmitting filter 232x disposed at equal spacings. When the filter disk 203 is rotated once by a motor 233, each wavelength is filtrated two times.

On the circumference of the filter disk 203, there are disposed protrusions 234 at regular intervals for allowing the rotating positions of the filter to be detected. When the protrusions 234 are detected by a filter rotating position detection sensor 235, a timing signal is generated by a timing signal generation circuit 236. The timing signal is supplied to the conversion circuits 206 and 208 and, thereby, the radiation receiving operations of the conversion circuits 206 and 208 are controlled.

The photoelectric element 205 has photodetecting sensitivity to both of the two nearby wavelengths $\lambda_1$ and $\lambda_{1x}$ as shown on the left of FIG. 53. The photoelectric element 207 has photodetecting sensitivity to both of the two nearby wavelengths $\lambda_2$ and $\lambda_{2x}$ as shown on the right of the same diagram, while the first measurement band formed of the wavelengths $\lambda_1$ and $\lambda_{1x}$ and the second measurement band formed of the wavelengths $\lambda_2$ and $\lambda_{2x}$ are sufficiently spaced apart.

The signal processing part shown in FIG. 54 includes a calculation block of the expression (3-1) 301 using the brightness temperatures S1 (corresponding to $\lambda_1$) and S1x (corresponding to $\lambda_{1x}$) output from the conversion circuit 206 for calculating the emissivity involution ratio according to the above expression (3-1). The signal processing part also includes a calculation block of the expression (5-1) 501 using the emissivity involution ratio for calculating the emissivity ratio ($\epsilon_1/\epsilon_{1x}$) according to the experimentally determined correlation regression expression (i.e., the above expression (5-1)). It further includes a calculation block of the expression (4-1) 401 using the calculated emissivity ratio for calculating the temperature T according to the two-color temperature calculation expression (4-1), and calculation blocks making similar calculation to the above for the brightness temperatures S2 (corresponding to $\lambda_2$) and S2x (corresponding to $\lambda_{2x}$) output from the conversion circuit 208, namely, a calculation block of the expression (3-2) 302, a calculation block of the expression (5-2) 502, and a calculation block of the expression (4-2) 402.

The temperatures T output from both of the calculation blocks 401 and 402 are input to a selector 410. The selector 410 is adapted such that the temperature T calculated for two wavelengths of either of the measurement bands is output therefrom.

Emissivity involution ratios $\epsilon_1^{\lambda_1}/\epsilon_{1x}^{\lambda_{1x}}$ and $\epsilon_2^{\lambda_2}/\epsilon_{2x}^{\lambda_{2x}}$ are output from the calculation blocks 301 and 302, respectively, to be input to a wavelength zone selection block 132, and, therein, a particular wavelength zone (i.e., measurement band) is selected according to time variations of the emissivity involution ratios. The selection signal is input to the above described selector 410 and, therein, the temperature T calculated for the measurement band producing a smaller time variation of the emissivity involution ratio is switch selected and this temperature T is output.

The wavelength zone selection block 132 is in the same arrangement as that shown in the above mentioned FIG. 50A or FIG. 50B.

In the present embodiment, when the first measurement band is used, the emissivity involution ratio is obtained in the calculation block 301 using the brightness temperatures S1 and Sx. The emissivity ratio $\epsilon_1/\epsilon_{1x}$ is obtained in the calculation block 501 using the emissivity involution ratio. Similarly, when the second measurement band is used, the emissivity involution ratio is obtained in the calculation block 302 using the brightness temperatures S2 and S2x. The emissivity ratio $\epsilon_2/\epsilon_{2x}$ is obtained in the calculation block 502 using the emissivity involution ratio.

As inferred from FIG. 1, the timing zone at which the spectral emissivity suddenly changes by the formation of an oxide film is detectable with sufficient certainty by observing time variations of the two emissivity ratios. To be concrete, it is detectable from time differential of the emissivity involution ratio as shown in FIG. 50A or from the magnitude of the absolute value of the emissivity involution ratio as shown in FIG. 50B.

Therefore, when the surface condition of the object of measurement corresponds to the timing zone Z1 or Z10 in FIG. 1, the result of temperature calculation calculated by using data obtained for the second measurement band can be selected by the selector 410 to be output. Conversely, when it corresponds to the timing zone Z2 or Z20, the result of temperature calculation calculated by using data obtained for the first measurement band can be selected by the same to be output.

According to the two-color multiplex type radiation thermometer of the present embodiment, as described above in detail, temperature calculation can be independently performed for the nearby two wavelengths $\lambda_1$ and $\lambda_{1x}$ of the first measurement band and for the nearby two wavelengths $\lambda_2$ and $\lambda_{2x}$ of the second measurement band. Additionally, the temperature calculated for the measurement band producing a smaller time variation of the emissivity ratio for the respective two wavelengths can be selectively output. Therefore, a suitable measurement band can be selected for temperature calculation. Also, the temperature can be output even when, for example, an oxide film is formed on the surface of the object of measurement and it is growing with time to increase the film thickness. Thus, temperature measurement with high accuracy can be achieved at all times.

Figure 55:
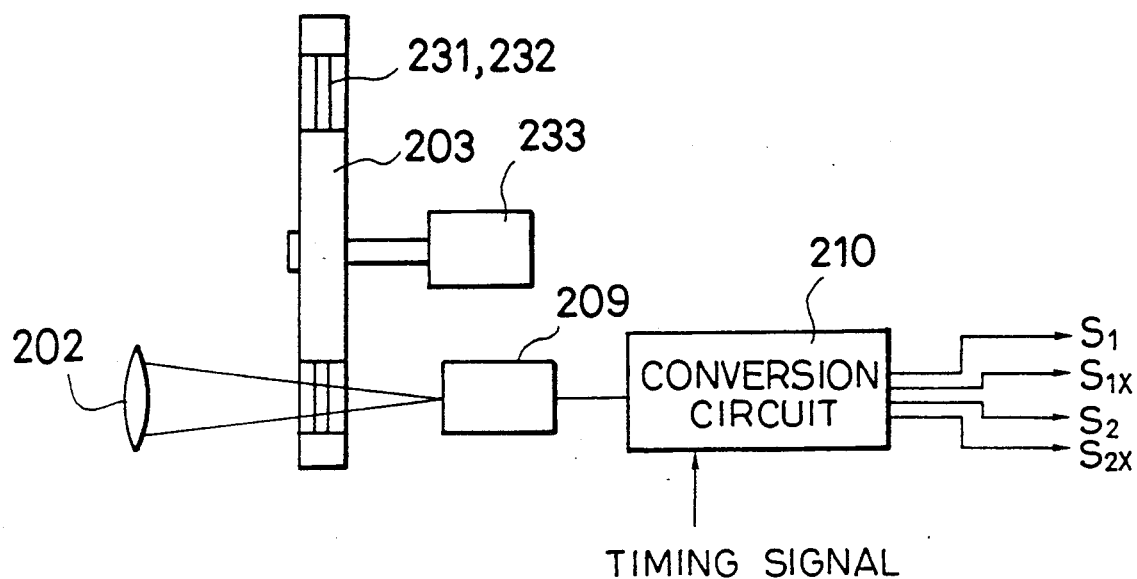
FIG. 55 is a block diagram showing a photoelectric conversion part of a two-color multiplex type radiation thermometer of an eighth embodiment.
Figure 56:
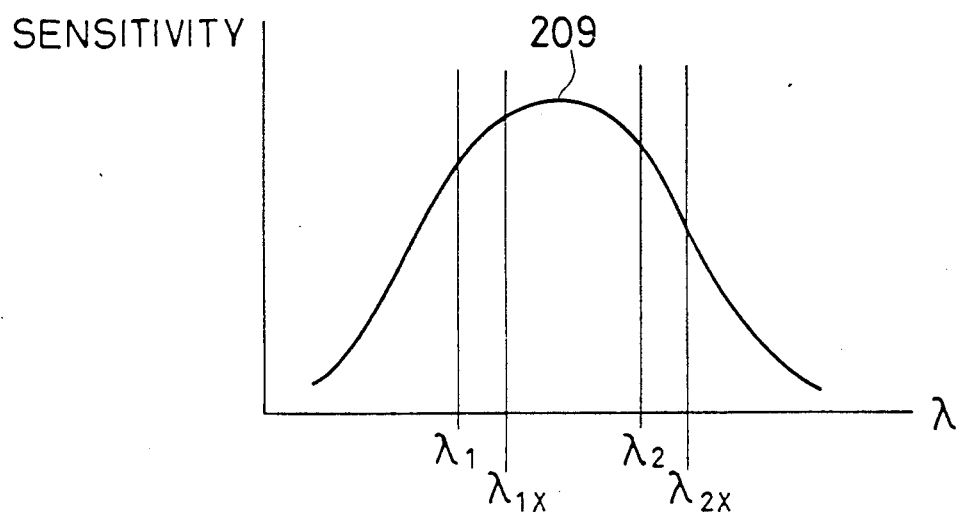
FIG. 56 is a diagram showing photodetecting sensitivity of another photoelectric element.

FIG. 55 is a block diagram, corresponding to FIG. 51, schematically showing the photoelectric conversion part of an eighth embodiment according to the present invention and FIG. 56 is a diagram showing photodetecting sensitivity of a photoelectric element used in the eighth embodiment.

In the present embodiment, a photoelectric element denoted by reference numeral 209 in FIG. 55 and having a photodetecting characteristic sensitive to four wavelengths $\lambda_1$, $\lambda_{1x}$, $\lambda_2$ and $\lambda_{2x}$ as shown in FIG. 56 is used instead of the photoelectric elements 205 and 207. A conversion circuit block 210 for outputting brightness temperature signals S1, S1x, S2, and S2x corresponding to photodetection signals of the four wavelengths is used instead of the conversion circuit blocks 206 and 208. Otherwise, the structure is substantially the same as that of the seventh embodiment.

Figure 57:
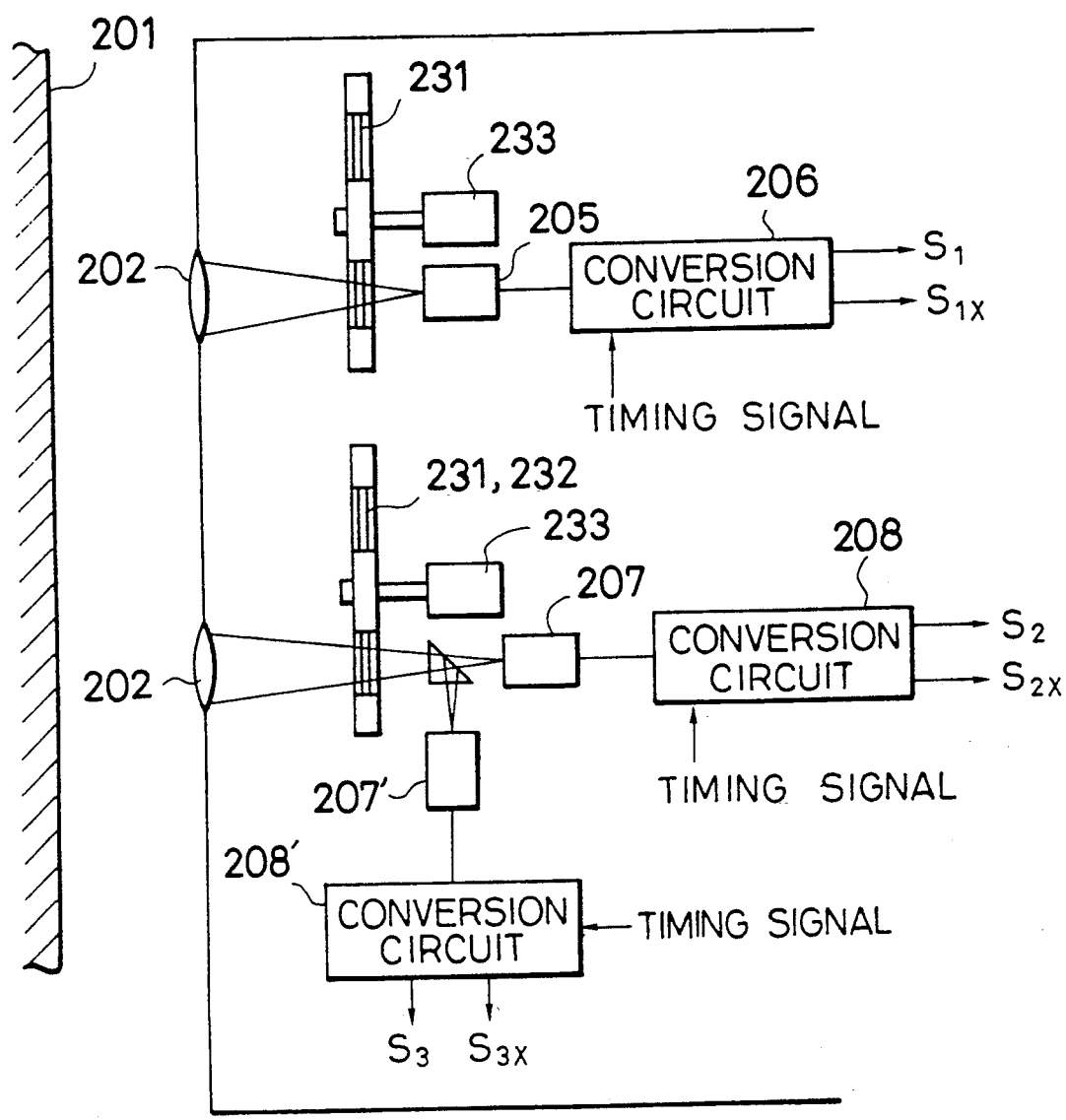
FIG. 57 is a block diagram showing a photoelectric conversion part of a two-color multiplex type radiation thermometer of a ninth embodiment.

FIG. 57 is a block diagram, corresponding to FIG. 51, schematically showing the photoelectric conversion part of a ninth embodiment according to the present invention.

Figure 58:
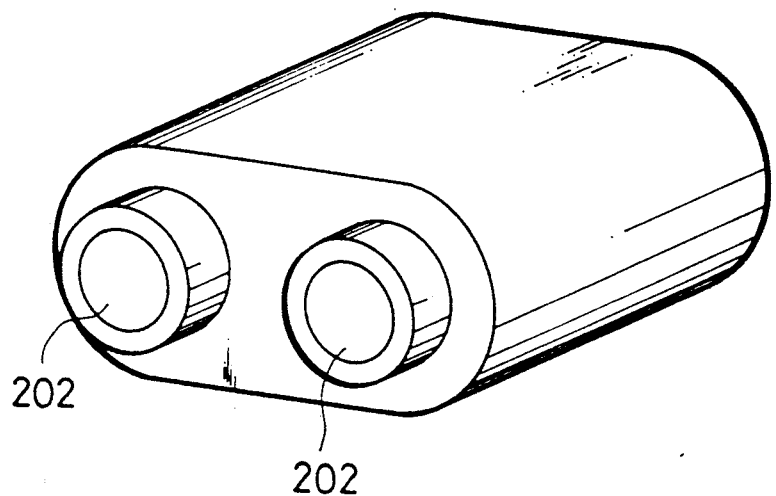
FIG. 58 is a perspective view showing external view of the above photoelectric conversion part.

The two-color multiplex type radiation thermometer of the present embodiment is of a two-color triplex type having a photoelectric conversion part as shown in a perspective view of FIG. 58. It is obtained by modifying the two-color duplex type radiation thermometer of the seventh embodiment to be able to measure the temperature also for a third measurement band formed of nearby two wavelengths $\lambda_3$ and $\lambda_{3x}$.

More specifically, the photoelectric conversion part of the present embodiment includes a photoelectric conversion part (shown above in the block diagram) for photoelectrically converting two wavelengths $\lambda_1$ and $\lambda_{1x}$ of the first measurement band and outputting brightness temperature signals S1 and S1x and a photoelectric conversion part (shown below in the block diagram) having a similar function to that of the photoelectric conversion part in the seventh embodiment, i.e., for photoelectrically converting two wavelengths $\lambda_2$ and $\lambda_{2x}$ of the second measurement band and outputting brightness temperature signals S2 and S2x and also photoelectrically converting two wavelengths $\lambda_3$ and $\lambda_{3x}$ of the third measurement band by means of a photoelectric element 207' and outputting brightness temperatures S3 and S3x by means of a conversion circuit block 208'. Although it is preferred that the photoelectric conversion part is arranged in a double-eye type as illustrated in FIG. 58, it may have filters added to the seventh or eighth embodiment.

The signal processing part, not shown, is such that is obtained by adding a processing function for the third measurement band to the signal processing part in the seventh embodiment such that measurement data can be selected out of those for three measurement bands.

The present invention has higher measuring accuracy than that of the two-color duplex type of the seventh embodiment and the like. More specifically, in the case of the two-color duplex type, the detection of the timing zone in the wavelength zone selection block 132 cannot be achieved until an emissivity change actually occurs. Hence, a considerable length of time producing a large error is consumed in the switch selection of the wavelength zone. In the case of the present two-color triplex type, since the detection of the timing zone can be achieved in the wavelength zone not related to signal outputting, consumption of the error producing time in the switch selection can be prevented.

Figure 59:
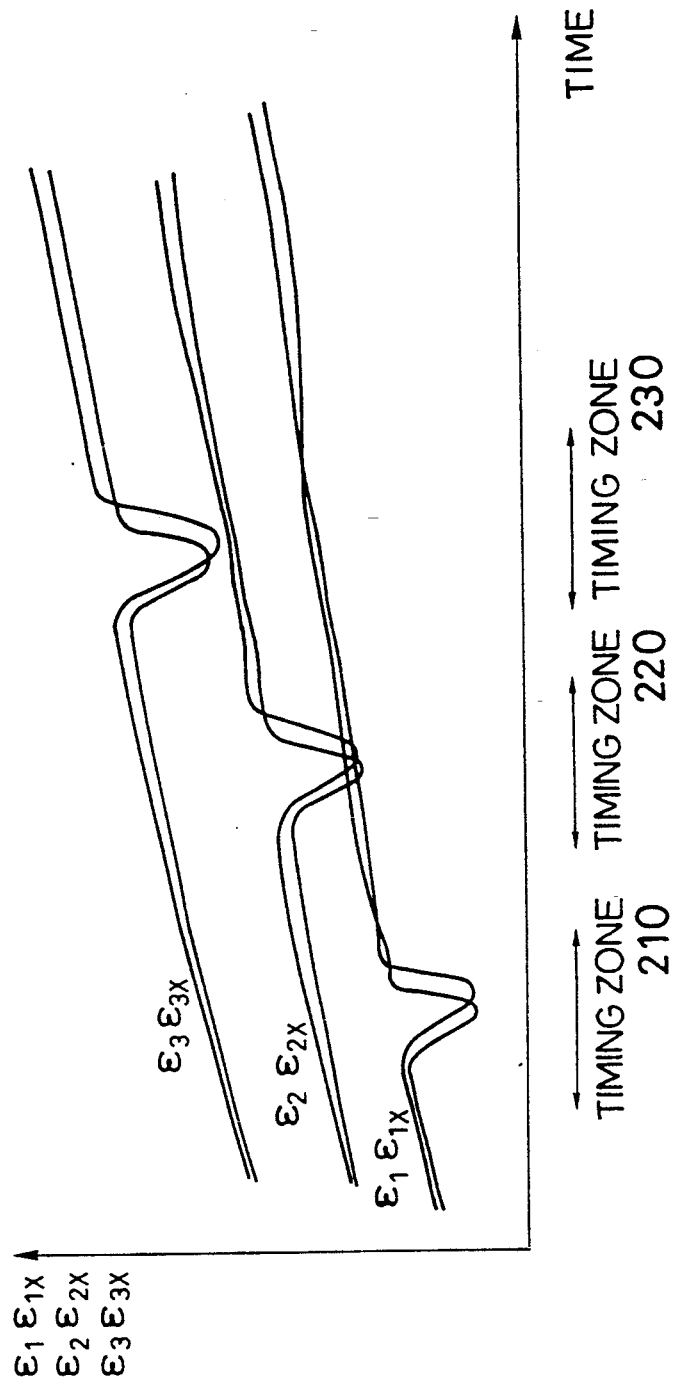
FIG. 59 is a time chart showing variations of emissivities in a two-color triplex type.

Situations related to the above will be described in concrete terms with reference to FIG. 59 and FIG. 60. FIG. 59 is a time chart showing occurrence of a variation in the emissivity for each wavelength when three separate wavelength zones, the first measurement band of $\lambda_1$ and $\lambda_{1x}$, the second measurement band of $\lambda_2$ and $\lambda_{2x}$, and the third measurement band of $\lambda_3$ and $\lambda_{3x}$, are used. FIG. 60 is a table of selection signals output from the wavelength zone selection block 132, in which ⊙ indicates a wavelength to be selected, a indicates a wavelength zone during which a change might occur at any moment, and X indicates a wavelength zone not to be selected.

As shown in the table, during the timing zone 210, the third measurement band of $\lambda_3$ and $\lambda_{3x}$ is selected which is two zones ahead of the wavelength zone in which a variation is currently occurring. During the timing zone 220, the first measurement band of $\lambda_1$ and $\lambda_{1x}$ which has already gone through the variation is selected. During the timing zone 230, either of the first and second measurement bands is selected. Thus, according to the present two-color triplex type (inclusive of quadruple type or higher), it can be arranged so that a wavelength zone indicated by Δ is not selected. Therefore, more accurate thermometry can be achieved. Incidentally, in the case of the two-color duplex type, temperature calculation is being made in a state of the wavelength zone indicated by Δ where an emissivity change might occur at any moment.

Now, a particular case to which the present invention is actually applied will be described.

A radiation thermometer of a two-color duplex type was structured by taking off-line data on a steel plate (Kawasaki Steel Corporation make) in accordance with the above described Japanese Patent Publication No. 3-4855 and preparing regression functions made the following first and second two-color measurement bands:

First measurement band: (Si photoelectric element)

$\lambda_1 = 1.00$ μm $\lambda_{1x} = 1.05$ μm

Second measurement band: (Ge photoelectric element)

$\lambda_2 = 1.60$ μm $\lambda_{2x} = 1.65$ μm

In preparing the regression functions, the method described in Japanese Patent Application No. 3-129828 already applied for patent by the present applicant was used.

More specifically, supposing that one measurement band is formed of two wavelengths $\lambda_1$ and $\lambda_2$, the ratio between spectral emissivities $\epsilon_1$ and $\epsilon_2$ for the wavelength and $\lambda_1$ and $\lambda_2$ was calculated according to the following expression using brightness temperatures S1 and S2 at the wavelengths $\lambda_1$ and $\lambda_2$ and a constant A ($0 \leq A \leq 1$).

$$\epsilon_1/\epsilon_2 = [A \cdot \exp\{C2((1/S2)-(1/S1))\}]^{2/(\lambda 1 + \lambda 2)}$$

Temperature measurement according to the present invention was performed using the above regression data and also similar measurement was performed for comparison with thermometers of various types and the results obtained (maximum temperature errors) are shown in Table 2 and Table 3.

The object of measurement was stainless steel SUS 304. Table 2 shows results of measurement when the surface oxidation was in progress and the variation in the emissivity was remarkable. Table 3 shows results of measurement in temperature zones, in which the variation was relatively smaller than that in which measurement for Table 2 was performed. Each value is the average for 20 samples.

The true temperature was measured with a thermocouple welded to the steel plate. The sampling was made when the variation of $\epsilon$ was remarkable by qualitatively determining the surface oxidation in progress according to the changing tendency of $\epsilon$ calculated by using the true temperature.

In the case of the present invention, as apparent from Table 2 and Table 3, the temperature measurement error was within 5° C. whether it was that obtained when the emissivity variation was remarkable or not and its excellency was confirmed. It is expected that higher accuracy can be obtained if the two-color triplex type is used.

TABLE 2

|  | Maximum Value of Temperature Measurement Error [°C.] |
|---|---|
| Present Invention | 3 |
| Improved Two-color Type (Japanese Patent Publication No. 3-4855) | 15 |
| Improved Two-color Type (TRACE Method) | 16 |
| Prior Art Two-color Type (Emissivity Ratio = 1) | 33 |
| Single-color Type (GE, $\epsilon$ = 0.5 fix) | 58 |

TABLE 3

|  | Maximum Value of Temperature Measurement Error [°C.] |
|---|---|
| Present Invention | 3 |
| Improved Two-color Type (Japanese Patent Publication No. 3-4855) | 4 |
| Improved Two-color Type (TRACE Method) | 4 |
| Prior Art Two-color Type (Emissivity Ratio = 1) | 25· |
| Single-color Type (GE, $\epsilon$ = 0.5 fix) | 28 |

Although the present invention has been concretely described above, it is a matter of course that the present invention is not limited to the above described embodiment.

For example, the number of measurement bands is not limited to 2 or 3 but it may be 4 or above.

Further, it is preferred, as mentioned in the above-described embodiment, that the measurement band is formed of nearby two wavelengths and the measurement bands are separated, but other arrangements are also possible. Namely, the measurement bands need not be near to each other and, hence, they can even be partly overlapping.

Although, in the above-described embodiment, the arrangement in which the wavelength zone selection is made in the wavelength zone selection block 132 according to time variations of the emissivity involution ratio has been shown, it may be arranged such that the emissivity ratios $\epsilon_1^{\lambda 1}/\epsilon_{1x}^{\lambda 1x}$ and $\epsilon_2^{\lambda 2}/\epsilon_{2x}^{\lambda 2x}$ are input from the calculation blocks 501 and 502 and the wavelength zone selection is made according to time variations of the emissivity ratios.

Further, in the above-described embodiment, it has been arranged such that temperature calculation is made for all of the measurement bands and the result of calculation for the measurement band selected in the selection box 132 is output. It may be arranged such that the temperature calculation is made only for the selected measurement band.

According to the present embodiment, as described above, even in such cases where, for example, an oxide film is formed on the surface of the object of measurement and its thickness is increased to change the surface conditions, the surface temperature of the object of measurement can be measured with high accuracy.

Figure 61:
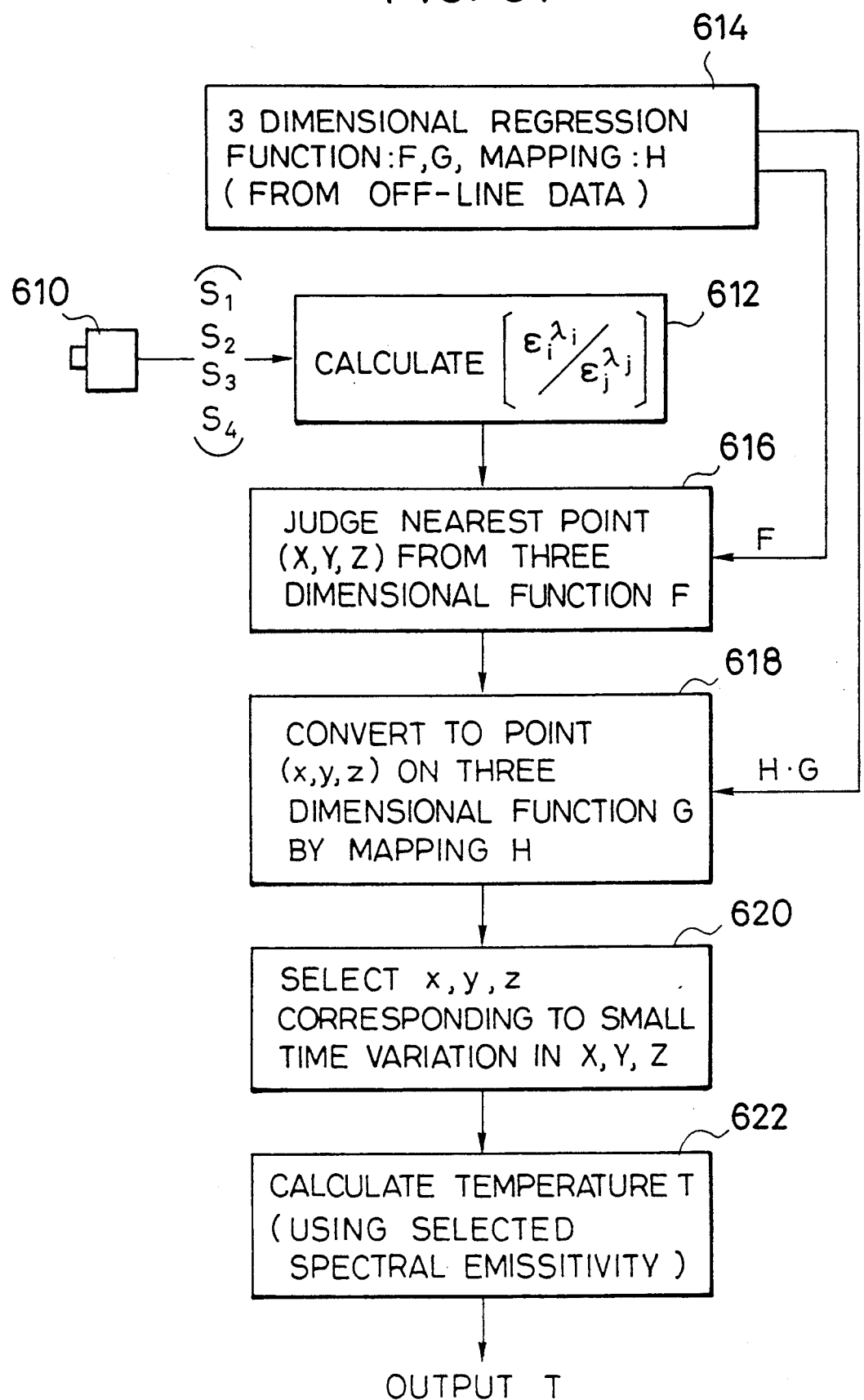
FIG. 61 is a block diagram showing a conceptual structure of a multi-wavelength type radiation thermometer of a tenth embodiment according to the present invention.

FIG. 61 is a block diagram showing a conceptual structure of a multi-wavelength type radiation thermometer of a tenth embodiment according to the present invention.

The multi-wavelength type radiation thermometer of the present embodiment includes a photodetecting part 610 incorporating a spectroscope for dispersing a light wave into different four wavelengths $\lambda_1$ and $\lambda_4$ and photoelectric converters for measuring brightness temperatures S1 to S4 at the dispersed wavelengths $\lambda_1$ and $\lambda_4$ and an emissivity involution ratio calculation block 612 for calculating the emissivity involution ratio $\epsilon_i^{\lambda i}/\epsilon_j^{\lambda j}$ using the brightness temperatures S1 to S4 obtained on-line for combinations of different two wavelengths according to the following expression (20) corresponding to the above-mentioned expression (3).

$$\epsilon_i^{\lambda i}/\epsilon_j^{\lambda j} = \exp[C2\{(1/Sj)-(1/Si)\}] \quad (20)$$

where i, j are positive integers 4 or below, i≠j and C2 is Planck's second constant.

Further, the above radiation thermometer includes a reference block 614 storing three-dimensional involution-ratio regression function F for the emissivity involution ratios prepared in advance from actual measurement data etc. obtained off-line. The reference block 614 also stores three-dimensional emissivity ratio regression function G similarly prepared for the emissivity ratios, and a mapping H for converting the regression function F to the regression function G. The thermometer also includes a judgment block 616 for selecting a point on the regression function F corresponding to the three-dimensional coordinate values based on actual measurement, which are formed of three emissivity involution ratios calculated according to the above expression (20) using the above brightness temperatures obtained on-line. The thermometer further includes a conversion block 618 applying the mapping H to the selected point on the regression function F to thereby convert it to a point on the regression function G and calculating three emissivity ratios $\epsilon_i/\epsilon_j$ from the converted point. The thermometer still further includes a selection block 620 for monitoring time variations of the emissivity involution ratios calculated in the calculation block 612 to select the one exhibiting a smaller time variation, and a temperature calculation block 622 for performing temperature calculation using part or all of the emissivity ratios calculated in the conversion block 618 to thereby obtain the measurement temperature.

Figure 62:
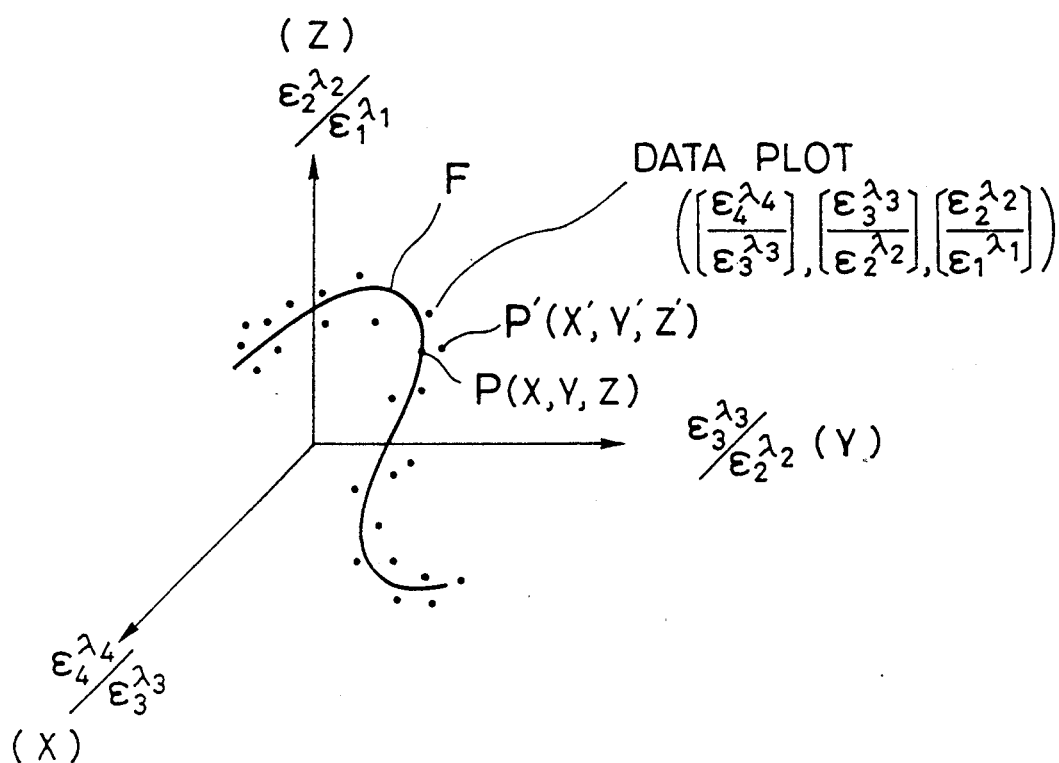
FIG. 62 is a diagram of a regression function F used in the tenth embodiment expressed in three-dimensional space.
Figure 63:
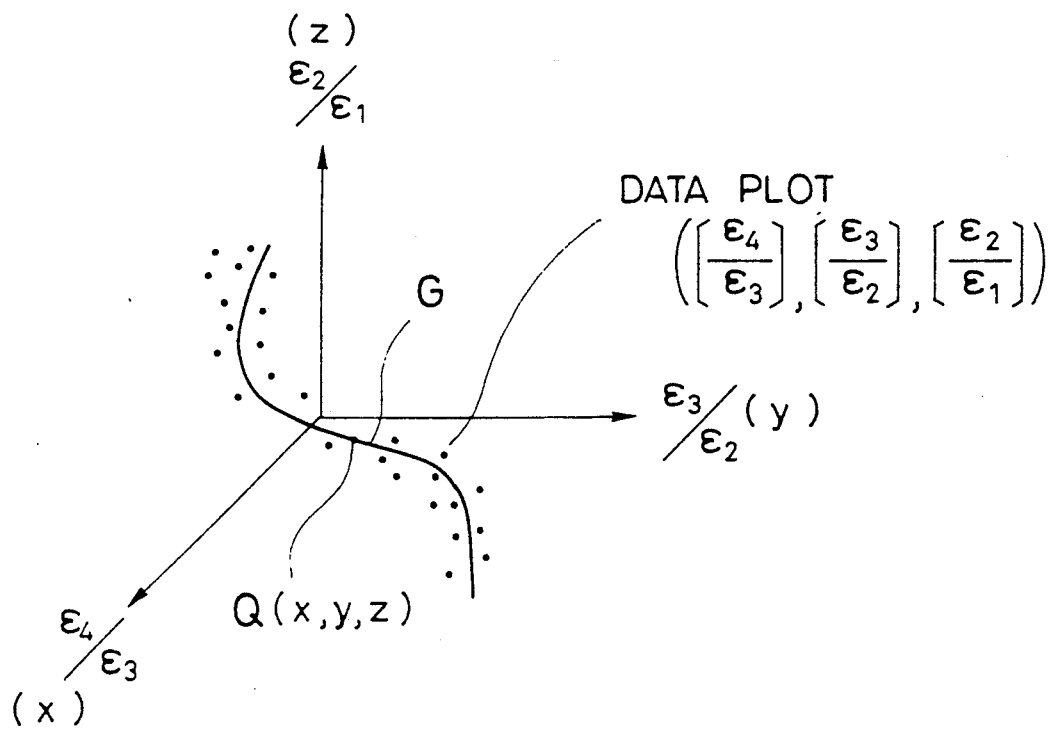
FIG. 63 is a diagram showing a regression function G obtained from the regression function F by applying a mapping thereto.

The reference block 614 stores the three-dimensional regression function F for the emissivity involution ratios indicated by three-dimensional coordinates (X, Y, Z) in FIG. 62, the three-dimensional regression function G for the emissivity ratios indicated by three-dimensional coordinates of (x, y, z) in FIG. 63, both of which are determined off-line for each object of measurement, and the mapping H for converting the regression function F to the regression function G.

The regression functions F and G are prepared by plotting emissivity involution ratios or emissivity ratios based on actual measurement as indicated by black dots in the diagrams and taking the average of the group of black dots. Incidentally, $[\epsilon_i^{\lambda i}/\epsilon_j^{\lambda j}]$ shown in FIG. 62 as a data plot indicates a set of emissivity involution ratios based on actual measurement and $[\epsilon_i/\epsilon_j]$ shown in FIG. 63 indicates a set of emissivity ratios equally based on actual measurement.

It is arranged such that the regression function F is input to the judgment block 616 from the reference block 614 and the mapping H and the regression function G are input, from the same, to the conversion block 618.

Now operations of the present embodiment will be described.

Brightness temperatures S1 to S4 corresponding to the different four wavelengths $\lambda_1$ to $\lambda_4$ obtained by the photodetecting part 610 upon receipt of the light beam from an object for measurement (not shown) are input to the emissivity involution ratio calculation block 612, in which emissivity involution ratios are calculated for combinations (S1, S2), (S2, S3), and (S3, S4) in accordance with the expression (20). Thereby, for example, a corresponding particular point P' (X', Y', Z') is obtained in the three-dimensional coordinate space in FIG. 62. Then, it is decided in the judgment block 616 that the point P (X, Y, Z) in the regression function F nearest to the point P' should be used for temperature calculation.

After the decision on the point P on the regression function F has been made, the mapping H is applied to the point P and a point Q (x, y, z) on the regression function G for the emissivity ratios shown in FIG. 63 is determined.

Meanwhile, time variations of the three emissivity involution ratios (X', Y', Z') calculated in the emissivity involution ratio calculation block 612 are monitored and the emissivity involution ratio exhibiting a smaller time variation is selected from X, Y, and Z in the selection block 620.

When there is one exhibiting a large time variation in the emissivity involution ratios, the emissivity involution ratio is eliminated and the emissivity ratio is obtained from the remaining one or two emissivity involution ratios. The temperature T is calculated using the selected emissivity ratio according to the expression (5) in the temperature calculation block 622. This temperature T is output.

In the temperature calculation block 622, when there is substantially no time variation in the emissivity involution ratio or there are two emissivity involution ratios exhibiting no time variation, the true temperature T may be determined from the average value of them or the temperature calculation may be made using the emissivity involution ratio whose variation is minimum.

According to the present embodiment described in detail above, since three different emissivity involution ratios which can be expressed in a three-dimensional coordinate system using four different wavelengths are obtained, two-color temperature calculation can be made for each of the three emissivity involution ratios. Hence, information volume can be greatly increased as compared with the prior art improved type two-color thermometer in which only two wavelengths are used. Therefore, even in such a case where an unexpected sudden change in the emissivity occurs in some wavelength zone on account of formation of an oxide film, other wavelength zones exhibiting no time variation can be used for temperature calculation. Therefore, the surface temperature T can be measured accurately.

Figure 73:
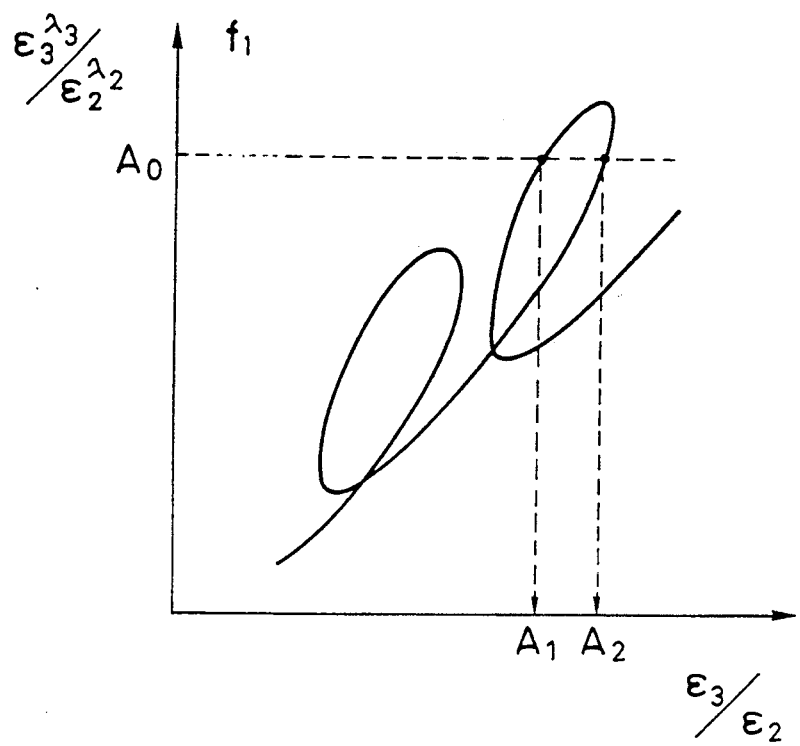
FIG. 73 is a diagram showing a problem in the prior art.
Figure 74:
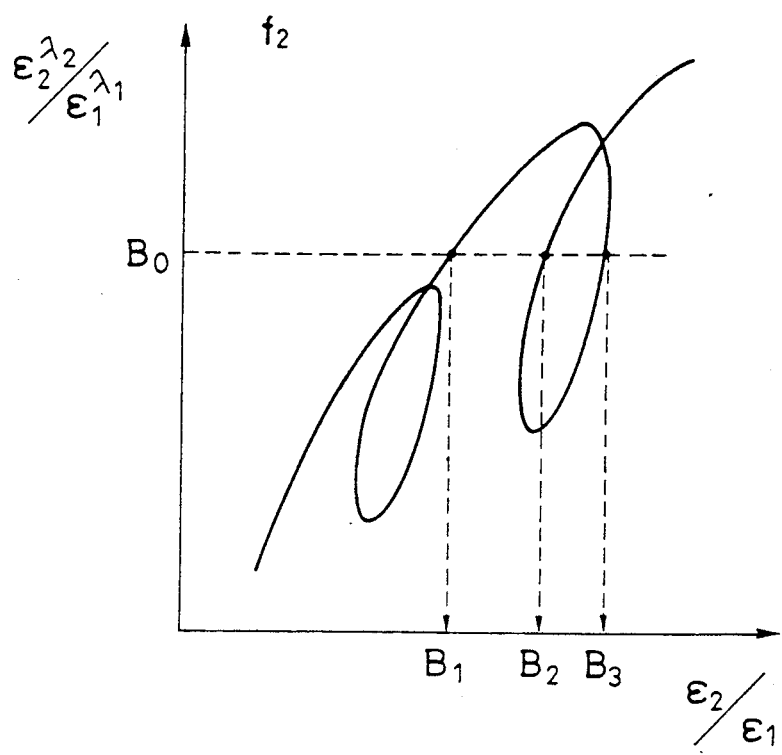
FIG. 74 is another diagram showing a problem in the prior art.
Figure 75:
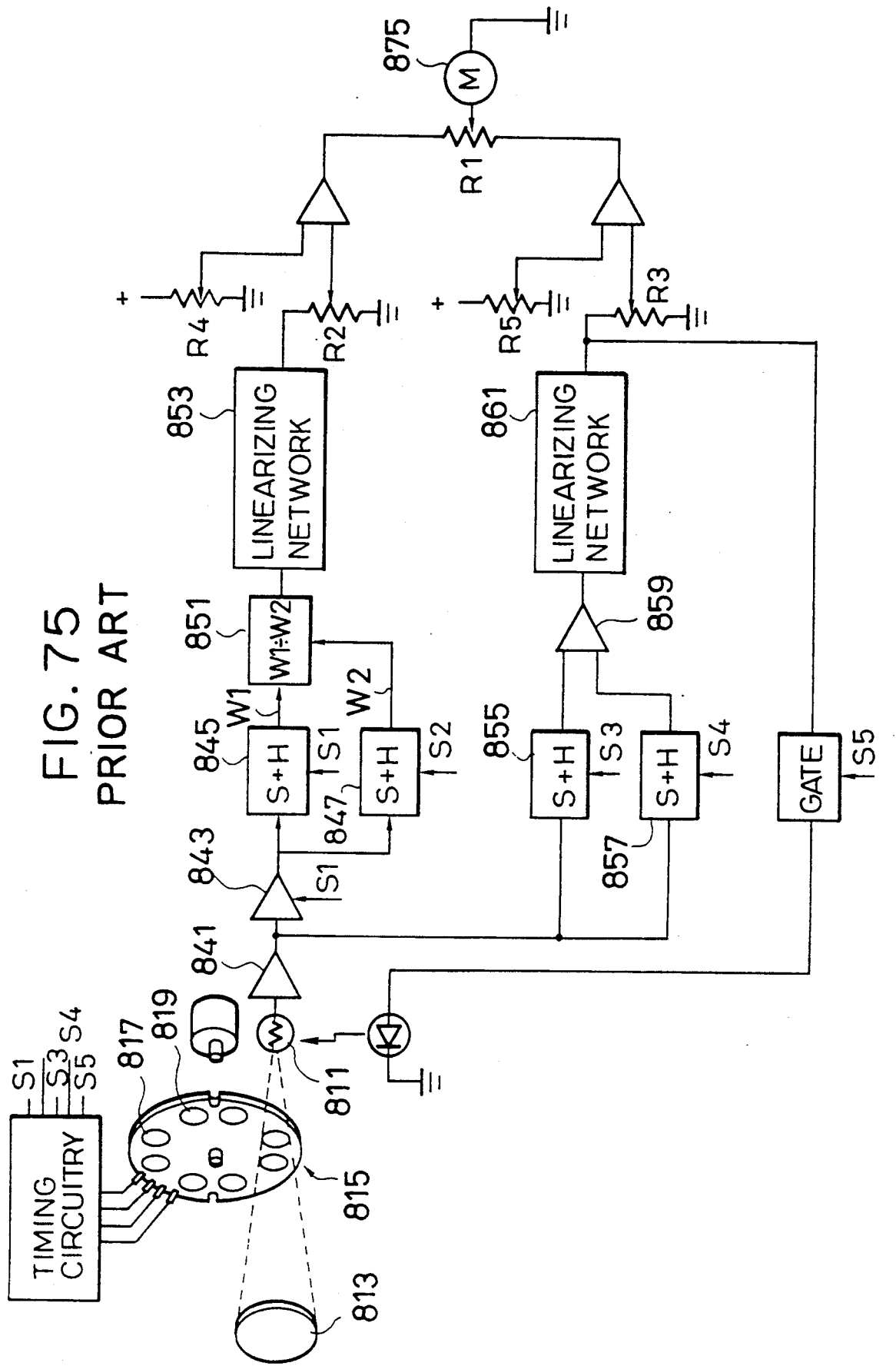
FIG. 75 is a block diagram showing an arrangement of a prior art two-color radiation thermometer.

Further, while the searching operation for the true temperature becomes complicated when a multi-wavelength system is simply applied to the improved two-color thermometer as shown in FIG. 73 and FIG. 74, (n−1) sets of emissivity ratios can be obtained at all times in the present embodiment by one time of application of the mapping H. Hence, the algorithm becomes simpler and it becomes possible to calculate true temperature very easily and quickly.

While the present invention has been described in detail above, the present invention is not limited to the above described embodiments but various changes can be made without departing from the spirit of the invention.

For example, time variations of the emissivity involution ratio have been monitored for calculating true temperature in the above embodiment, it may be arranged such that time variations of the emissivity ratio are monitored.

Further, when it is known beforehand from off-line experiments or the like that an unexpected change in radiation characteristic of the object occurs at a particular emissivity value, it may be arranged such that the emissivity involution ratio or the emissivity ratio corresponding to that emissivity is eliminated when it is obtained. Since, generally, such abnormal changes are liable to occur when the emissivity involution ratio or the emissivity ratio takes on a large value, it may be arranged such that these values are eliminated.

Figure 64A:
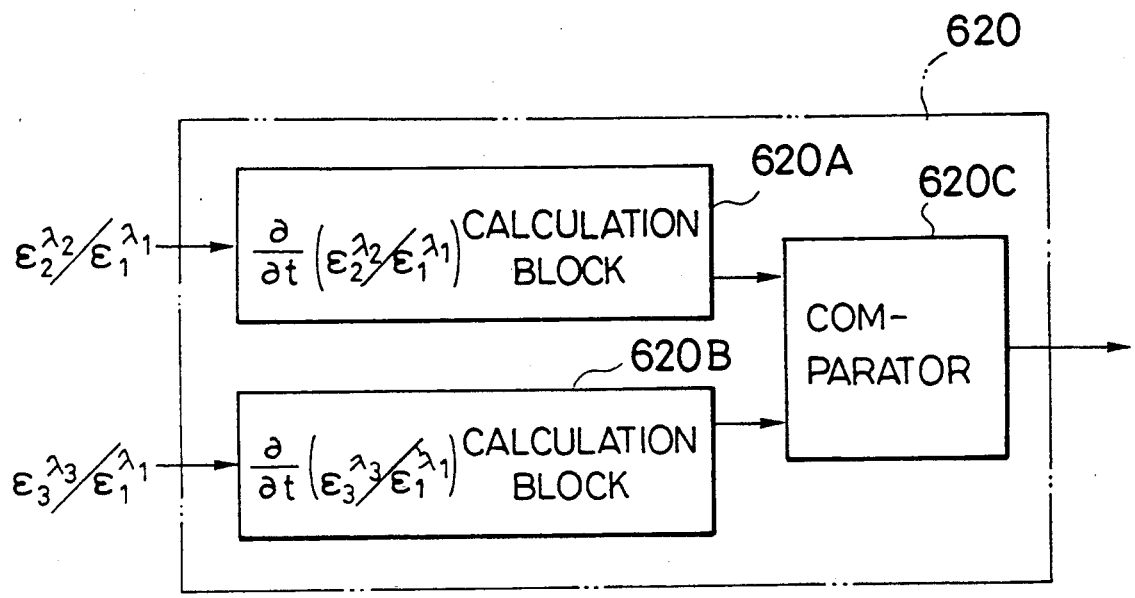
FIG. 64A and FIG. 64B are block diagrams showing structures of selection blocks.
Figure 64B:
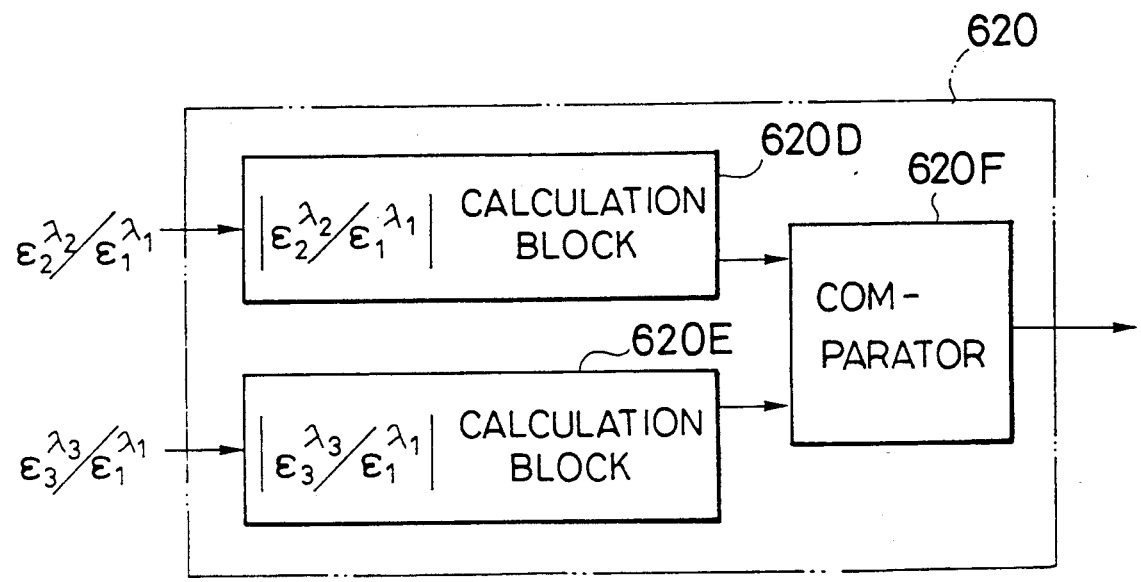
Figure 65:
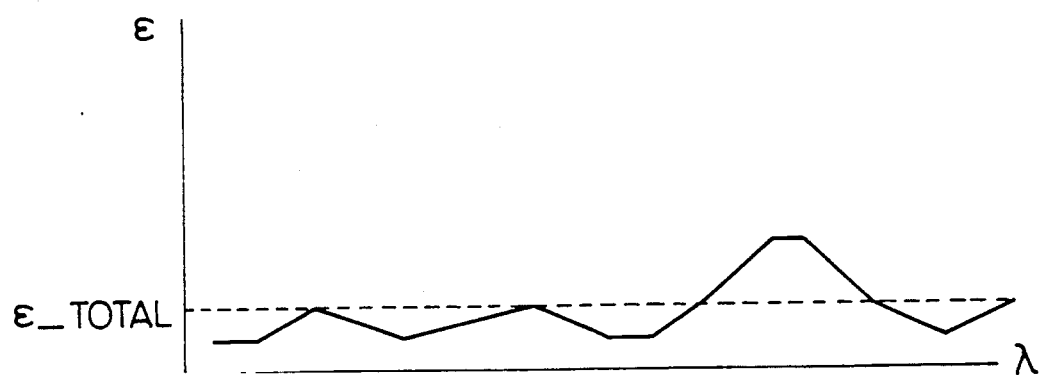
FIG. 65 is a diagram showing an emissivity spectrum of a low-temperature surface without an oxide film formed thereon.
Figure 66:
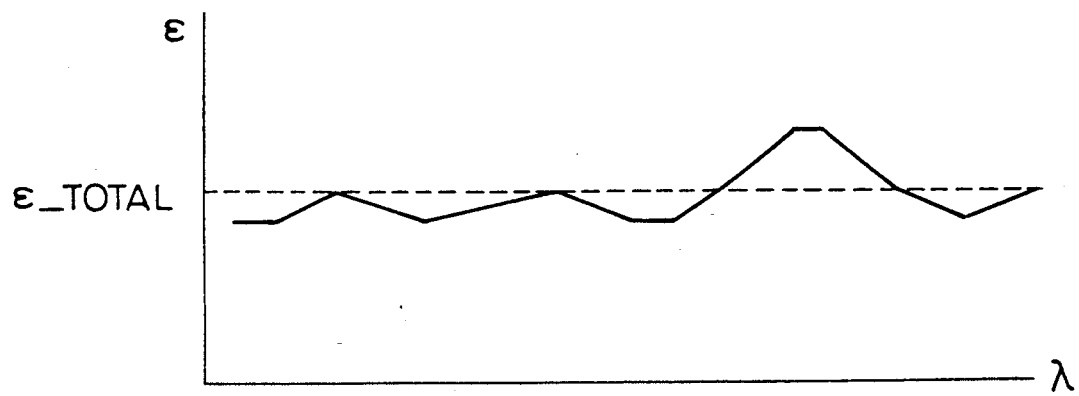
FIG. 66 is a diagram showing an emissivity spectrum of a medium-temperature surface without an oxide film formed thereon.
Figure 67:
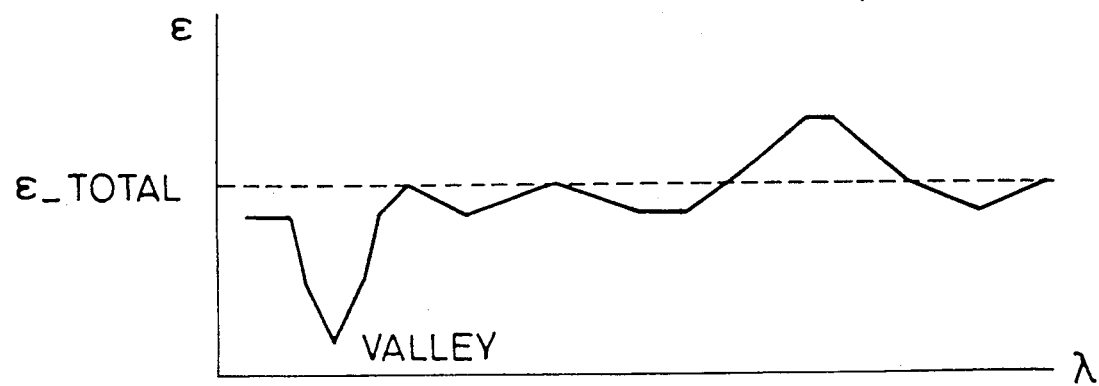
FIG. 67 is a diagram showing an emissivity spectrum of a surface immediately after formation of an oxide film thereon.
Figure 68:
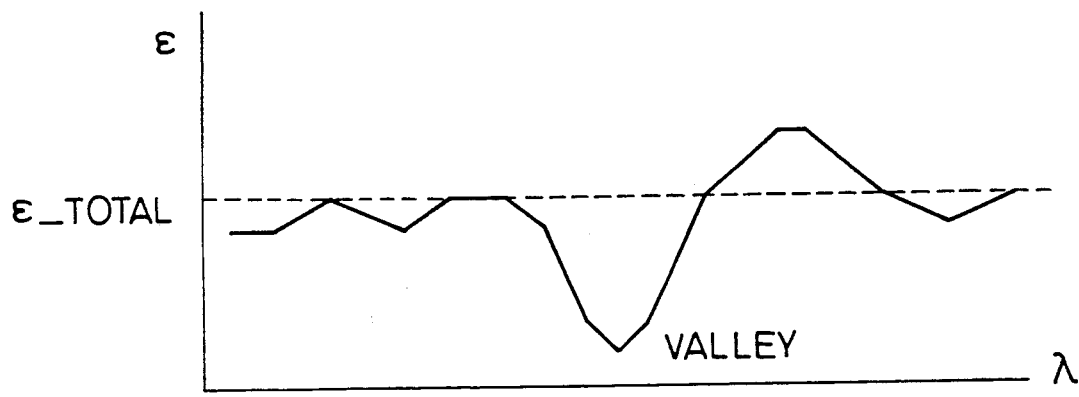
FIG. 68 is a diagram showing an emissivity spectrum of a surface having an oxide film growing thereon.
Figure 69:
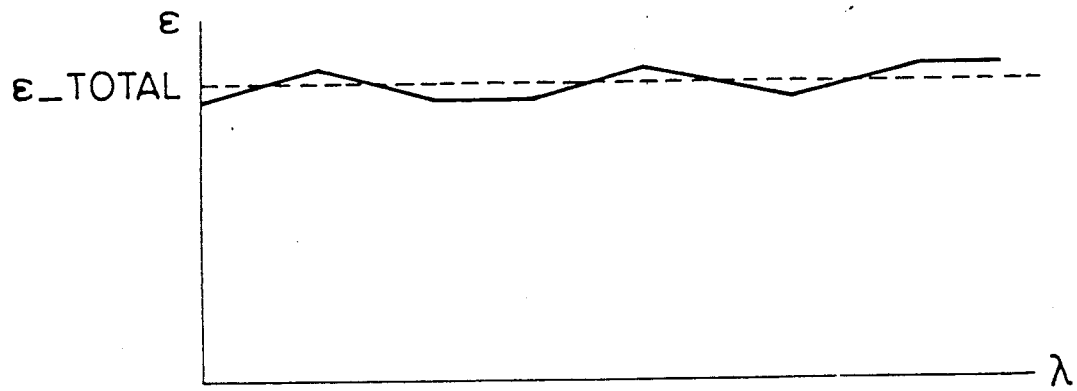
FIG. 69 is a diagram showing an emissivity spectrum of a surface after a thick passive oxide film has been formed thereon.
Figure 70:
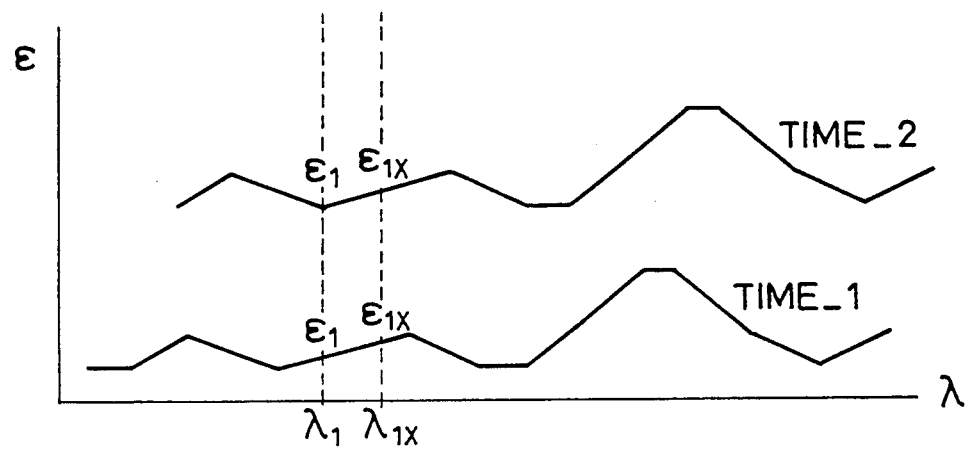
FIG. 70 is a diagram showing an emissivity spectrum of a surface for nearby two wavelengths when no oxide film is formed thereon.
Figure 71:
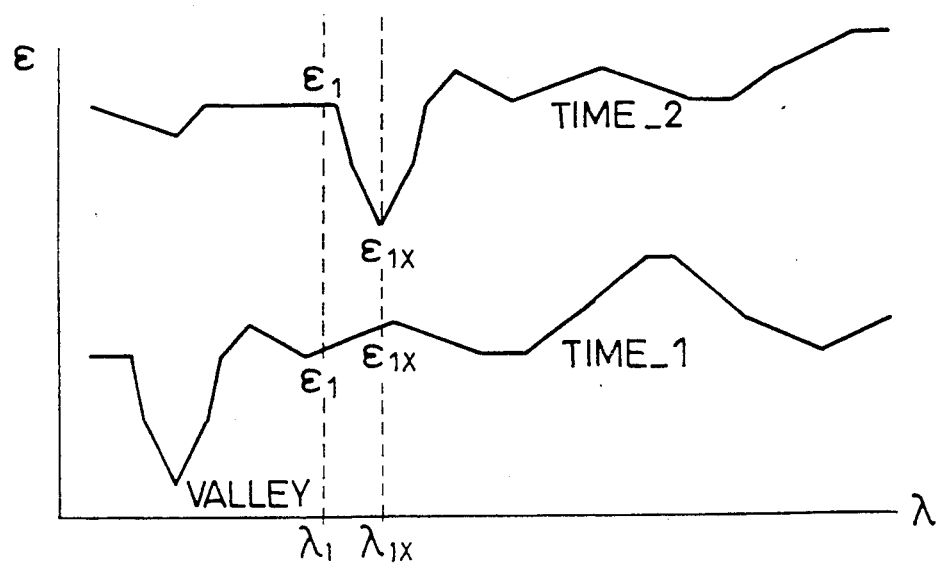
FIG. 71 is a diagram showing an emissivity spectrum of a surface for nearby two wavelengths after an oxide film has been formed thereon.
Figure 72:
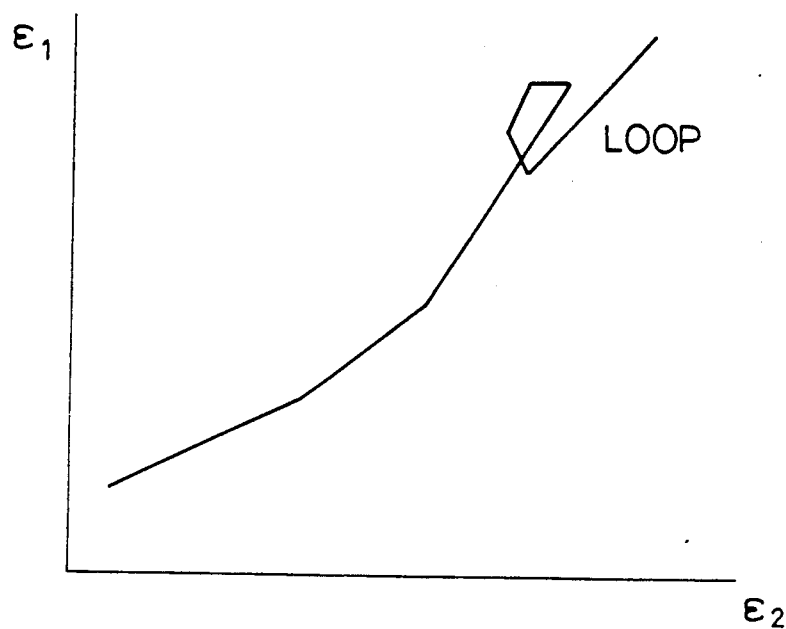
FIG. 72 is a diagram showing a correlation between spectral emissivities for two wavelengths.

The selection block 620, when monitoring time variations of the emissivity involution ratio, may be structured as shown in FIG. 64A, or when monitoring the absolute value of the emissivity involution ratio, it may be structured as shown in FIG. 64B. For convenience, there are shown those in which three wavelengths $\lambda_1$, $\lambda_2$, and $\lambda_3$ are used as examples.

The selection block 620 shown in FIG. 64A is formed of a calculation block 620A for differentiating $\epsilon_2^{\lambda_2}/\epsilon_1^{\lambda_1}$, a calculation block 620B for differentiating $\epsilon_3^{\lambda_3}/\epsilon_1^{\lambda_1}$, and a comparator 620C for comparing the results of the calculation made in the two calculation blocks 620A and 620B to output a signal for selecting the measurement band corresponding to the smaller of the variation rates.

The selection block 620 shown in FIG. 64B is formed of a calculation block 620D for calculating the absolute value $\epsilon_2^{\lambda_2}/\epsilon_1^{\lambda_1}$, a calculation block 620E for calculating the absolute value of $\epsilon_3^{\lambda_3}/\epsilon_1^{\lambda_1}$, and a comparator 620F for comparing the results of calculation made in the two calculation blocks 620D and 620E to output a signal for selecting the measurement band corresponding to the smaller of the absolute values.

According to the present embodiment, as described in the foregoing, the surface temperature can be measured accurately and easily even when the surface conditions of the object of measurement change with the passage of time and the emissivity changes depending on the measurement wavelength.

What is claimed is:

1. A surface condition measurement apparatus comprising:

detection means for detecting light with a specified wavelength, the light radiated from a material, the detection means outputting a plurality of detection signals;

calculation means for calculating a first parameter from said plurality of detection signals, the first parameter corresponding to an emissivity ratio; and converting means for converting the first parameter to a second parameter based on a predetermined relationship between the first parameter and the second parameter, the second parameter indicative of a surface condition of said material.

2. The surface condition measurement apparatus of claim 1, wherein said detection means includes a plurality of radiation sensors for detecting light beams, each radiation sensor forming a different angle between an optical path of the respective radiation sensor and an axis normal to a surface of the material.

3. The surface condition measurement apparatus of claim 1, wherein said detection means detects a plurality of light beams, and wherein the angle of polarization of each of the light beams is different from the angle of polarization of each of the other light beams.

4. The surface condition measurement apparatus of claim 1, wherein said second parameter is a logarithmic emissivity and said converting means further obtains a temperature of a surface of said material from said second parameter and said plurality of detection signals.

5. The surface condition measurement apparatus of claim 1, wherein said second parameter is an emissivity and said converting means obtains a temperature of a surface of said material from said second parameter, said selected wavelength, and said plurality of detection signals.

6. The surface condition measurement apparatus of claim 1, wherein said second parameter corresponds to a thickness of an oxide film formed on a surface of said material.

7. The surface condition measurement apparatus of claim 1, wherein said detection means detects the light beam radiated from said material and a light beam having a specified angle of polarization from the light beam radiated from said material.

8. A surface condition measurement apparatus comprising:
at least one two-color thermometer having an arbitrary position on the surface of a material;
involution ratio calculation means for calculating an emissivity involution ratio $\epsilon_1^{\lambda 1}/\epsilon_2^{\lambda 2}$ from brightness temperatures S1 and S2 for two wavelengths $\lambda_1$ and $\lambda_2$, the brightness temperatures obtained from said two-color thermometer, the emissivity involution ratio obtained according to the following expression $$\epsilon_1^{\lambda 1}/\epsilon_2^{\lambda 2}=\exp[C2\{(1/S2)-(1/S1)\}]$$

wherein C2 is Planck's second constant;
first emissivity ratio calculation means for converting the emissivity involution ratio to a first spectral emissivity ratio $\epsilon_1/\epsilon_2$ in accordance with the following correlation function $$\epsilon_1/\epsilon_2 = f(\epsilon_1^{\lambda 1}/\epsilon_2^{\lambda 2});$$

second emissivity ratio calculation means for separately calculating spectral emissivities $\epsilon_1^*$ and $\epsilon_2^*$ for said two wavelengths $\lambda_1$ and $\lambda_2$ using theoretical or experimental expressions having at least one physical value affecting the emissivity, and for calculating a second spectral emissivity ratio $\epsilon_1^*/\epsilon_2^*$;
search calculation means for giving an initial value to the at least one physical value and for making search calculations for the at least one physical value, the search calculations bringing the second spectral emissivity ratio, calculated using the at least one physical value, substantially into agreement with the first spectral emissivity ratio; and
temperature calculation means for making two-color temperature calculation using one of the first spectral emissivity ratio and the second spectral emissivity ratio, the second spectral emissivity ratio having gone through the search calculations.

9. A surface condition measurement apparatus comprising:
at least one two-color thermometer having an arbitrary position on the surface of a material;
first involution ratio calculation means for calculating a first emissivity involution ratio $\epsilon_1^{\lambda 1}/\epsilon_2^{\lambda 2}$ from the brightness temperatures S1 and S2 for the two wavelengths $\lambda_1$ and $\lambda_2$ obtained from said two-color thermometer, the first emissivity involution ratio calculated according to the following expression $$\epsilon_1^{\lambda 1}/\epsilon_2^{\lambda 2}=\exp[C2\{(1/S2)-(1/S1)\}]$$

wherein C2 is Planck's second constant;
second involution ratio calculation means for separately calculating spectral emissivities $\epsilon_1^*$ and $\epsilon_2^*$ for the two wavelengths using theoretical or experimental expressions having at least one physical value affecting the emissivity, and for calculating a second emissivity involution ratio $\epsilon_1^{*\lambda 1}/\epsilon_2^{*\lambda 2}$ from the spectral emissivities; and
search calculation means for calculating an initial value of the at least one physical value and for making search calculations for the at least one physical value, the search calculations bringing the second emissivity involution ratio substantially into agreement with the first emissivity involution ratio.

10. A two-color multiplex type radiation thermometer comprising:
spectroscopic means for dispersing light into two different wavelengths $\lambda_1$ and $\lambda_2$ for each of a plurality of different wavelength zones;
photoelectric conversion means for measuring brightness temperatures S1 and S2 from the two different wavelengths for each of the wavelength zones;
involution ratio calculation means for calculating an emissivity involution ratio $\epsilon_1^{\lambda 1}/\epsilon_2^{\lambda 2}$ from the brightness temperatures measured from the two different wavelengths for each of the wavelength zones, the emissivity involution ratio obtained according to the expression $$\epsilon_1^{\lambda 1}/\epsilon_2^{\lambda 2}=\exp[C2\{(1/S2)-(1/S1)\}]$$

wherein C2 is Planck's second constant;
emissivity ratio calculation means for converting the emissivity involution ratio into a spectral emissivity ratio $\epsilon_1/\epsilon_2$ using the correlation function $$\epsilon_1/\epsilon_2 = f(\epsilon_1^{\lambda 1}/\epsilon_2^{\lambda 2});$$

temperature calculation means for making two-color temperature calculation using the spectral emissivity ratio and for calculating a measurement temperature; and
wavelength zone selection means for monitoring time variations of one of the emissivity involution ratio and the spectral emissivity ratio for each of the wavelength zones and for selecting a particular wavelength zone based on the monitored time variations, wherein the measurement temperature calculated for said particular wavelength zone is output.

11. The two-color multiplex-type radiation thermometer of claim 10, wherein said wavelength zone selection means compares time variation rates of the emissivity involution ratios and the spectral emissivity ratios and selects the wavelength zone having the minimum time variation rate.

12. The two-color multiplex-type radiation thermometer of claim 10, wherein said wavelength zone selection means compares the absolute value of each of the emissivity involution ratios and each of the spectral emissivity ratios and selects the wavelength zone having the minimum absolute value.

13. The two-color multiplex-type radiation thermometer of claim 10, wherein said wavelength zone selection means selects one of the wavelength zone having the lower wavelength side, and the second wavelength zone or beyond the same in the direction to the higher wavelength, the selected wavelength zone selected from the wavelength zone having the maximum time variation of one of the emissivity involution ratio and the spectral emissivity ratio.

14. A multi-wavelength type radiation thermometer comprising:

spectroscopic means for dispersing light into a plurality of different wavelengths $\lambda_1$ to $\lambda_n$;

photoelectric conversion means for measuring a plurality of brightness temperatures S1 to Sn, each brightness temperature measured at a respective wavelengths $\lambda_1$ to $\lambda_n$;

involution ratio calculation means for calculating an emissivity involution ratio $\epsilon_i^{\lambda i}/\epsilon_j^{\lambda j}$ from the brightness temperatures S1 to Sn obtained on-line for each combination of two different wavelengths according to the expression $$\epsilon_i^{\lambda i}/\epsilon_j^{\lambda j} = \exp[C2\{(1/Sj)-(1/Si)\}]$$

wherein i, j are positive integers not exceeding n, i≠j, and C2 is Planck's second constant;

reference means for storing an (n−1)-dimensional involution ratio regression function, the (n−1)-dimensional involution ratio regression function made from one of off-line measurement data and theories, for expressing mutual relationships of emissivity involution ratios, an (n−1)-dimensional emissivity ratio regression function expressing mutual relationships of emissivity ratios $\epsilon_1/\epsilon_j$, and for converting the involution ratio regression function into the emissivity ratio regression function;

judgment means for determining a point on the emissivity involution ratio regression function corresponding to (n−1)-dimensional coordinates formed of (n−1) emissivity involution ratios calculated from the above expression. the judgment means using the brightness temperatures S1 to Sn obtained on-line;

conversion means for applying said mapping to a determined point on the involution ratio regression function to convert the determined point to a converted point on the emissivity ratio regression function and for calculating (n−1) emissivity ratios $\epsilon_1/\epsilon_j$ from the converted point; and temperature calculation means for calculating a measurement temperature by making temperature calculation using at least one of the calculated emissivity ratios.

15. The multi-wavelength type radiation thermometer of claim 14, further comprising monitoring the time variations of at least one of the emissivity involution ratio and the emissivity ratio and encoding one of an emissivity involution ratio and an emissivity ratio exhibiting a great variation.

* * * * *